United States Patent [19]

Yamade et al.

[11] Patent Number: 5,498,580

[45] Date of Patent: Mar. 12, 1996

[54] CERAMIC SUBSTRATE AND A METHOD FOR PRODUCING THE SAME

[75] Inventors: Yoshiaki Yamade; Yoichi Moriya, both of Hyogo, Japan

[73] Assignee: Sumitomo Metal Industries Ltd., Osaka, Japan

[21] Appl. No.: 219,549

[22] Filed: Mar. 29, 1994

[30] Foreign Application Priority Data

| Mar. 30, 1993 | [JP] | Japan | 5-071613 |
| Jul. 15, 1993 | [JP] | Japan | 5-175517 |
| Oct. 18, 1993 | [JP] | Japan | 5-259884 |
| Nov. 29, 1993 | [JP] | Japan | 5-298616 |

[51] Int. Cl.$^6$ .......................... C03C 10/08; C03C 14/00
[52] U.S. Cl. ........................ 501/9; 501/32; 501/66
[58] Field of Search .......................... 501/9, 32, 66, 501/69

[56] References Cited

U.S. PATENT DOCUMENTS

| 4,749,665 | 6/1988 | Yano et al. | 501/32 |
| 4,764,233 | 8/1988 | Ogihara et al. | 501/11 X |
| 4,997,795 | 3/1991 | Hang et al. | 501/9 X |
| 5,024,975 | 6/1991 | Hartmann | 501/32 X |
| 5,190,895 | 3/1993 | Uchida et al. | 501/32 |
| 5,356,841 | 10/1994 | Mizutani et al. | 501/32 |

FOREIGN PATENT DOCUMENTS 0289222  11/1988  European Pat. Off. ...... C03L 10/080

*Primary Examiner*—Karl Group
*Attorney, Agent, or Firm*—Armstrong, Westerman, Hattori, McLeland & Naughton

[57] ABSTRACT

The ceramic substrate comprising a glass and a crystal is characterized by the glass comprising a $MgO$—$Al_2O_3$—$SiO_2$—$B_2O_3$—$R_2O$-base glass(R:alkali metal) and containing a $2MgO.2Al_2O_3.5SiO_2$ crystal (cordierire) as the crystal. Due to the composition, the softening point of the glass becomes less than 720° C. and the porosity decreases, so that the substrate can be dense. As a result, the coefficient of thermal expansion thereof can be close to silicon, the specific inductive capacity thereof can be small and the substrate can be excellent in transverse strength, moisture resistance, water resistance, etc. And, due to the lowered softening point, a ceramic substrate having the above characteristics can be produced even by sintering at between 800° C. and 1000° C., and ceramic substrate having an inner circuit interconnection made of Ag or Cu, etc. can be produced.

15 Claims, 43 Drawing Sheets

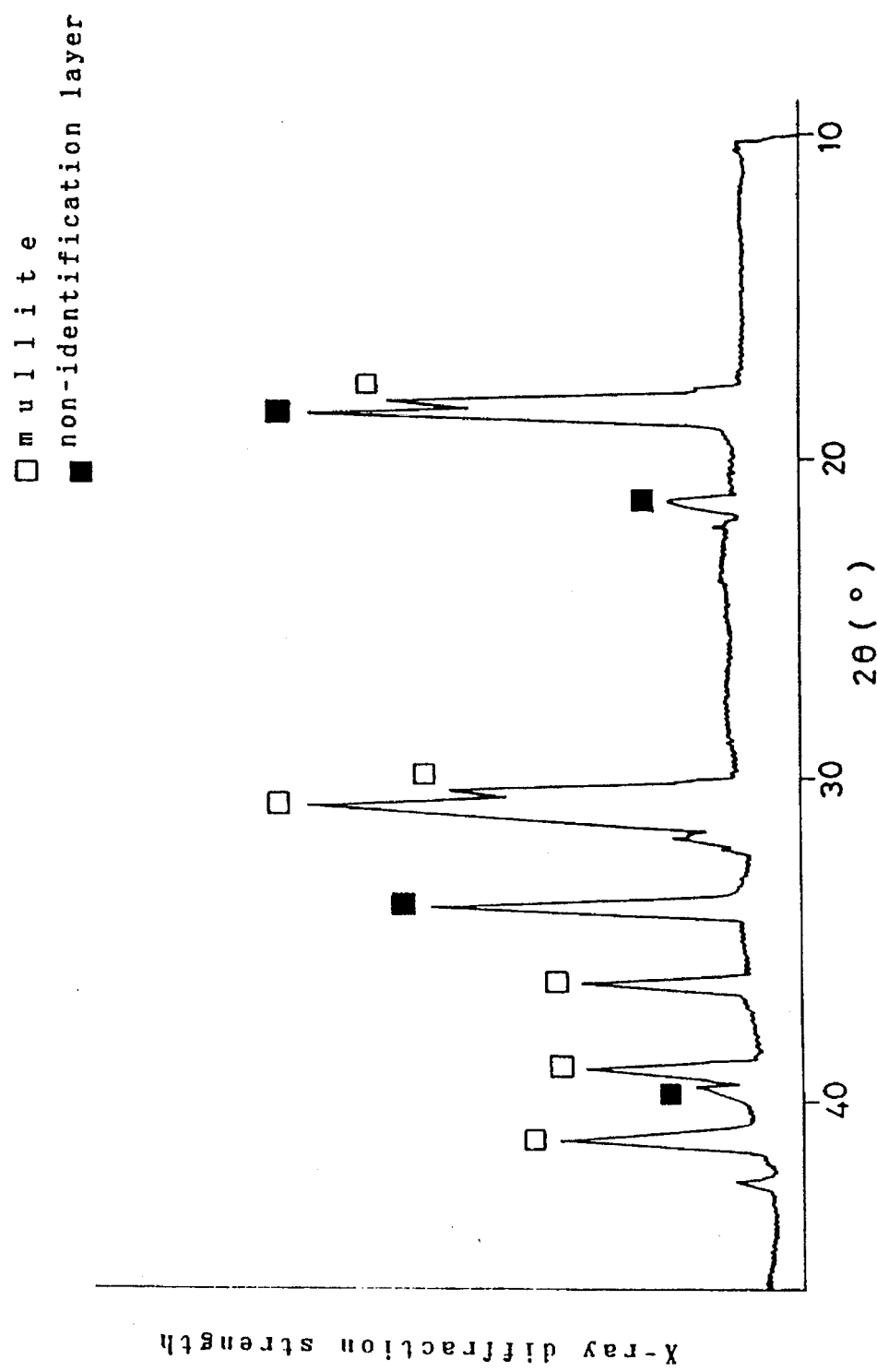

CERAMIC SUBSTRATE AND A METHOD FOR PRODUCING THE SAME

BACKGROUND OF THE INVENTION

1. Field of the Invention

The present invention relates to a ceramic substrate and to a method for producing the same and, more particularly, to a ceramic substrate widely used as a multilayer interconnection substrate for being loaded with electronic parts and to a method for producing the same.

Recently, as for a multilayer interconnection substrate loaded with a highly integrated LSI device and various sorts of electronic parts, in order to miniaturize electronic equipment, improve the reliability and so on, more ceramics have been used as a substrate material. And as for such ceramic substrate, there are severe requirements in various characteristics such as sintering temperature, specific inductive capacity, coefficient of thermal expansion, transverse strength and water resistance.

2. Description of the Relevant Art

Due to having the advantage such as a high strength, the proportion of alumina in the ceramic for a substrate material is large. On the other hand, however, alumina has problems of having a large specific inductive capacity, which causes delays of transmission signals, and having a coefficient of thermal expansion much higher than silicon, which makes it difficult to ensure the reliability in packaging parts. And alumina has the other problems of having a high sintering temperature of about 1550°, which requires the use of W or Mo with a high melting point and a high electric resistivity as a material for an interconnection pattern formed inside a sintered body (hereinafter referred to as an interconnection inside layer), and having a higher electrical resistance by making the interconnection pattern refined.

Therefore, in order to deal with these problems, the study and development of a low temperature sintered ceramic which has both a smaller specific inductive capacity and a coefficient of thermal expansion closer to silicon, and which can be sintered even with the use of a metallic material having a low melting point and a low resistivity such as Cu, Ag or Ag—Pd as a material for forming an interconnection inside layer (hereinafter referred to as a conductor inside layer), has been promoted.

Generally, a low temperature sintered ceramic substrate is produced by mixing a glass material with a crystal material called a filler and sintering the same. However, the number of combinations of glass materials with crystal materials is extremely large and every combination of both of them makes a different synergistic effect in sintering, resulting in obtaining a ceramic substrate having different characteristics (specific inductive capacity, coefficient of thermal expansion, sintering temperature, transverse strength, etc.). Therefore, it is difficult to find the best combination and produce a ceramic substrate having such composition and structure so as enable constant and stable characteristics to usually appear.

In such a situation, as a low temperature sintered ceramic substrate, whose strength can be large without impairing the characteristics of a low specific inductive capacity and a coefficient of thermal expansion close to silicon, and which can cope with higher speed transmission of signals and larger size elements such as a LSI device loaded with a substrate, a cordierire ($2MgO.2Al_2O_3.5SiO_2$)-base crystallized glass as disclosed in Japanese Patent Laid-Open Publication No.225338/90 and a composite of a cordierire crystallized glass with a ceramic filler as disclosed in Japanese Patent Laid-Open Publication No.225339/90 and No.225340/90 have been noticed.

However, since the cordierire-base crystallized glass disclosed in the Japanese Patent Laid-Open Publication No.225338/90 has a high softening point land a high viscosity at a high temperature, it is difficult to make the substrate dense. And since the composite of a cordierire crystallized glass with a ceramic filler disclosed in the Japanese Patent Laid-Open Publication No.225339/90 and No.225340/90 is made with adding a ceramic filler to a cordierire having a high softening point, it is also difficult to make the ceramic substrate dense by sintering at a low temperature.

Hence, the ceramic substrate obtained by sintering so as to grow a cordierire-base crystallized glass at a temperature of less than 950° C. required to use Ag as a material for an interconnection inside layer, or less than 1000° C. required to inside layers, does not have a sufficiently small porosity, a sufficient transverse strength, a sufficient moisture resistance and so on, and the oxidation and the migration of its conductor inside layers easily occurs, making the substrate less reliable.

And hitherto, in the above method for growing a crystal from a glass, it is usual to add a nuclear formation material (an aggregate) to a glass component in order to make it easy for a crystal nucleus to be formed in the glass. In this case, however, the heat treatment for nuclear formation such as maintaining a crystal formation temperature for a definite time is usually required, resulting in making the sintering time of the substrate longer and the productivity poorer.

SUMMARY OF THE INVENTION

While the present invention is based on the above description, a brief summary will be set forth.

A ceramic substrate according to the present invention is that which comprises a glass comprising a $MgO$—$Al_2O_3$—$SiO_2$—$B_2O_3$—$R_2O$-base glass(R:alkali metal) and crystals containing a $2MgO.2Al_2O_3.5SiO_2$ crystal (cordierire). In this invitation, in which the softening point of the glass becomes less than 720° C. and the porosity of decreases, so that the substrate becomes dense. And the substrate has a coefficient of thermal expansion close to a silicon substrate and a small specific inductive capacity, and is excellent in transverse strength, water resistance, etc. In addition, due to having a low softening point, a substrate having the above-mentioned characteristics can be produced even by sintering at a temperature of between 800° C. and 1000° C., and a substrate having a circuit interconnection made of Ag or Cu, etc. with a low softening point and a low electrical resistance, can be produced.

As described above, it is an object of the present invention to provide a ceramic substrate which can become sufficiently dense by sintering at less than 1000° C., and even at less than 950° C., has small specific inductive capacity and is excellent in transverse strength, water resistance and so on.

And a method for producing the above ceramic substrate according to the present invention is to mix a glass powder comprising $MgO$, $Al_2O_3$, $SiO_2$, $B_2O_3$, and $R_2O$(R:alkali metal) with a $Al_2O_3$ crystal grain in the prescribed ratio and sinter the same at a temperature of more than 800° C. below 1000° C. In this invitation, by allowing cordierite to grow in the ceramic substrate, the porosity of the glass ceramic can be reduced and the glass ceramic can be densified. And a ceramic substrate having a coefficient of thermal expansion close to a silicon substrate and a small specific inductive capacity, and excellent in transverse strength, water resistance and so on, can be produced.

Another ceramic substrate according to the present invention is that which comprises a glass of a $MgO$—$Al_2O_3$—$SiO_2$—$B_2O_3$—$13\ R_2O$ base glass(R:alkali metal) and crystals containing a $2MgO.2Al_2O_3.5SiO_2$ crystal, in which a $2MgO.2Al_2O_3.5SiO_2$ crystal deposits from the surface of $2MgO.2Al_2O_3.5SiO_2$ filler or the surfaces of $2MgO.2Al_2O_3.5SiO_2$ filler and $Al_2O_3$ filler. In this invention, the softening point of the glass becomes less than 720° C., and the porosity decreases even at a sintering temperature of between 850° C. and 1000° C., so that the substrate becomes dense. And a ceramic substrate having a coefficient of thermal expansion close to silicon and a small specific inductive capacity, and excellent in water resistance, etc. can be produced.

And by this invention, a ceramic substrate having internal circuit interconnection made of Ag or Cu, etc. with a low softening point and a low electrical resistance, can be produced.

As described above, it is another object of the present invention to provide a ceramic substrate which has a coefficient of thermal expansion close to silicon and a small specific inductive capacity, and is excellent in transverse strength, water resistance and so on.

And a method for producing the above ceramic substrate according to the present invention is to mix a glass powder comprising $MgO$, $Al_2O_3$, $SiO_2$, $B_2O_3$, and $R_2O$(R:alkali metal) with a $2MgO.2Al_2O_3.5SiO_2$ crystal grain, or a $2MgO.2Al_2O_3.5SiO_2$ crystal grain and a $2Al_2O_3$ crystal grain in the prescribed ratio and sinter the same at a temperature of more than 850° C. to below 1000° C., so as to grow a $2MgO.2Al_2O_3.5SiO_2$ crystal from the surface of the $2MgO.2Al_2O_3.5SiO_2$ filler or the surface of the $2MgO.2Al_2O_3.5SiO_2$ filler and the $Al_2O_3$ filler. By this invention, the porosity can be reduced and the substrate can be densified. And a ceramic substrate having a coefficient of thermal expansion close to silicon and a small specific inductive capacity, and excellent in water resistance and so on, can be produced.

As described above, it is still another object of the present invention to provide a method for producing the above ceramic substrate, excellent in productivity, wherein the substrate can be dense at a sintering temperature of less than 1000° C., even at around 900° C. in a short time.

Still another ceramic substrate according to the present invention is a substrate comprising a glass and a crystal, which contains mainly a $MgO$—$Al_2O_3$—$SiO_2$—$B_2O_3$—$R_2O$ base glass(R:alkali metal) as the glass, mainly a $2MgO.2Al_2O_3.5SiO_2$ crystal as the crystal and in addition, a $SiO_2$ crystal. In this invention, the softening point of the glass becomes less than 720° C., and the porosity can be reduced and the substrate can be densified even at a sintering temperature of between 850° C. and 1000° C. And a ceramic substrate having a coefficient of thermal expansion close to silicon and a small specific inductive capacity, and excellent in mechanical strength, water resistance, etc. can be produced.

And a method for producing the above ceramic substrate according to the present invention is to mix a glass powder comprising $MgO$, $Al_2O_3$, $SiO_2$, $B_2O_3$, and $R_2O$(R:alkali metal) a $2MgO.2Al_2O_3.5SiO_2$ crystal powder and a $SiO_2$ glass powder and/or a $SiO_2$ crystal powder and sinter the same at a temperature of more than 850° C. to below 1000° C. In this invention, by the sintering, the porosity can be reduced and the substrate can be densified, as a result, a ceramic substrate having the above excellent characteristics of various sorts can be produced. And since a crystal powder which can be a nucleus of growth cordierite is previously added as a filler, the heat treatment time for nuclear formation is unnecessary, resulting in greatly improving productivity, compared with the conventional crystallized glass substrate material.

Still another ceramic substrate according to the present invention is the above substrate comprising a glass and a crystal which contains $Al_2O_3$ and/or $3Al_2O.2SiO_2$ as a crystal. In this invention, the softening point of the glass becomes less than 720° C., and the porosity can be reduced and the substrate can be densified even at a sintering temperature of between 850° C. and 1000° C. And a ceramic substrate having a coefficient of thermal expansion close to silicon and a small specific inductive capacity, and excellent in mechanical strength, water resistance, etc. can be produced.

And a method for producing the above ceramic substrate according to the present invention is to add a $Al_2O_3$ crystal powder and/or a $3Al_2O.2SiO_2$ crystal powder besides the glass powder and the crystal powder described in the above method, mix them and sinter them at a temperature of more than 850° C. to below 1000° C. In this invention, by the sintering, the porosity can be reduced and the substrate can be densified. And a ceramic substrate having the above excellent characteristics of various sorts besides more excellent mechanical strength can be produced. And in the same manner as the above method, since a crystal powder which can be a nucleus of growing cordierire is previously added as a filler, the heat treatment time for nuclear formation is unnecessary, resulting in greatly improving productivity, compared with the conventional crystallized glass substrate material.

Still another ceramic substrate according to the present invention is a substrate comprising a glass and a crystal, which contains a $MgO$—$Al_2O_3$—$SiO_2$—$B_2O_3$—$R_2O$ base glass(R:alkali metal) as the glass, and a $2MgO.2Al_2O_3.5SiO_2$ crystal as the crystal, in which a $2MgO.2Al_2O_3.5SiO_2$ crystal(cordierite) grows from the surfaces of the $2MgO.2Al_2O_3.5SiO_2$ filler and the $3Al_2O_3.2SiO_2$ filler. In this invention, the softening point of the glass becomes less than 720° C., and the porosity decreases even at a sintering temperature of between 850° C. and 1000° C., so that the substrate becomes dense. And a ceramic substrate having a coefficient of thermal expansion close to silicon and a small specific inductive capacity, and excellent in mechanical strength, water resistance, etc. can be produced.

Accordingly by this invention, a ceramic substrate having an internal circuit interconnection made of Ag or Cu, etc. with a low softening point and a low electrical resistance, can be produced.

And a method for producing the above ceramic substrate according to the present invention is to mix a glass powder of 94.9–50.0 wt % containing MgO of 10–20 wt %, $Al_2O_3$ of 10–20 wt %, $SiO_2$ of 40–55 wt %, $B_2O_3$ of 10–20 wt %, $R_2O$(R:alkali metal) of 0.5–5 wt %, a $2MgO.2Al_2O_3.5SiO_2$ crystal grain of 0.1–20 wt % and a $3Al_2O_3.2SiO_2$ crystal grain of 5–30 wt %, and sinter the same at a temperature of more than 850° C. to below 1000° C., so as to grow a $2MgO.2Al_2O_3.5SiO_2$ crystal from the surfaces of the $2MgO.2Al_2O_3.5SiO_2$ filler and the $3Al_2O_3.2SiO_2$ filler. By this invention, the porosity can be reduced and the substrate can be densified. And a ceramic substrate having a coefficient of thermal expansion close to silicon and a small specific inductive capacity, and excellent in mechanical strength, water resistance and so on, can be produced.

BRIEF DESCRIPTION OF THE DRAWINGS

FIG. 43 is a graph indicating the data of X-ray diffraction strength in the X-ray diffraction of the sample obtained in Comparative example 18;

DETAILED DESCRIPTION OF THE INVENTION

Figure 1:
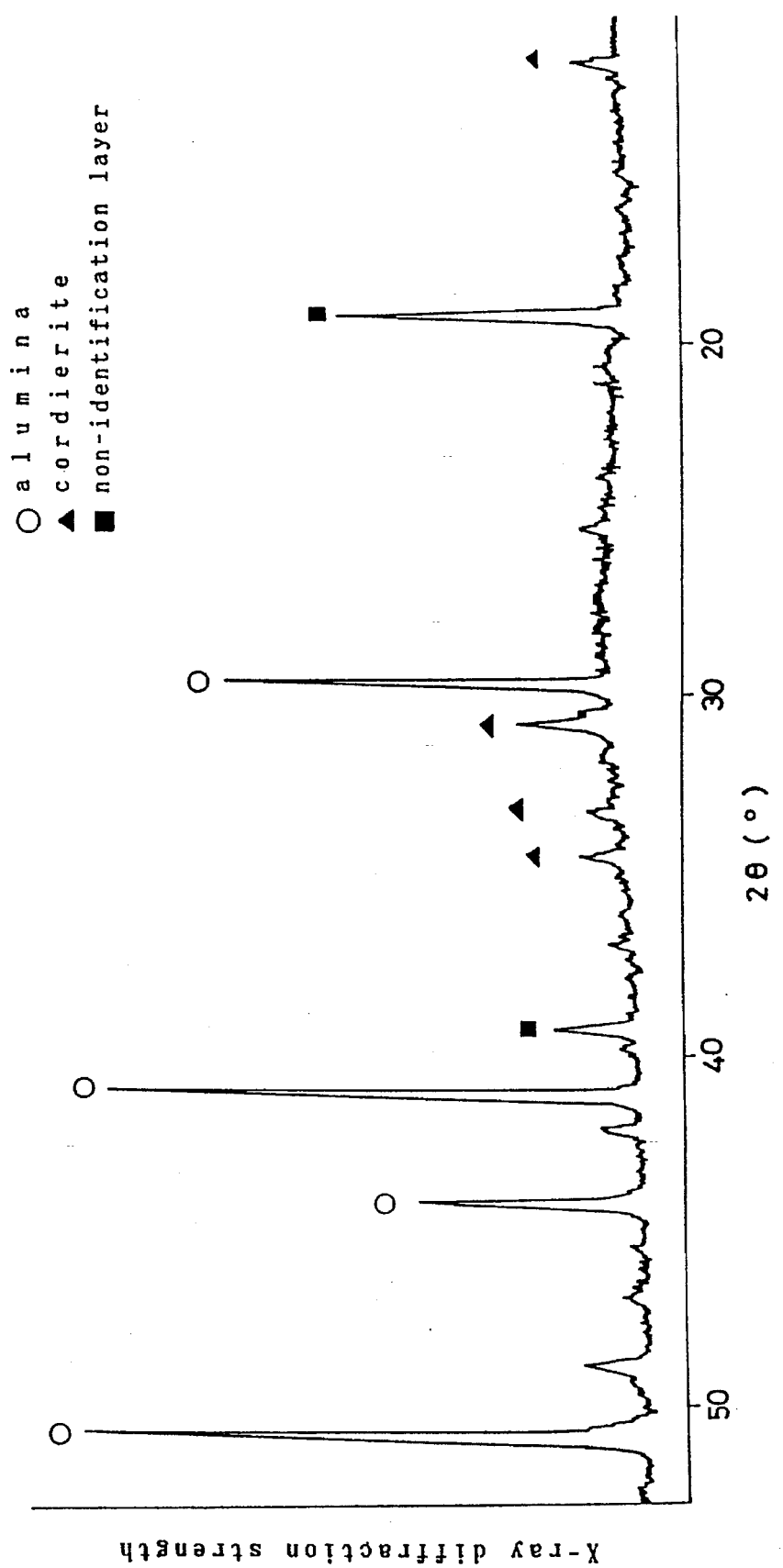
FIG. 1 is a graph indicating the data of X-ray diffraction strength in the X-ray diffraction of the sample obtained in Example 1.
Figure 2:
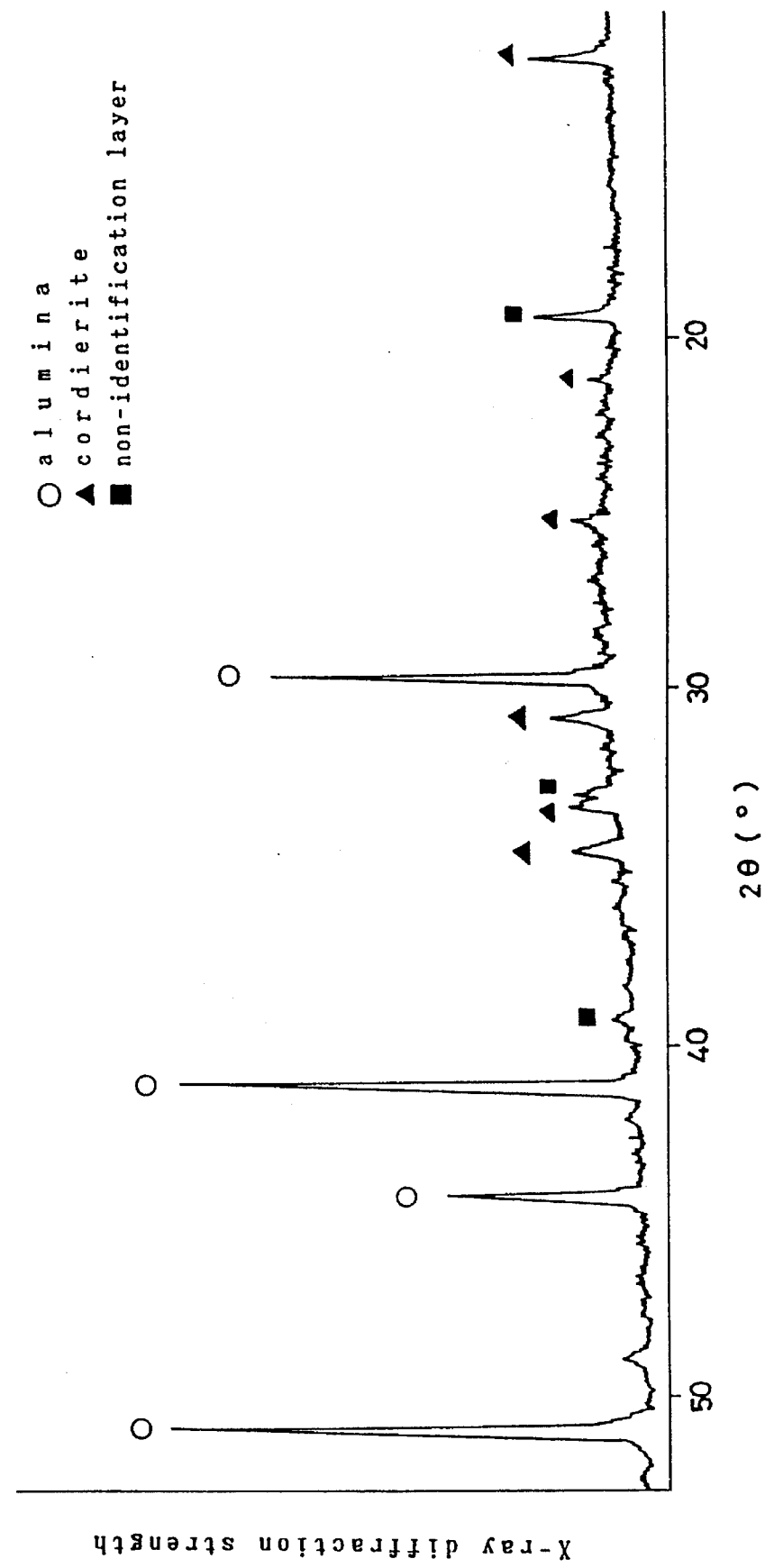
FIG. 2 is a graph indicating the data of X-ray diffraction strength in the X-ray diffraction of the sample obtained in Example 3.
Figure 3:
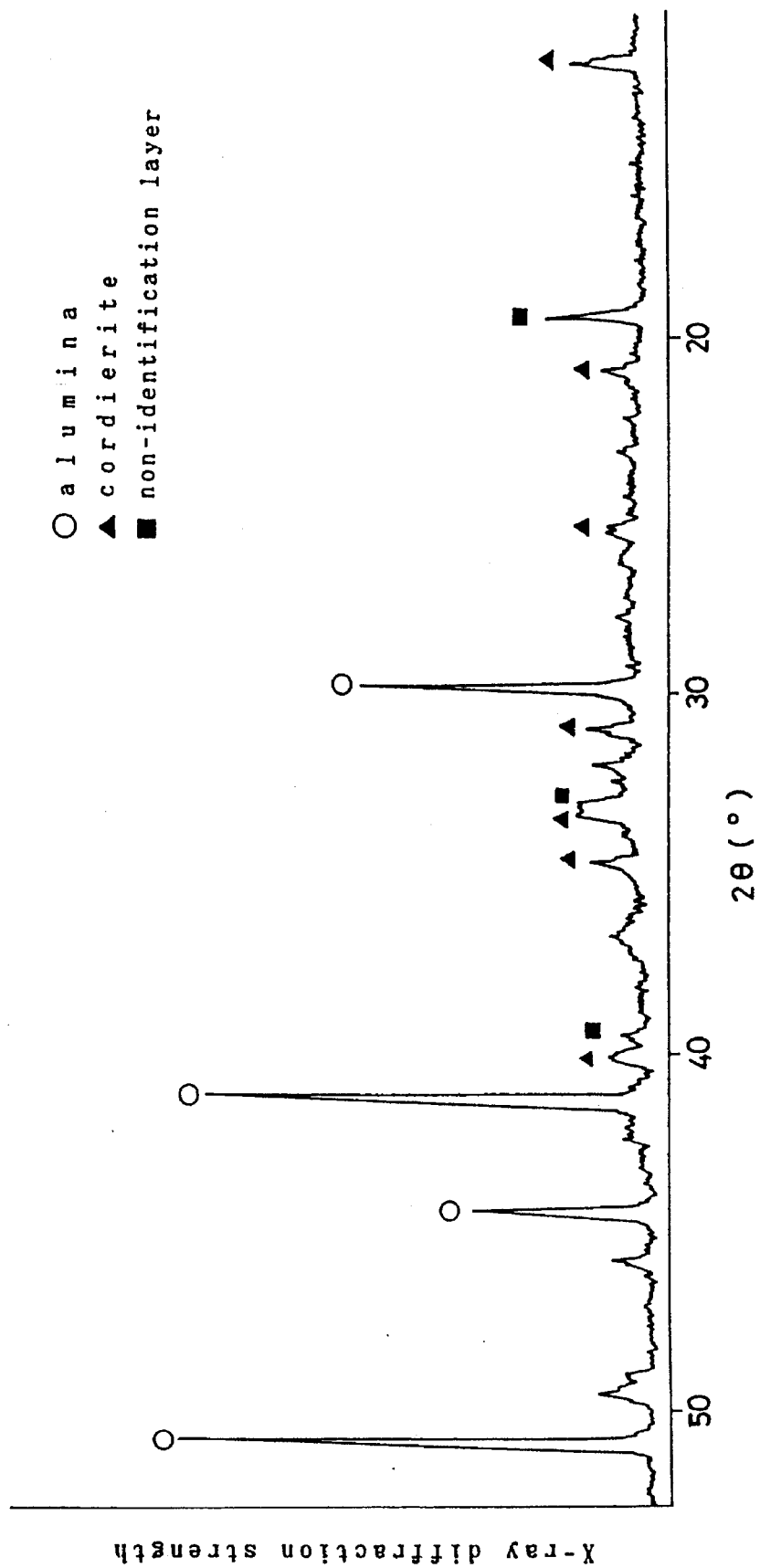
FIG. 3 is a graph indicating the data of X-ray diffraction strength in the X-ray diffraction of the sample obtained in Example 4.
Figure 4:
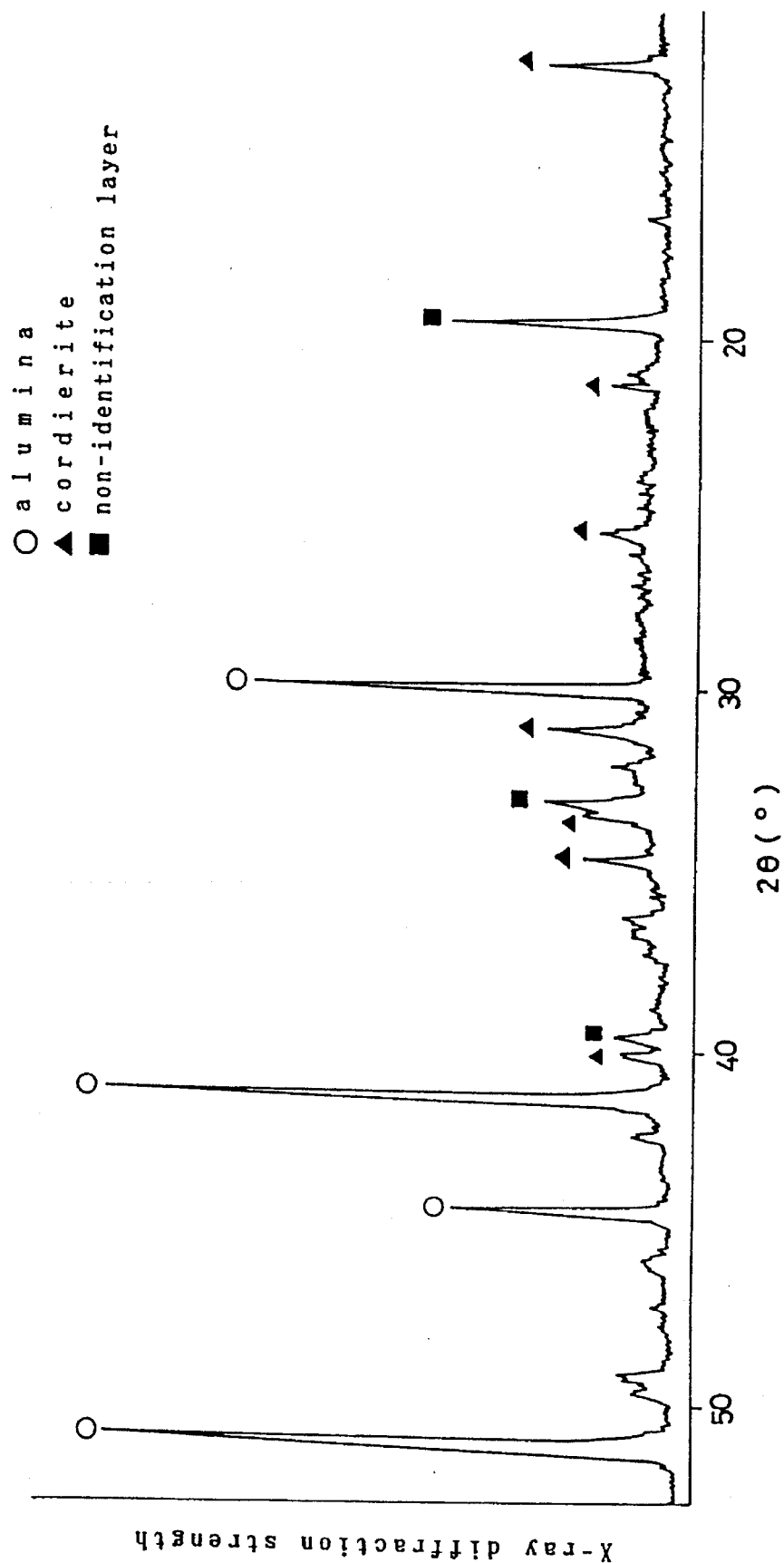
FIG. 4 is a graph indicating the data of X-ray diffraction strength in the X-ray diffraction of the sample obtained in Example 5.
Figure 5:
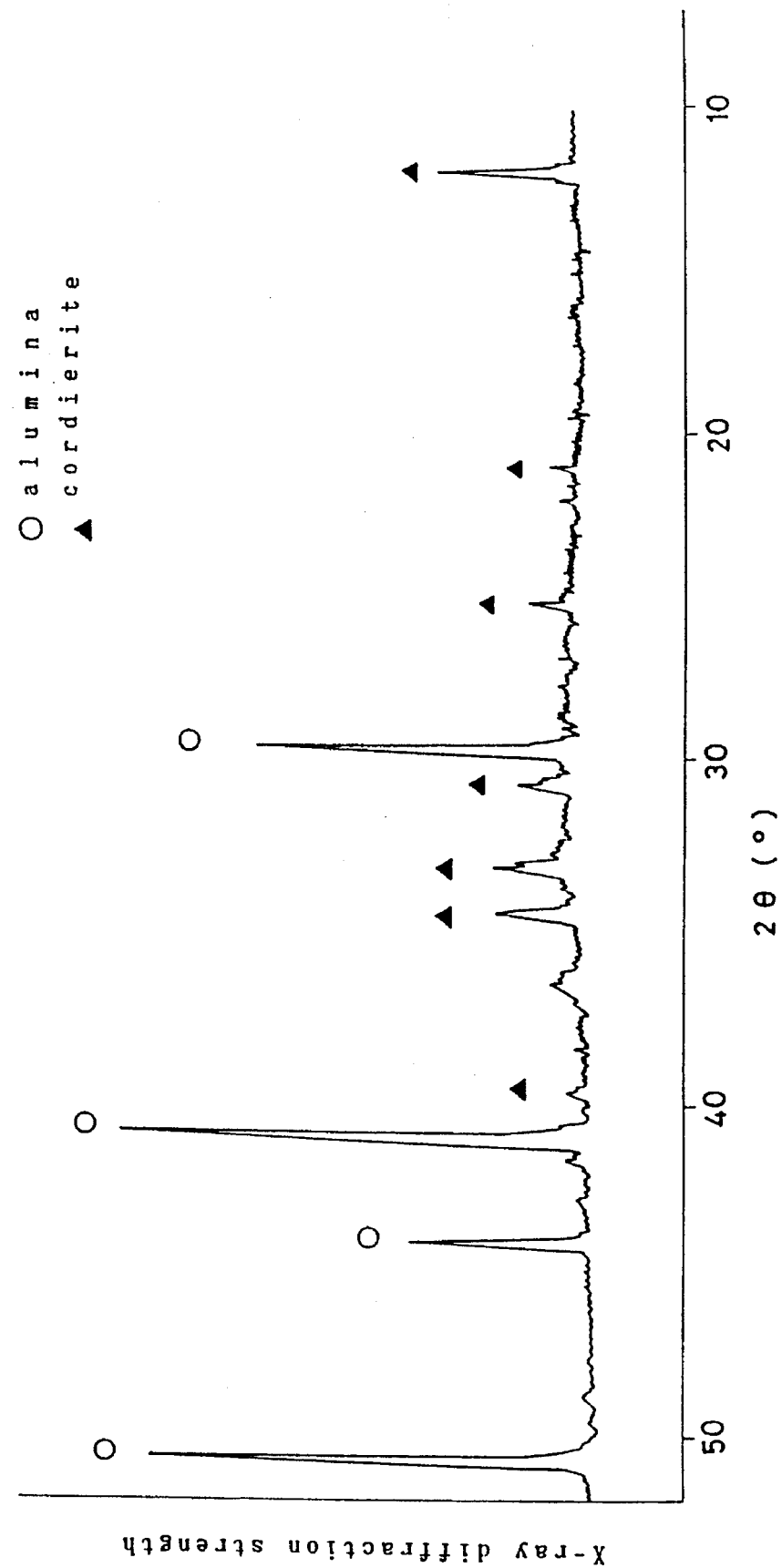
FIG. 5 is a graph indicating the data of X-ray diffraction strength in the X-ray diffraction of the sample obtained in Example 6.
Figure 6:
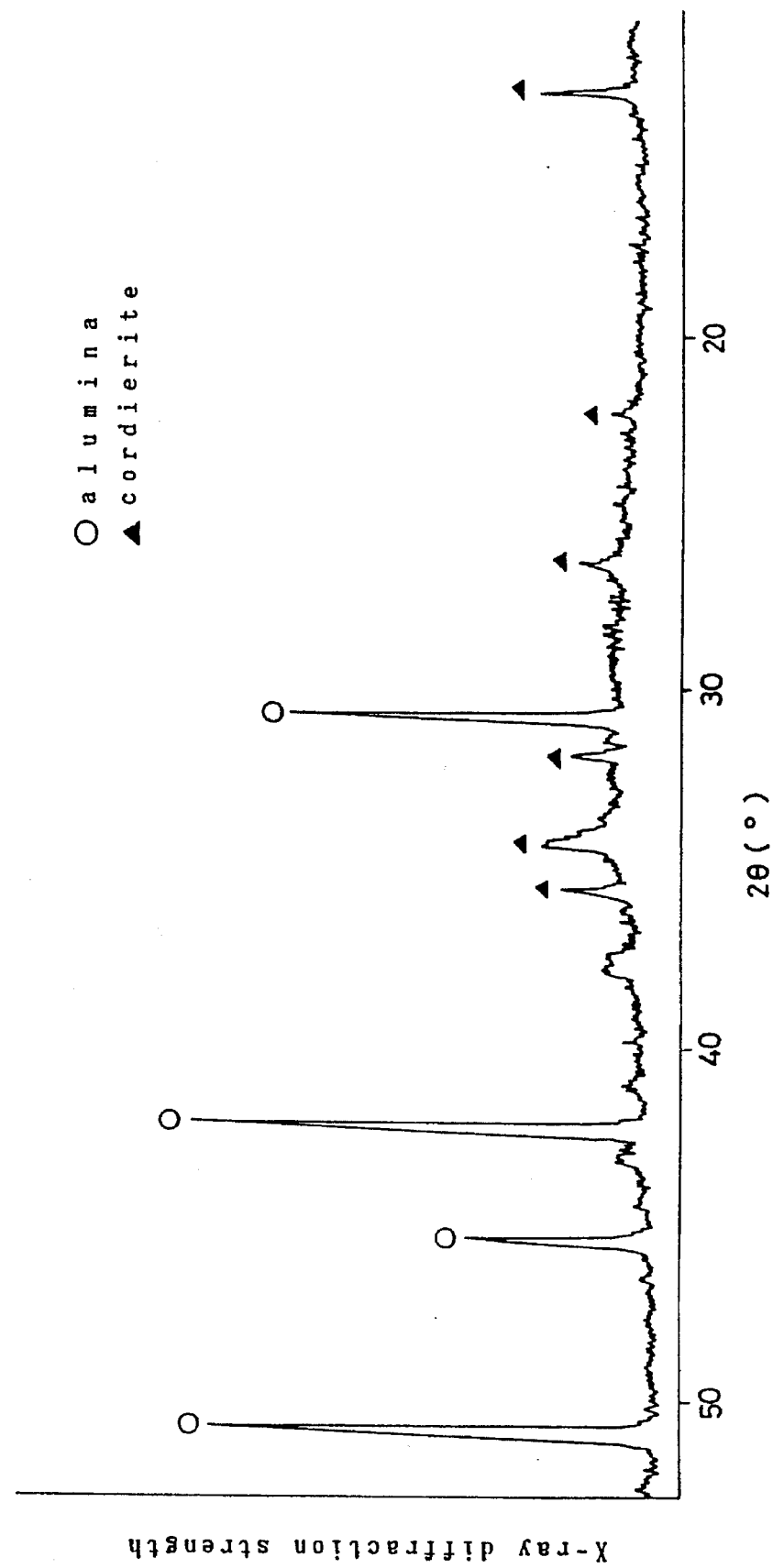
FIG. 6 is a graph indicating the data of X-ray diffraction strength in the X-ray diffraction of the sample obtained in Example 7.
Figure 7:
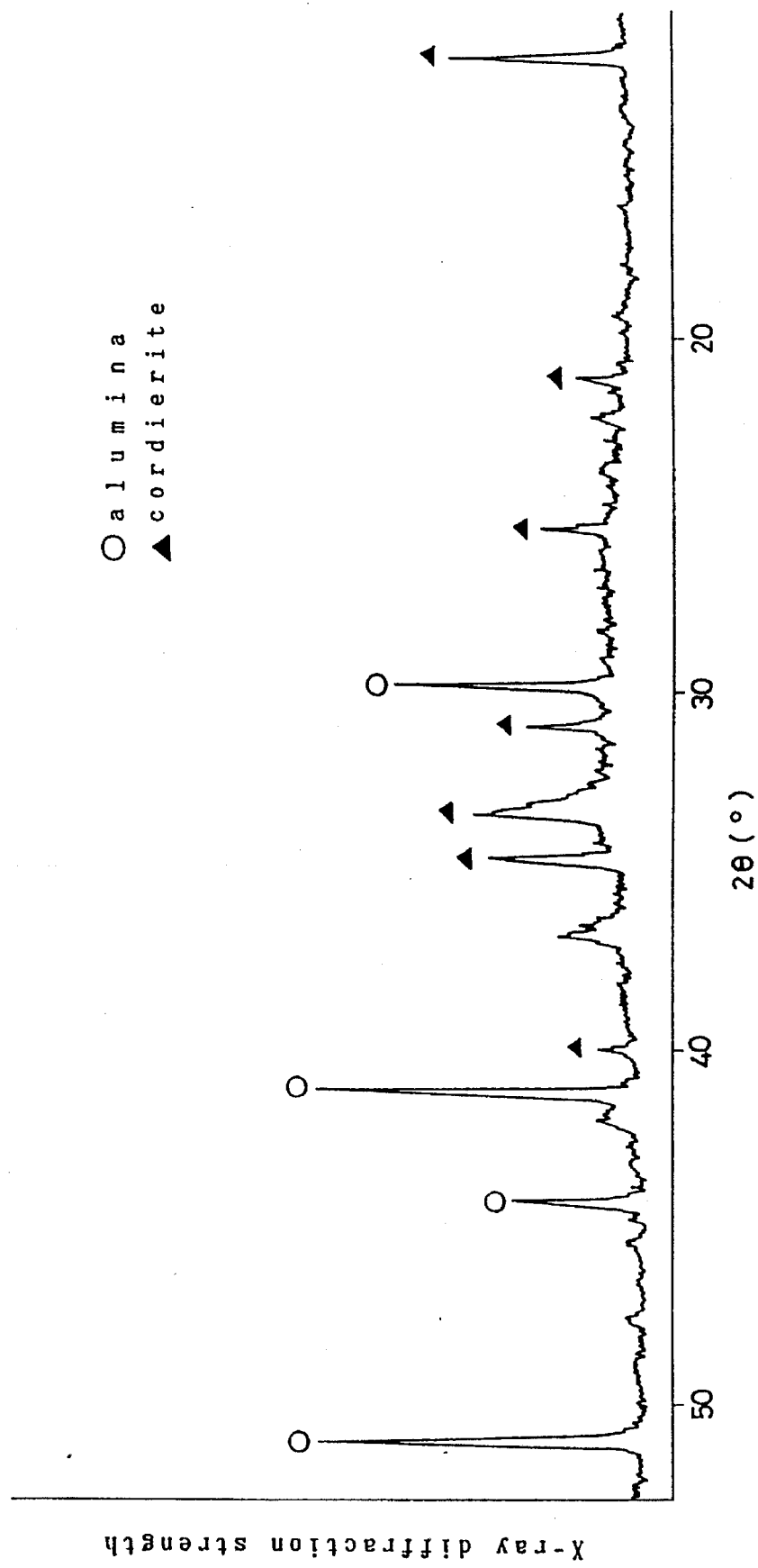
FIG. 7 is a graph indicating the data of X-ray diffraction strength in the X-ray diffraction of the sample obtained in Example 8.
Figure 8:
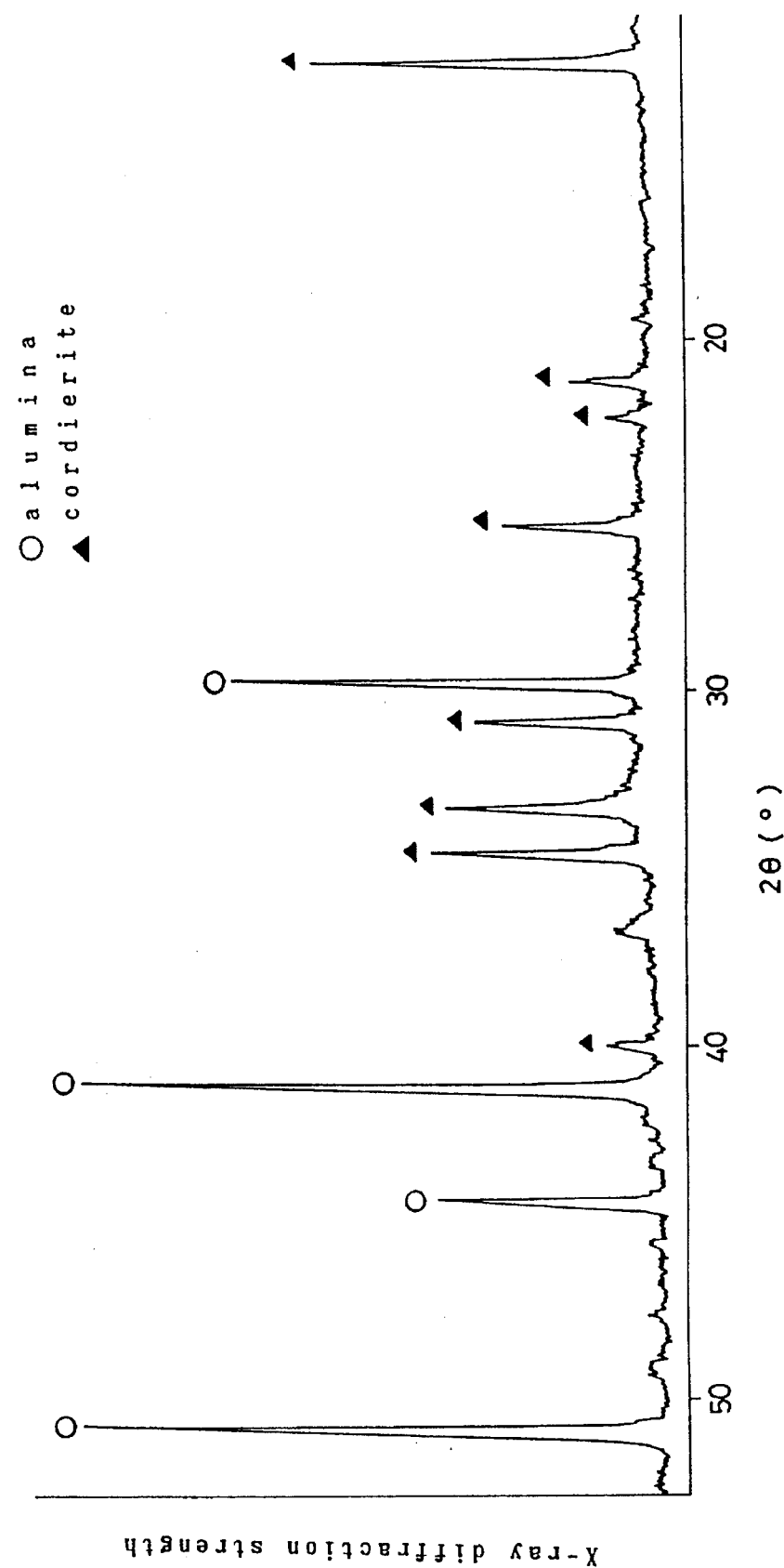
FIG. 8 is a graph indicating the data of X-ray diffraction strength in the X-ray diffraction of the sample obtained in Example 25.
Figure 9:
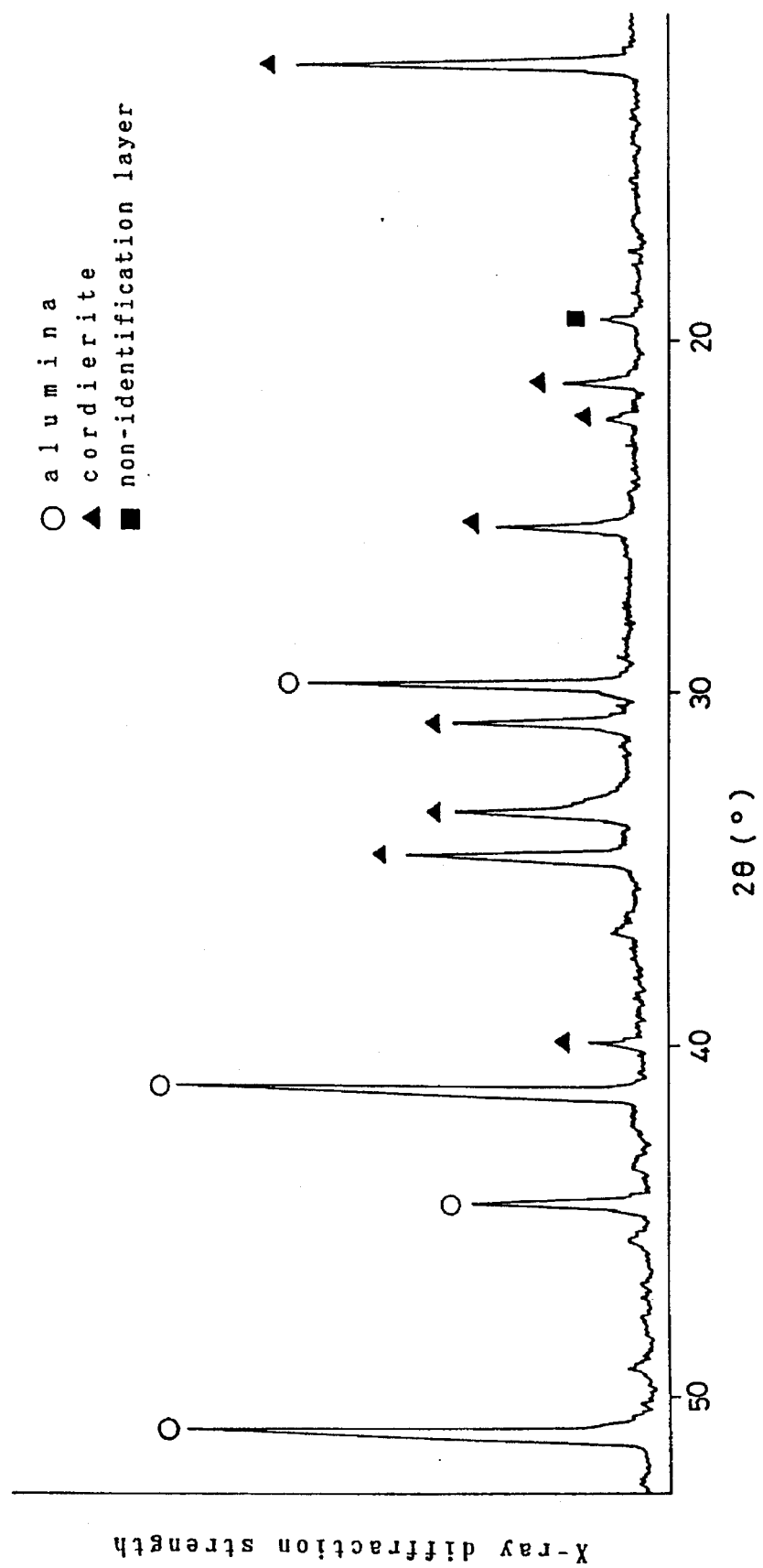
FIG. 9 is a graph indicating the data of X-ray diffraction strength in the X-ray diffraction of the sample obtained in Example 26.
Figure 10:
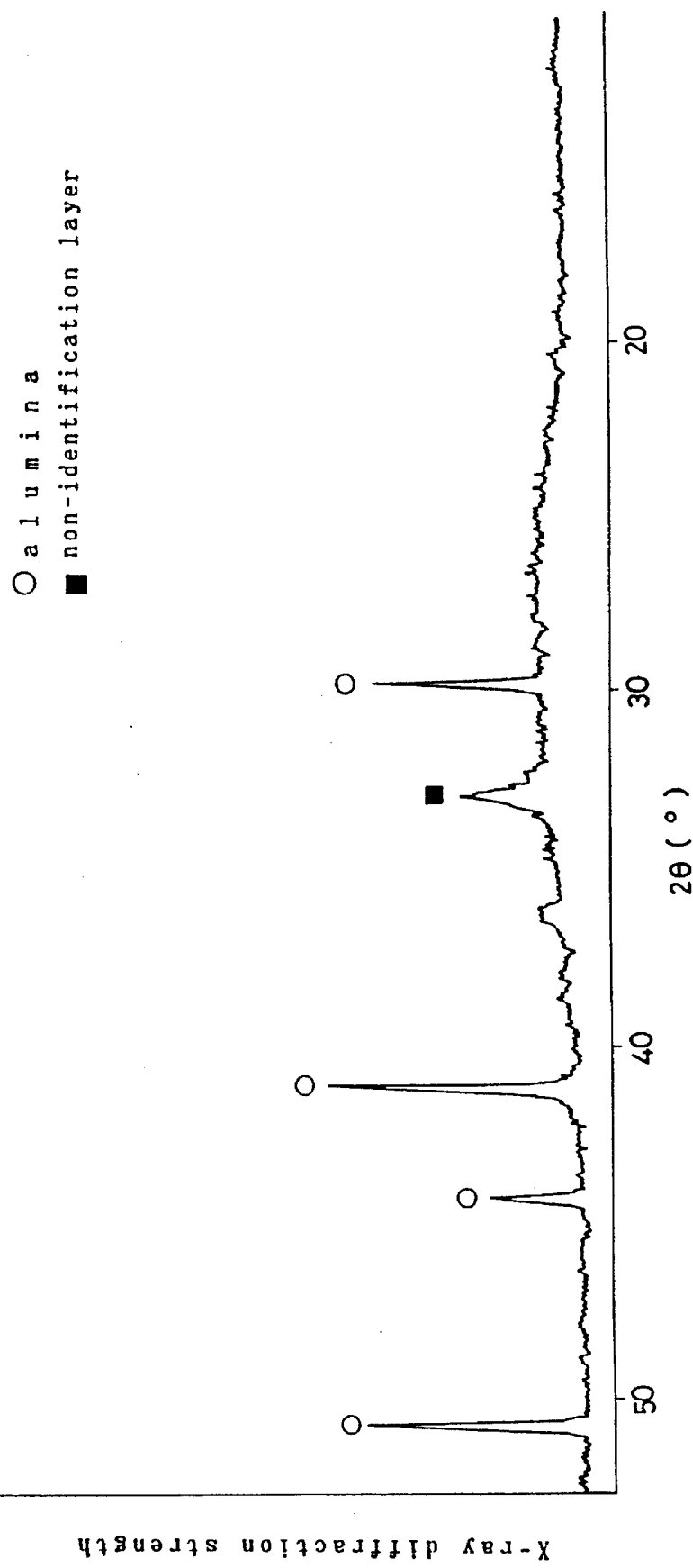
FIG. 10 is a graph indicating the data of X-ray diffraction strength in the X-ray diffraction of the sample obtained in Example 28.

A ceramic substrate according to the present invention (1) comprises a glass comprising a $MgO$—$Al_2O_3$—$SiO_2$—$B_2O_3$—$R_2O$-base glass(R:alkali metal) and a crystal containing cordierire, in which the softening point of the glass becomes less than 720° C., and whose porosity decreases, so that the ceramic substrate becomes dense. And the ceramic substrate has a coefficient of thermal expansion close to a silicon substrate and small specific inductive capacity, and is excellent in transverse strength, water resistance, etc. In addition, due to having a low softening point, the ceramic substrate can obtain the above characteristics even by sintering at a temperature of between 800° C. and 1000° C., which enables the ceramic substrate to have a circuit interconnection made of Ag or Cu, etc.

In a method for producing a ceramic substrate according to the present invention (1), since a glass powder comprising $MgO$, $Al_2O_3$, $SiO_2$, $B_2O_3$, and $R_2O$ (R:alkali metal) and a $Al_2O_3$ crystal grain are mixed in the prescribed ratio and sintered at a temperature of more than 800° C. to below 1000° C., cordierite deposits in the ceramic substrate, which makes the porosity of the glass ceramic decrease and the glass ceramic dense, resulting in producing a ceramic substrate having the above excellent characteristics of various sorts.

As for the composition of the glass powder in the production of the above ceramic substrate, MgO of over 30 wt % leads to a high softening point, and insufficient densification, making the specific inductive capacity large, and MgO of below 10 wt % leads to no growth of cordierire, making the coefficient of thermal expansion large. $Al_2O_3$ of over 20 wt % leads to a high softening point and insufficient densification at a sintering temperature of less than 1000° C., making the transverse strength small, and $Al_2O_3$ of below 5 wt % leads to no deposition of cordierite, making the coefficient of thermal expansion large. $SiO_2$ of over 55 wt % leads to a high softening point and insufficient densification at a sintering temperature of less than 1000° C., making the transverse strength small, and $SiO_2$ of below 40 wt % leads to a large specific inductive capacity and a large coefficient of thermal expansion. $B_2O_3$ of over 20 wt % leads to deterioration of water resistance of the glass and a phase splitting of the glass in the process of production, making the composition heterogeneous, and $B_2O_3$ of below 10 wt % leads to a high softening point and insufficient densification at a sintering temperature of less than 1000° C., making the transverse strength small. $R_2O$ has interactions with $MgO$, $Al_2O_3$, $SiO_2$, $B_2O_3$, and especially the synergistic effect with $B_2O_3$ makes the softening point lower, but $R_2O$ of over 5 wt % leads to deteriorating the water resistance of the ceramic substrate.

Accordingly, the composition of the Glass powder materials preferably consists of MgO of 10–30 wt %, $Al_2O_3$ of 5–20 wt %, $SiO_2$ of 40–55 wt %, $B_2O_3$ of 10–20 wt % and $R_2O$ of 0–5 wt %, and more preferably, MgO of 10–20 wt %, $Al_2O_3$ of 10–20 wt %, $SiO_2$ of 40–55 wt %, $B_2O_3$ of 10–20 wt % and $R_2O$ of 1–5 wt %.

Besides, in the above method for producing the ceramic substrate (1), $Al_2O_3$ was selected as a crystal of filler in order to allow cordierite to Grow by the interaction of the glass with the filler so as to obtain the preferable characteristics as a ceramic substrate (specific inductive capacity of less than 7.0, coefficient of thermal expansion of around 5.0–6.0, sintering temperature of below 1000° C. and transverse strength of more than 20 kgf/mm$^2$).

As for the proportion of Glass and crystal in the materials, in order to obtain a ceramic substrate having a transverse strength of more than 20 kgf/mm$^2$, it is preferable to mix a glass of 60–80 wt % with a crystal of 40–20 wt %.

Hereupon, water resistance is defined as a property that a glass does not dissolve in water and a criterion for evaluating whether a liquid infiltrating into the porous part of glass has no effect (oxidation and migration) on the conductor inside layers.

Another ceramic substrate according to the present invention (2) is a substrate comprising a glass and a crystal which contains a $MgO$—$Al_2O_3$—$SiO_2$—$B_2O_3$—$R_2O$-base glass(R:alkali metal) as the glass and a $2MgO.2Al_2O_3.5SiO_2$ crystal as the crystal, and in which a $2MgO.2Al_2O_3.5SiO_2$ crystal (cordierire) grows from the surface of $2MgO.2Al_2O_3.5SiO_2$ filler or the surfaces of $2MgO.2Al_2O_3.5SiO_2$ filler and $Al_2O_3$ filler, and the softening point of the glass becomes less than 720° C., and whose porosity decreases even at a sintering temperature of between 850° C. and 1000° C., so that the ceramic substrate becomes dense, having a coefficient of thermal expansion close to silicon and a small specific inductive capacity, and excellent in water resistance, etc.

In a method for producing the above ceramic substrate according to the present invention (2), since a glass powder comprising $MgO$, $Al_2O_3$, $SiO_2$, $B_2O_3$ and $R_2O$(R:alkali metal) and a $2MgO.2Al_2O_3.5SiO_2$ crystal grain, or a $2MgO.2Al_2O_3.5SiO_2$ crystal grain and a $Al_2O_3$ crystal grain are mixed in the prescribed ratio and sintered at a temperature of more than 850° C. to below 1000° C., so as to grow cordierire from the surface of the $2MgO.2Al_2O_3.5SiO_2$ filler or the surfaces of the $2MgO.2Al_2O_3.5SiO_2$ filler and the $Al_2O_3$ filler. The sintering makes the porosity decrease and the ceramic substrate dense, as a result, a ceramic substrate having the above excellent characteristics of various sorts can be produced. And since a crystal grain which can be a nucleus of depositing cordierire is previously added as a filler, the heat treatment time for nuclear formation is unnecessary, resulting in greatly improving productivity, compared with the conventional crystallized glass substrate material. In addition, in the case of adding an $Al_2O_3$ filler, the $Al_2O_3$ filler also acts as a nucleus of growing cordierire.

In the method for producing the ceramic substrate (2), the composition of the glass powder for a material preferably consists of MgO of 10–30 wt %, $Al_2O_3$ of 5–20 wt %, $SiO_2$ of 40–55 wt %, $B_2O_3$ of 10–20 wt % and $R_2O$ of $0<R_2O \leq 5$ wt %.

In the glass powder, MgO of over 30 wt % leads to a high softening point and insufficiently densification, making the specific inductive capacity tend to be large, and MgO of below 10 wt % leads to no deposition of cordierire, making the coefficient of thermal expansion tend to be large. $Al_2O_3$ of over 20 wt % leads to a high softening point and insufficient densification at a sintering temperature of less than 1000° C., making the transverse strength tend to be small, and $Al_2O_3$ of below 5 wt % leads to no growth of cordierire, making the specific inductive capacity tend to be large. $SiO_2$ of over 55 wt % leads to a high softening point and insufficient densification at a sintering temperature of less than 1000° C., making the transverse strength tend to be small, and $SiO_2$, of below 40 wt % leads to making the specific inductive capacity and the coefficient of thermal expansion tend to be large. $B_2O_3$ of over 20 wt % leads to a tendency to lower chemical stability, and $B_2O_3$ of below 10 wt % leads to a high softening point and insufficient densification at a sintering temperature of less than 1000° C., making the transverse strength tend to be small. $R_2O$ has interactions with MgO, $Al_2O_3$, $SiO_2$, and $B_2O_3$, and especially the synergistic effect thereof with $B_2O_3$ makes the softening point lower. Therefore, it is necessary for it to be contained in the glass powder, but $R_2O$ of over 5 wt % leads to a tendency to deteriorate water resistance.

Cordierire was selected as a crystal of filler, because by making the added cordierire act a crystal nucleus in sintering, the growth rate of cordierire from the glass is remarkably raised and the coefficient of thermal expansion of the obtained sintered body becomes close to the value of silicon($3.5 \times 10^{-6}$/°C.) by short time sintering, as a result, a substrate material suitable for chip packaging such as flip chip method and the like can be obtained.

$Al_2O_3$ was selected as a crystal of filler in order to allow cordierite to easily grow by the interaction with a glass and improve the strength characteristic of ceramic substrate.

As for the proportion of crystal and glass, in order to make transverse strength more than 19 kgf/mm$^2$, as filler, the proportion of alumina is 0–40 wt % and that of cordierire is 0.1–20 wt %, and that of glass is the rest of the total 100 wt %.

Still another ceramic substrate according to the present invention (3) is a ceramic substrate comprising a glass and a crystal, which contains mainly a MgO—$Al_2O_3$—$SiO_2$—$B_2O_3$—$R_2O$-base glass(R:alkali metal) as the glass and mainly a $2MgO.2Al_2O_3.5SiO_2$ crystal as the crystal, and in addition, a $SiO_2$ glass and/or a $SiO_2$ crystal, in which the softening point of the glass becomes less than 720° C., and whose porosity decreases even at a sintering temperature of between 850° C. and 1000° C., so that the ceramic substrate becomes dense. And the ceramic substrate has a coefficient of thermal expansion close to silicon and a small specific inductive capacity, and excellent in mechanical strength, water resistance, etc.

In a method for producing the above ceramic substrate according to the present invention (3), since a glass powder comprising MgO, $Al_2O_3$, $SiO_2$, $B_2$, $O_3$ and $R_2O$ (R:alkali metal), a $2MgO.2Al_2O_3.5SiO_2$ crystal powder and a $SiO_2$ glass power and/or a $SiO_2$ crystal powder are mixed and sintered at a temperature of more than 850° C. to below 1000° C., the sintering makes the porosity decrease and the ceramic substrate dense. As a result, the ceramic substrate can obtain the above excellent characteristics of various sorts. And since a crystal powder which can be a nucleus of depositing cordierite is previously added as filler, the heat treatment time for nuclear formation is unnecessary, resulting in greatly improving productivity, compared with the conventional crystallized glass substrate material.

Still another ceramic substrate according to the present invention (4) is a ceramic substrate comprising a glass and a crystal, which contains $Al_2O_3$ and/or $3Al_2O_3.2SiO_2$ as a crystal besides the glass and crystal in the ceramic substrate (3), in which the softening point of the glass becomes less than 720° C., and whose porosity decreases even at a sintering temperature of between 850° C. and 1000° C., so that ceramic substrate becomes dense. And the ceramic substrate has a coefficient of thermal expansion close to silicon and a small specific inductive capacity, and is more excellent in mechanical strength, and also excellent in water resistance, etc.

In a method for producing the above ceramic substrate according to the present invention (4), since a $Al_2O_3$ crystal powder and/or a $3Al_2O_3.2SiO_2$ crystal powder besides the glass powder and crystal powder described in the above method (3) are added, mixed and sintered at a temperature of more than 850° C. to below 1000° C. the sintering makes the porosity decrease and the ceramic substrate dense. And besides more excellent mechanical strength, the ceramic substrate can obtain the above excellent characteristics of various sorts. And in the same manner as the above method (3), since a crystal powder which can be a nucleus of growth cordierire is previously added as an filler, the heat treatment time for nuclear formation is unnecessary, resulting in greatly improving productivity, compared with the conventional crystallized glass substrate material.

In the methods for producing the ceramic substrates (3) and (4), the composition of the glass powder for a material comprising MgO, $Al_2O_3$, $SiO_2$, $B_2O_3$ and $R_2O$(R:alkali metal) preferably consists of MgO of 10–30 wt %, $Al_2O_3$ of 5–20 wt %, $SiO_2$ of 40–55 wt %, $B_2O_3$ of 10–20 wt % and $R_2O$ of $0<R_2\leq5$ wt %.

In the glass powder, MgO of over 30 wt % leads to a high softening point and insufficient densification, making the specific inductive capacity tend to be large, while MgO of below 10 wt % leads to no growth of cordierire, making the coefficient of thermal expansion tend to be large. $Al_2O_3$ of over 20 wt % leads to a high softening point and insufficient densification at a sintering temperature of less than 1000° C., making the transverse strength tend to be small, while $Al_2O_3$ of below 5 wt % leads to no growth of cordierire, making the specific inductive capacity tend to be large. $SiO_2$ of over 55 wt % leads to a high softening point and insufficient densification at a sintering temperature of less than 1000° C., making the transverse strength tend to be small, while $SiO_2$ of below 40 wt % leads to making the specific inductive capacity and the coefficient of thermal expansion tend to be large. $B_2O_3$ of over 20 wt % leads to a tendency to lower chemical stability, while $B_2O_3$ of below 10 wt % leads to a high softening point and insufficient densification at a sintering temperature of less than 1000° C., making the transverse strength tend to be small. $R_2O$ has interactions with MgO, $Al_2O_3$, $SiO_2$ and $B_2O_3$, and especially the synergistic effect thereof with $B_2O_3$ makes the softening point lower. Therefore, it is necessary for $R_2O$ of more than 0.5 wt % to be contained in the glass powder, but $R_2O$ of over 5 wt % leads to a tendency to deteriorate water resistance.

A $2MgO.2Al_2O_3.5SiO_2$ crystal powder was selected as a material power, because by making the added $2MgO.2Al_2O_3.5SiO$ crystal powder act as a crystal nucleus in sintering, the growth rate of cordierire from the glass is remarkably raised and the coefficient of thermal expansion of the obtained sintered body becomes close to the value of silicon ($3.5 \times 10^{-6}$/°C.) by short time sintering, as a result, a ceramic substrate suitable for chip packaging such as flip chip method and the like can be obtained.

A $Al_2O_3$ crystal powder and/or $3Al_2O_3.2SiO_2$ crystal powder were selected as a material powder, because interaction thereof with a glass results in allowing cordierire to easily grow and improving the strength characteristic of the ceramic substrate.

A $SiO_2$ glass powder and/or a $SiO_2$ crystal powder were selected as a material powder, because the action thereof with the glass is smaller than that of $2MgO.2Al_2O_3.5SiO_2$ crystal powder, $Al_2O_3$ crystal powder or $3Al_2O_3.2SiO_2$ crystal powder, as a result, without making the effect of allowing cordierire to easily grow lower, it is possible to make the ceramic substrate after being sintered have a low specific inductive capacity.

The proportion of each material powder in the method for producing the ceramic substrate (3), in order to make the transverse strength more than 18 kgf/mm², is preferably glass powder of 60–98 wt %, $2MgO.2Al_2O_3.5SiO_2$ crystal powder of 0.1–20 wt % and $SiO_2$ glass powder and/or $SiO_2$ crystal powder of more than 1 wt % below 40 wt %.

Glass powder of over 98 wt % leads to making the transverse strength tend to be lowered, while glass powder of below 60 wt % leads to an insufficiently low softening point, insufficient densification at a temperature of less than 1000° C., making the transverse strength tend to be small.

The proportion of each material powder in the method producing the ceramic substrate (4), similarly in order to make the transverse strength more than 18 kgf/mm², is preferably glass powder of 60–98 wt %, $2MgO.2Al_2O_3.5SiO_2$ crystal powder of 0.1–20 wt %, $SiO_2$ glass powder and/or $SiO_2$ crystal powder of more than 1 wt % below 40 wt % and $Al_2O_3$ crystal powder and/or $3Al_2O_3.2SiO_2$ crystal powder of $0<3Al_2O_3.2SiO_2 \leq 40$ wt %.

Still another ceramic substrate according to the present invention (5) is a ceramic substrate comprising a glass and a crystal, which contains a $MgO-Al_2O_2-SiO_2-B_2O_3-R_2O$-base glass(R:alkali metal) as the glass and a $2MgO.2Al_2O_3.5SiO_2$ crystal as the crystal, and in which a $2MgO.2Al_2O_3.5SiO_2$ crystal (cordierite) grows from the surfaces of the $2MgO.2Al_2O_3.5SiO_2$ filler and the $3Al_2O_3.2SiO_2$ filler and the softening point of the glass becomes less than 720° C., and whose porosity decreases even at a sintering temperature of between 850° C. and 1000° C., so that the ceramic substrate becomes dense, having a coefficient of thermal expansion close to silicon and a small specific inductive capacity and excellent in water resistance, etc.

In a method for producing the above ceramic substrate according to the present invention (5), since a glass powder of 94.9–50.0 wt % containing MgO of 10–20 wt %, $Al_2O_3$ of 10–20 wt %, $SiO_2$ of 40–55 wt %, $B_2O_3$ of 10–20 wt % and $R_2O$(R:alkali metal) of 0.5–5 wt %, a $2MgO.2Al_2O_3.5SiO_2$ crystal grain of 0.1–20 wt % and $2Al_2O_3.2SiO_2$ crystal grain of 5–30 wt % are mixed and sintered at a temperature of more than 850° C. to below 1000° C., so as to grow a $2MgO.2Al_2O_3.5SiO_2$ crystal from the surfaces of the $2MgO.2Al_2O_3.5SiO_2$ filler and the $3Al_2O_3.2SiO_2$ filler, the sintering makes the porosity decrease and the ceramic substrate dense. As a result, the ceramic substrate can obtain the above excellent characteristics of various sorts. And since a crystal grain which can be a nucleus of growth cordierire is previously added as an filler, the heat treatment time for nuclear formation is unnecessary, resulting in greatly improving productivity, compared with the conventional crystallized glass substrate material.

In the method for producing the ceramic substrate (5), the composition of the glass powder for a material preferably consists of MgO of 10–20 wt %, $Al_2O_3$ of 10–20 wt %, $SiO_2$ of 40–55 wt %, $B_2O_3$ of 10–20 wt % and $R_2O$ of 0.5–5 wt %.

In the glass powder, MgO of over 20 wt % leads to a high softening point and insufficient densification, making the transverse strength small, and MgO of below 10 wt % leads to no growth of cordierire, making the coefficient of thermal expansion large. $Al_2O_3$ of over 20 wt % leads to a high softening point and insufficient densification at a sintering temperature of less than 1000° C., making the transverse strength small, and $Al_2O_3$ of below 10 wt % leads to no growth of cordierire, making the coefficient of thermal expansion large. $SiO_2$ of over 55 wt % leads to a high softening point and insufficient densification at a sintering temperature of less than 1000° C., making the transverse strength small, and $SiO_2$ of below 40 wt % leads to making the specific inductive capacity and the coefficient of thermal expansion large. $B_2O_3$ of over 20 wt % leads to lowered chemical stability, and $B_2O_3$ of below 10 wt % leads to a high softening point and insufficient densification at a sintering temperature of less than 1000° C., making the transverse strength small. $R_2O$ has interactions with MgO, $Al_2O_3$, $SiO_2$ and $B_2O_3$, and especially the synergistic effect thereof with $B_2O_3$ makes the softening point lower. Therefore, it is necessary for $R_2O$ of more than 0.5 wt % to be contained in the glass powder, but $R_2O$ of over 5 wt % leads to deterioration of water resistance.

Cordierite was selected as a crystal of filler, because by making the added cordierire act as a crystal nucleus in sintering, the growth rate of cordierite from the glass is raised and the coefficient of thermal expansion of the obtained sintered body becomes close to the value of silicon ($3.5 \times 10^{-6}$/°C.)by short time sintering, as a result, a substrate material suitable for chip packaging such as flip method and the like can be obtained.

$3Al_2O_3.2SiO_2$ (mullite) was selected as a crystal of filler because the interaction thereof with a glass results in allowing cordierite to easily grow and making the coefficient of thermal expansion of the ceramic substrate close to that of Si.

The proportion of crystal and glass, in order to make the transverse strength more than 17 kgf/mm², is preferably mullite of 5–30 wt % and cordierire of 0.1–20 wt % as filler, and glass of the rest of the total 100 wt %.

DESCRIPTION OF PREFERRED EMBODIMENTS

Examples and comparative examples of a ceramic substrate and a method for producing the same according to the present invention are described below.

A glass powder comprising MgO, $Al_2O_3$, $SiO_2$, $B_2O_3$ and $R_2O$(R:alkali metal) and having a mean particle diameter of 0.1–10 μm, and a crystal grain of $Al_2O_3$ having a mean particle diameter of 1–10 μm, were mixed in the ratio shown in Table 1.

Next, an adequate amount of organic binder, plasticizer and solvent respectively were added to the mixture and then, the same was kneaded to be a slurry of about 10,000 cps.

Next, the slurry was molded a sheet 0.2 mm thick by a doctor blade method and dried at 80° C. for about 10 minutes. Thereafter, the sheet was sintered at a temperature raised at a speed of 10° C./min and at about 850°–950° C. for 30–240 minutes. Thus, the production of the sintered body of ceramic substrate was completed.

Subsequently, the growth of a cordierire crystal on the ceramic substrate produced by the above method was confirmed by X-ray diffraction. And the porosity, specific inductive capacity at a frequency of 1 MHz, coefficient of thermal expansion, transverse strength and water resistance of the ceramic substrate were measured. The porosity was determined by an Archimedes' method. The specific inductive capacity was measured with an impedance analyzer. The average of coefficients of thermal expansion at from the room temperature to 350° C. was measured with a linear expansion meter by contact. The transverse strength was measured by 3-point bending test. And the water resistance was evaluated with the decrease in weight after keeping a test specimen in the boiling water for a definite time, and the substrates having a decrease of more than 0.01% were rejected.

TABLE 1-1

| Sample | mixing proportion of glass materials | | | | | glass/filler mixing ratio (weight ratio) |
|---|---|---|---|---|---|---|
| | MgO (wt %) | $Al_2O_3$ (wt %) | $SiO_2$ (wt %) | $B_2O_3$ (wt %) | $R_2O$ (wt %) | |
| Example 1 | 11.4 | 19.0 | 45.6 | 20.0 | $K_2O$ 4.0 | 60/40 |
| 2 | 15.6 | 19.5 | 42.9 | 18.0 | $K_2O$ 4.0 | 60/40 |
| 3 | 11.7 | 15.6 | 50.7 | 18.0 | $K_2O$ 4.0 | 60/40 |
| 4 | 19.5 | 11.7 | 46.8 | 18.0 | $K_2O$ 4.0 | 60/40 |
| 5 | 15.6 | 11.7 | 50.7 | 18.0 | $K_2O$ 4.0 | 60/40 |
| 6 | 16.0 | 16.0 | 48.0 | 16.0 | $K_2O$ 4.0 | 60/40 |
| 7 | 16.0 | 16.0 | 48.0 | 16.0 | $K_2O$ 4.0 | 70/30 |
| 8 | 16.0 | 16.0 | 48.0 | 16.0 | $K_2O$ 4.0 | 80/20 |
| 9 | 17.0 | 17.0 | 51.0 | 10.0 | $K_2O$ 5.0 | 70/30 |
| 10 | 15.7 | 15.7 | 47.6 | 20.0 | $K_2O$ 1.0 | 70/30 |
| 11 | 17.0 | 17.0 | 51.0 | 10.0 | $Na_2O$ 5.0 | 80/20 |
| 12 | 15.8 | 15.8 | 47.9 | 20.0 | $Na_2O$ 0.5 | 70/30 |
| 13 | 17.0 | 17.0 | 51.0 | 10.0 | $Li_2O$ 5.0 | 80/20 |
| 14 | 15.8 | 15.8 | 47.9 | 20.0 | $Li_2O$ 0.5 | 70/30 |
| 15 | 16.7 | 16.7 | 49.6 | 14.0 | $K_2O$ 2.0 + $Na_2O$ 1.0 | 60/40 |
| 16 | 17.2 | 17.2 | 50.6 | 12.0 | $Na_2O$ 2.0 + $Li_2O$ 1.0 | 70/30 |
| 17 | 16.8 | 16.8 | 49.9 | 14.0 | $K_2O$ 2.0 + $Li_2O$ 0.5 | 70/30 |
| 18 | 20.4 | 12.2 | 48.9 | 14.9 | $K_2O$ 3.5 | 70/30 |
| 19 | 20.4 | 16.3 | 44.9 | 13.8 | $K_2O$ 4.6 | 75/25 |
| 20 | 20.4 | 8.2 | 53.0 | 14.5 | $K_2O$ 3.9 | 65/35 |
| 21 | 23.0 | 11.5 | 42.1 | 19.4 | $K_2O$ 4.0 | 72/28 |
| 22 | 24.5 | 8.2 | 48.9 | 15.0 | $K_2O$ 3.4 | 80/20 |
| 23 | 23.0 | 15.3 | 38.3 | 19.8 | $K_2O$ 3.6 | 73/27 |
| 24 | 26.8 | 11.4 | 38.4 | 19.6 | $K_2O$ 3.8 | 70/30 |
| 25 | 16.0 | 16.0 | 48.0 | 16.0 | $K_2O$ 4.0 | 60/40 |
| 26 | 16.0 | 16.0 | 48.0 | 16.0 | $K_2O$ 4.0 | 60/40 |
| 27 | 11.0 | 11.0 | 54.0 | 20.0 | $K_2O$ 4.0 | 60/40 |
| 28 | 8.3 | 24.8 | 49.5 | 15.4 | $K_2O$ 2.0 | 80/20 |
| 29 | 31.4 | 3.9 | 43.2 | 18.3 | $K_2O$ 3.2 | 80/20 |
| 30 | 16.0 | 16.0 | 48.0 | 16.0 | $K_2O$ 4.0 | 90/10 |
| 31 | 15.5 | 15.5 | 45.0 | 16.0 | $K_2O$ 8.0 | 70/30 |
| 32 | 17.6 | 17.6 | 52.8 | 8.0 | $K_2O$ 4.0 | 80/20 |
| 33 | 13.8 | 13.8 | 42.4 | 26.0 | $K_2O$ 4.0 | 80/20 |
| 34 | 15.6 | 11.7 | 50.7 | 18.0 | $K_2O$ 4.0 | 50/50 |
| Comparative example 1 | 18.3 | 16.4 | 56.2 | 9.1 | 0 | 80/20 |

TABLE 1-2

| | sintering temperature (°C.) | existence of cordierite growth | characteristics | | | |
|---|---|---|---|---|---|---|
| | | | porosity (%) | specific inductive capacity | coefficient of thermal expansion ($x/10^{6°}$ C.) | transverse strength (Kgf/mm²) | water resistance |
| Example 1 | 900 | ○ | 0.4 | 6.9 | 5.8 | 24.5 | ○ |
| 2 | 900 | ○ | 0.3 | 7.0 | 5.9 | 22.2 | ○ |
| 3 | 900 | ○ | 0.3 | 6.8 | 5.7 | 20.1 | ○ |
| 4 | 900 | ○ | 0.1 | 6.9 | 6.0 | 21.2 | ○ |
| 5 | 900 | ○ | 0.1 | 6.7 | 5.8 | 25.9 | ○ |
| 6 | 900 | ○ | 0.1 | 7.0 | 5.9 | 23.3 | ○ |
| 7 | 900 | ○ | 0.1 | 6.7 | 5.7 | 23.7 | ○ |
| 8 | 900 | ○ | 0.1 | 6.6 | 5.4 | 20.6 | ○ |
| 9 | 900 | ○ | 0.2 | 6.9 | 5.8 | 22.4 | ○ |
| 10 | 900 | ○ | 0.2 | 6.2 | 5.5 | 20.9 | ○ |
| 11 | 900 | ○ | 0.1 | 6.4 | 5.2 | 20.3 | ○ |
| 12 | 900 | ○ | 0.3 | 6.1 | 5.4 | 21.2 | ○ |
| 13 | 900 | ○ | 0.1 | 6.8 | 5.1 | 23.3 | ○ |
| 14 | 900 | ○ | 0.2 | 6.5 | 5.3 | 20.5 | ○ |
| 15 | 900 | ○ | 0.1 | 6.8 | 5.5 | 24.6 | ○ |
| 16 | 900 | ○ | 0.1 | 6.7 | 5.4 | 22.1 | ○ |

TABLE 1-2-continued

|    | sintering temperature (°C.) | existence of cordierite growth | porosity (%) | specific inductive capacity | coefficient of thermal expansion (x/10^{-6°} C.) | transverse strength (Kgf/mm²) | water resistance |
|---|---|---|---|---|---|---|---|
| 17 | 900 | O | 0.1 | 6.5 | 5.6 | 20.6 | O |
| 18 | 900 | O | 1.9 | 7.0 | 5.3 | 20.5 | O |
| 19 | 900 | O | 1.2 | 6.6 | 5.0 | 20.1 | O |
| 20 | 900 | O | 1.5 | 7.0 | 5.5 | 22.6 | O |
| 21 | 900 | O | 0.4 | 6.8 | 4.9 | 21.2 | O |
| 22 | 900 | O | 0.9 | 6.5 | 4.8 | 20.7 | O |
| 23 | 900 | O | 0.2 | 6.7 | 5.0 | 22.8 | O |
| 24 | 900 | O | 0.4 | 6.9 | 5.4 | 23.1 | O |
| 25 | 850 | O | 0.5 | 7.0 | 6.0 | 22.7 | O |
| 26 | 950 | O | 0.1 | 6.9 | 5.8 | 23.6 | O |
| 27 | 900 | O | 0.5 | 6.6 | 5.7 | 23.5 | O |
| 28 | 900 | X | 15.2 | 5.9 | 6.5 | 9.4 | O |
| 29 | 900 | X | 14.3 | 5.8 | 6.3 | 7.2 | O |
| 30 | 900 | O | 0.1 | 6.2 | 5.3 | 15.0 | O |
| 31 | substrate deformation | O | 0.1 | 6.9 | 6.1 | 20.1 | X |
| 32 | 900 | O | 16.5 | 6.0 | 5.4 | 5.6 | O |
| 33 | substrate deformation | O | 0.1 | 6.6 | 6.2 | 19.8 | X |
| 34 | 900 | O | 11.4 | 7.3 | 6.6 | 10.3 | O |
| Comparative example 1 | 900 | O | 20.1 | 6.0 | 4.8 | 8.5 | O |

As obvious from Table 1, in Examples 1–24, the substrates could be sufficiently densified even at a sintering temperature of less than 1000° C., so that the excellent ceramic substrates having a small specific inductive capacity of less than 7.0, a transverse strength of 20 kgf/mm² and water resistance of less than 0.01%, etc. could be produced.

At that time, in the range of temperature where a conductor inside layer does not melt, the higher that the sintering temperature of the ceramic substrate is, the more densification and crystallization proceed, as a result, the larger transverse strength and the smaller coefficient of thermal expansion can be obtained.

Figure 11:
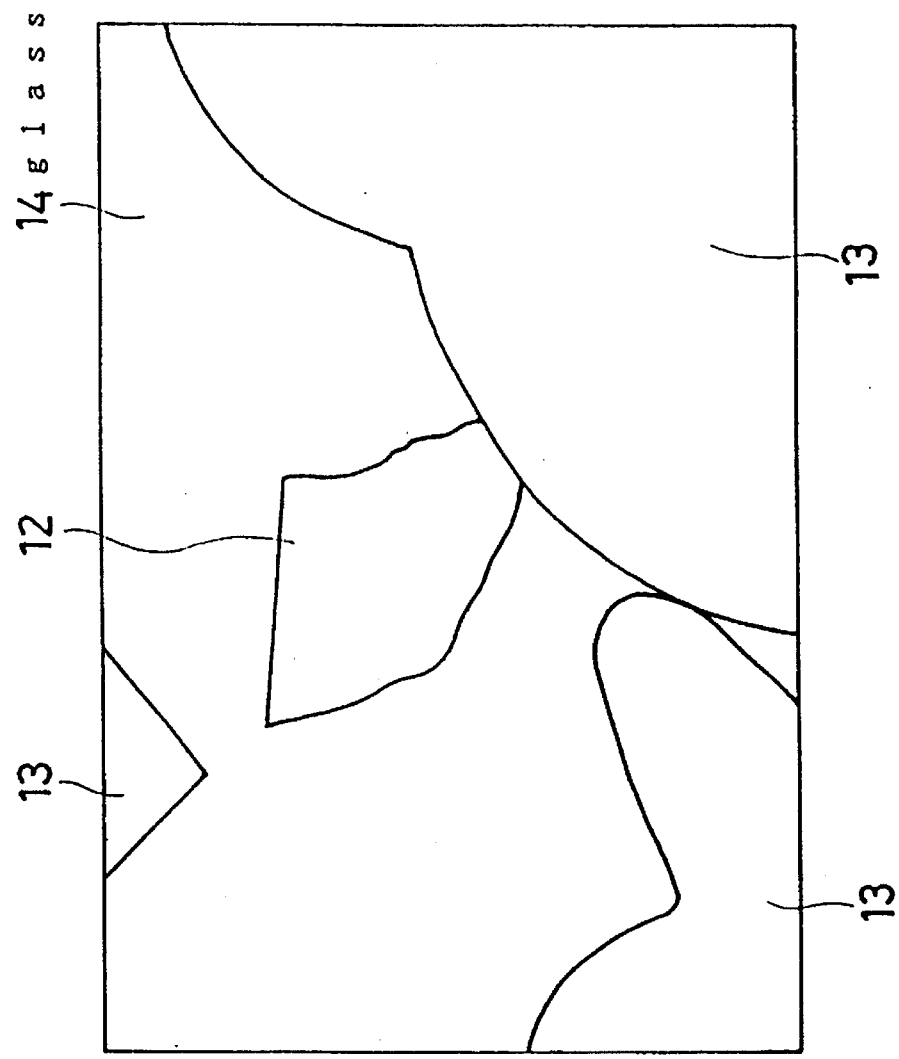
FIG. 11 is a sketch of the TEM photomicrograph obtained in the observation with a TEM of the structure of the ceramic substrate obtained in Example 5.
Figure 12:
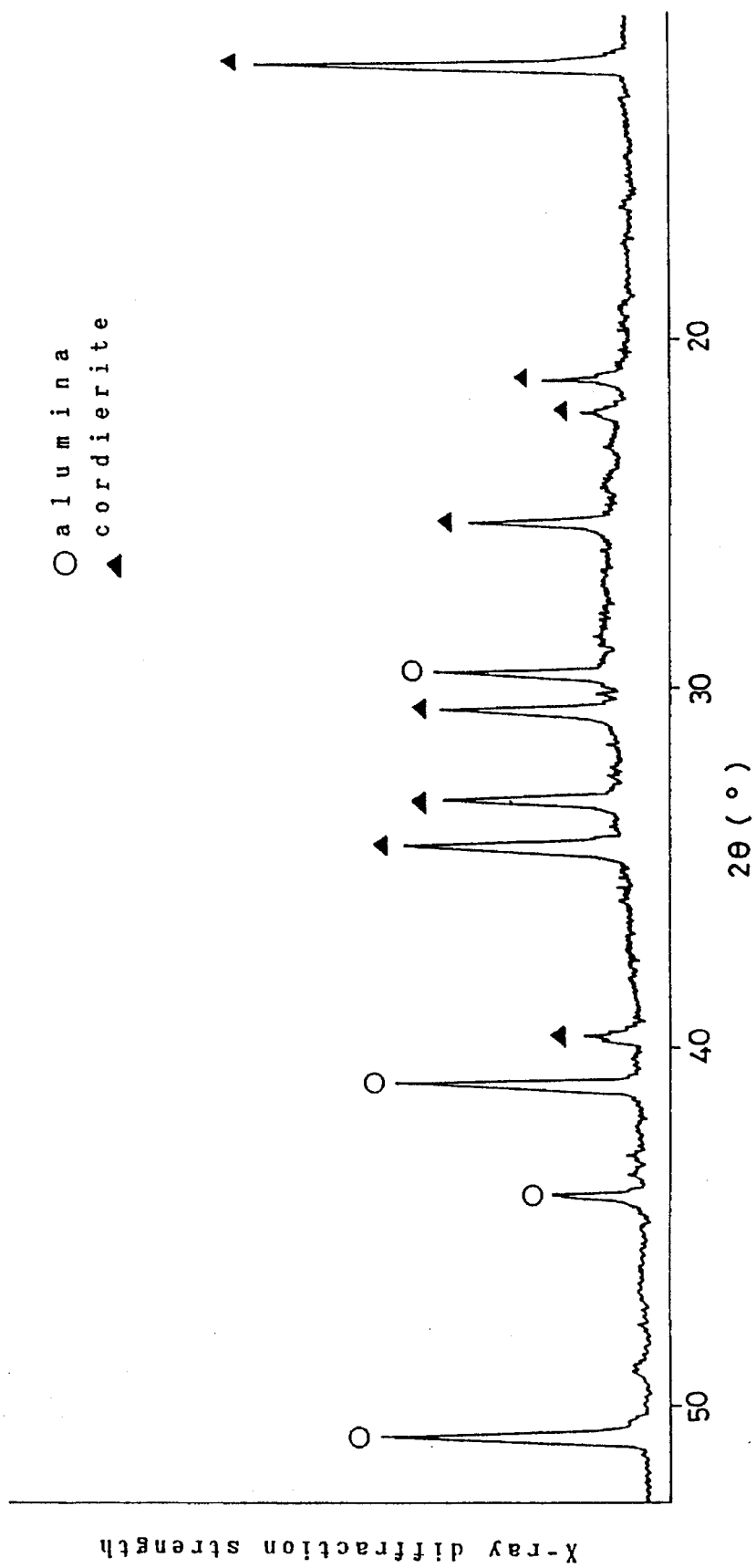
FIG. 12 is a graph indicating the data of X-ray diffraction strength in the X-ray diffraction of the sample obtained in Example 35.
Figure 13:
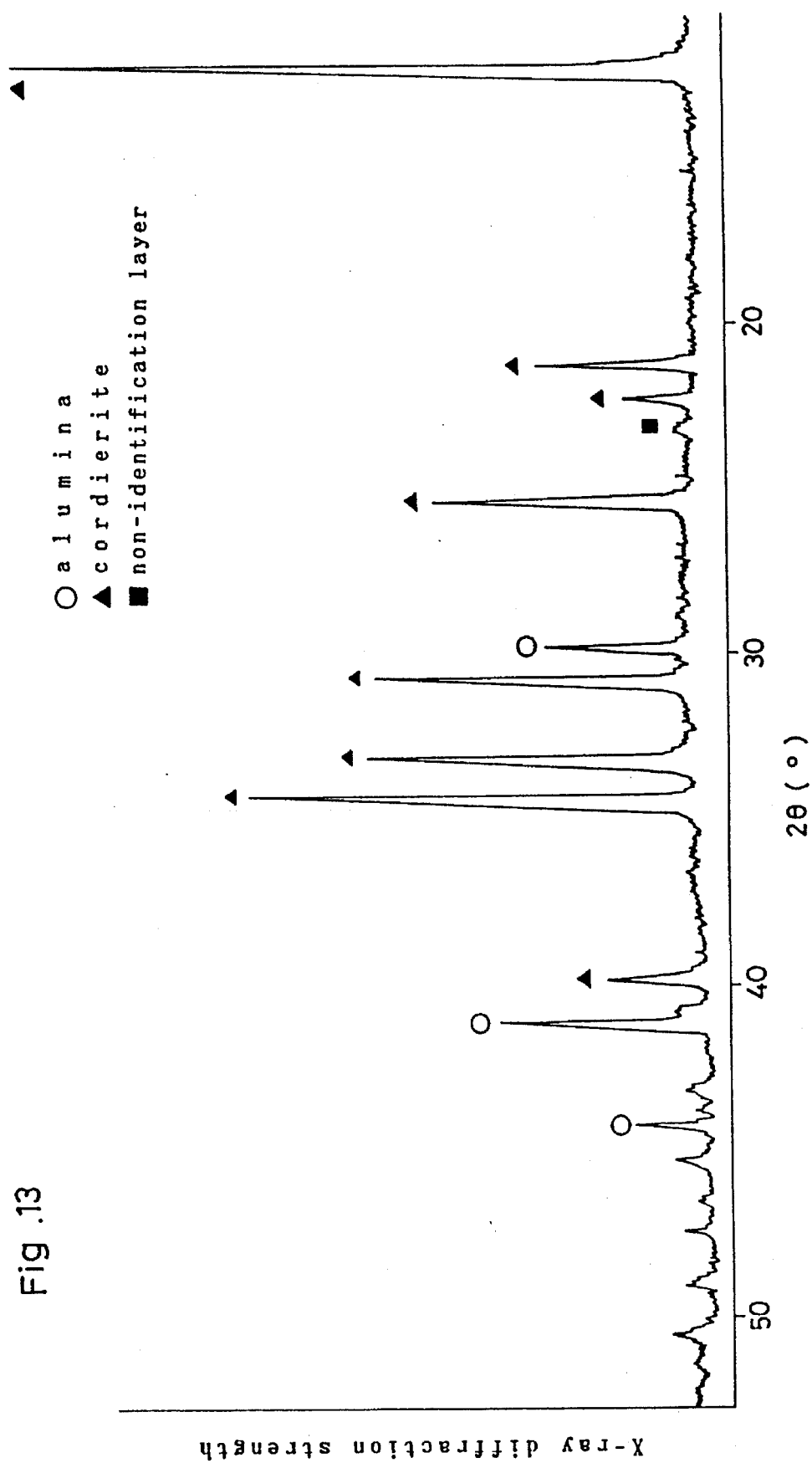
FIG. 13 is a graph indicating the data of X-ray diffraction strength in the X-ray diffraction of the sample obtained in Example 36.
Figure 14:
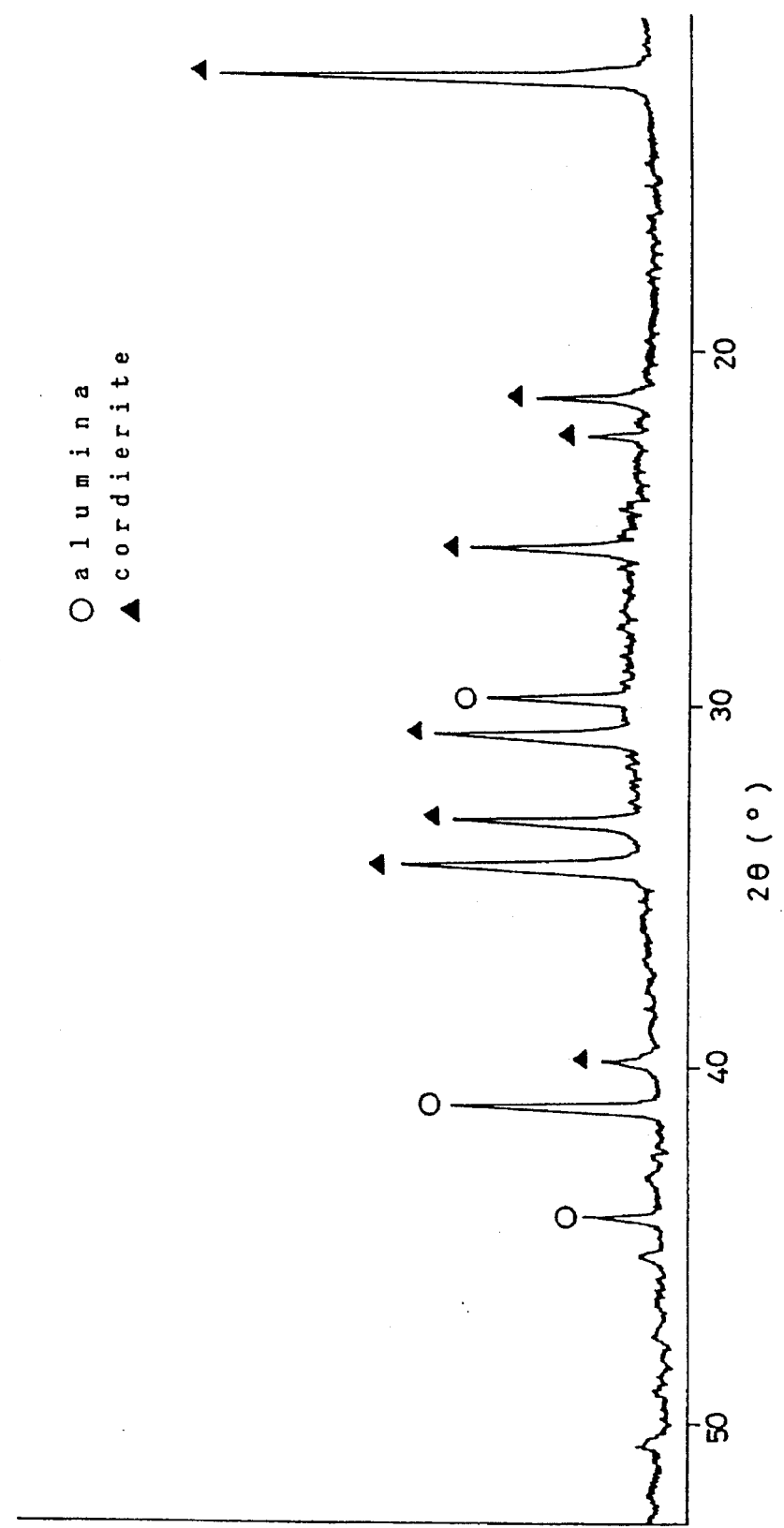
FIG. 14 is a graph indicating the data of X-ray diffraction strength in the X-ray diffraction of the sample obtained in Example 37.
Figure 15:
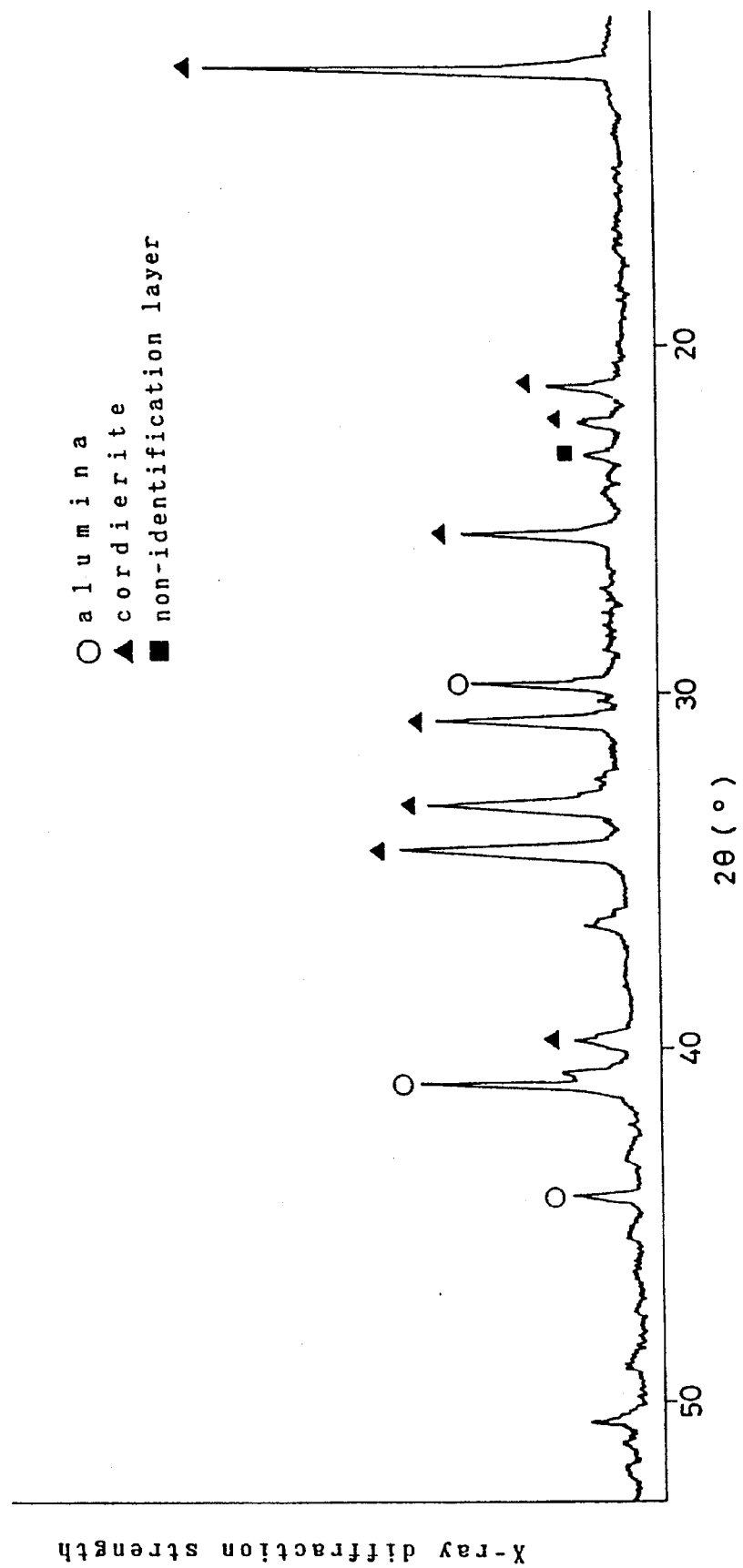
FIG. 15 is a graph indicating the data of X-ray diffraction strength in the X-ray diffraction of the sample obtained in Example 38.

FIGS. 1–10 are data of X-ray diffraction strength in the X-ray diffraction of the samples obtained in the Examples. From FIGS. 1–10, the growth of cordierire was confirmed. In addition, in the observation with a TEM (transmission electron microscopy) of the ceramic substrate according to Example 5, it could be found that cordierire grew from the surface of alumina (FIG. 11).

In Comparative Example 1 in which the substrate was manufactured by way of experiment based on the content disclosed in Japanese Laid-Open Publication No.225338/90, in sintering at a temperature of less than 900° C. required to keep Ag or Cu, etc. inside layers, the substrate had an insufficiently small porosity of 20.1% and insufficient densification, leading to a small transverse strength (8.5 kgf/mm²). In Example 28, due to a small amount of glass material MgO, cordierire did not grow, resulting in a large porosity (15.2%) and a small transverse strength (9.4 kgf/mm²). In Example 29, due to a small amount of glass material $Al_2O_3$, cordierite did not grow, resulting in a large porosity (14.3%) and a small transverse strength (7.2 kgf/mm²). In Example 30, due to a small mixing ratio of filler to glass, the transverse strength was small (15.0 kgf/mm²). In Example 31, due to a large amount of glass material $K_2O$, the substrate changed the shape and had poor water resistance. In Example 32, due to a small amount of glass material $B_2O_3$, the substrate had a large porosity (16.5%) and a small transverse strength (5.6 kgf/mm²). In Example 33, due to a large amount of glass material $B_2O_3$, the substrate changed the shape and had poor water resistance. In Example 34, due to a large mixing ratio of filler to glass, the porosity was large (11.4%), the transverse strength was small (10.3 kgf/mm²) and the moisture resistance was also poor.

Next, Examples 35–63 and Comparative Example 2 are described below.

A glass powder comprising MgO, $Al_2O_3$, $SiO_2$, $B_2O_3$ and $R_2O$(R:alkali metal) in the compositions shown in Table 2 and having a mean particle diameter of 0.1–10 μm, and a crystal grain of cordierire having a mean particle diameter of 0.1–10 μm and a crystal grain of $Al_2O_3$ a having a mean particle diameter of 0.1–10 μm were mixed. As for the mixing ratio of glass powder and crystal grain, the ratio of crystal grain was as shown in Table 2 and the rest was the ratio of glass powder. For example, in Example 35, the alumina filler was 20 wt %, the cordierite filler was 5 wt %, and the glass material was the rest 75 wt %.

Next, an adequate amount of organic binder, plasticizer and solvent respectively were added to the mixture and then, the same was kneaded to be a slurry of about 10,000 cps. The slurry was molded into a sheet about 0.2 mm thick by a doctor blade method and dried at 80° C. for about 10 minutes. Thereafter, the sheet was sintered at a temperature raised at a speed of 10° C./min and at about 850°–980° C. for 5–240 minutes. Thus, the production of the sintered body of ceramic substrate was completed.

Figure 16:
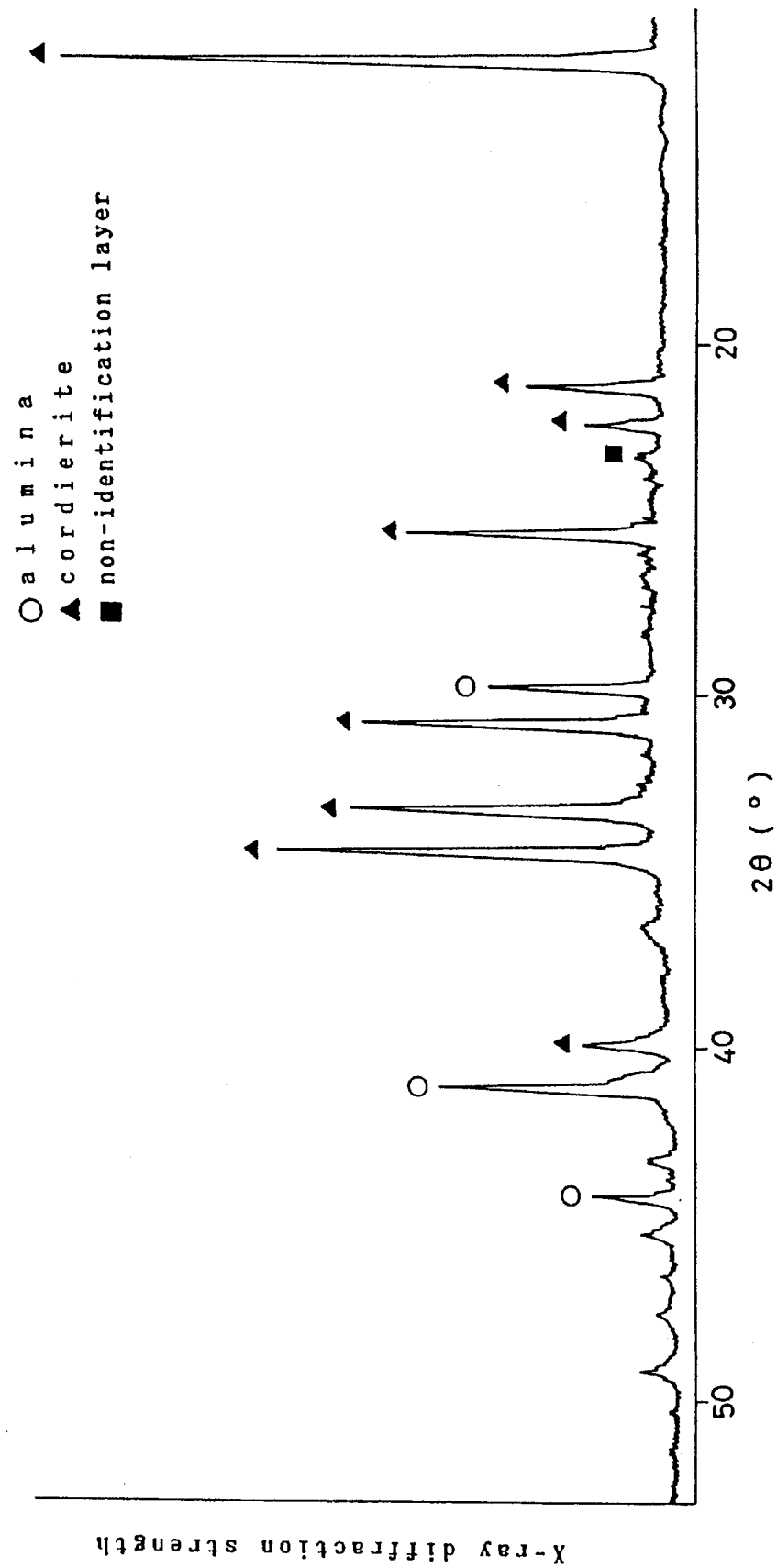
FIG. 16 is a graph indicating the data of X-ray diffraction strength in the X-ray diffraction of the sample obtained in Example 39.
Figure 17:
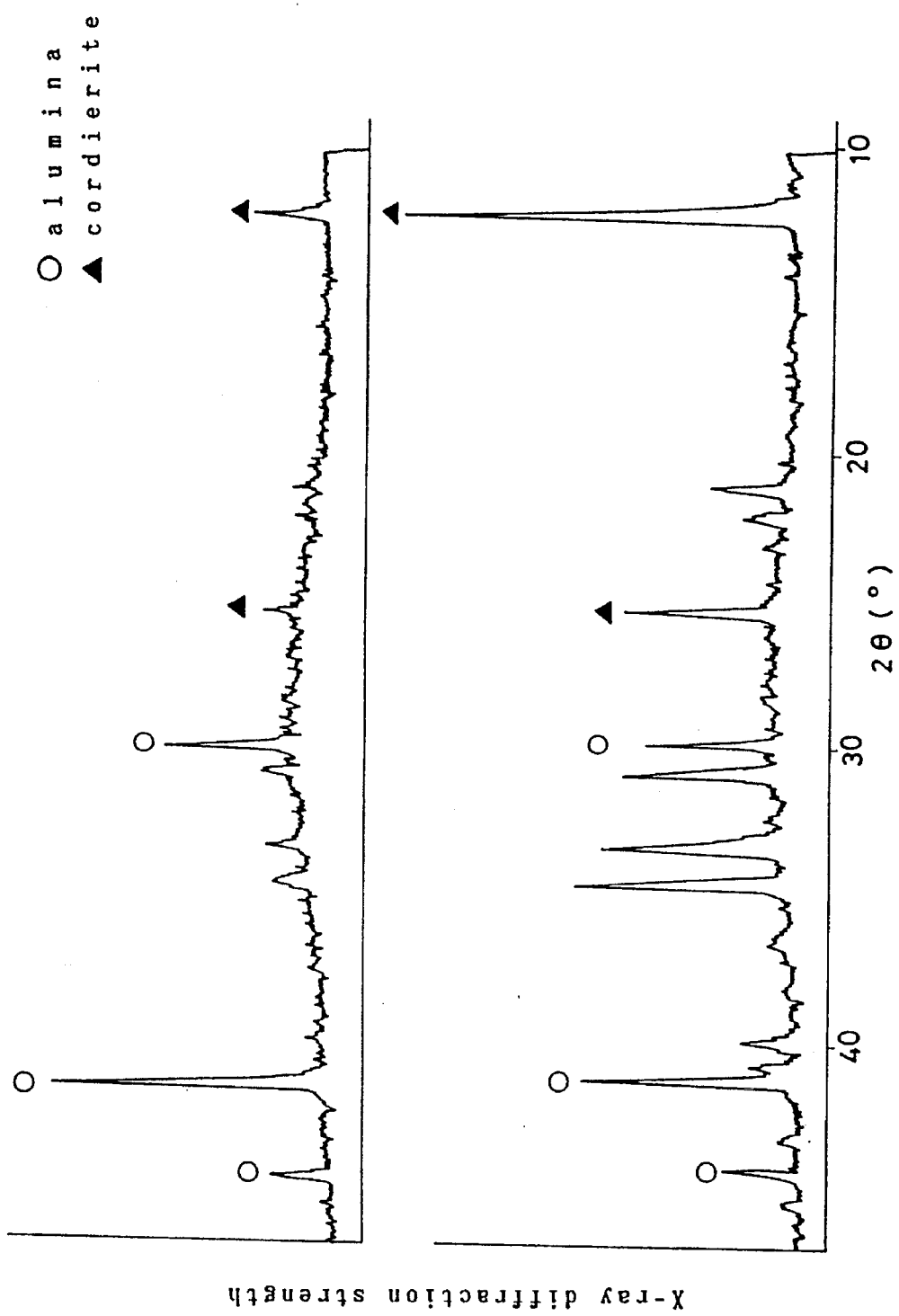
FIG. 17 is a graph indicating the data of X-ray diffraction strength of the material powder before the sintered body is obtained in Example 40.
Figure 18:
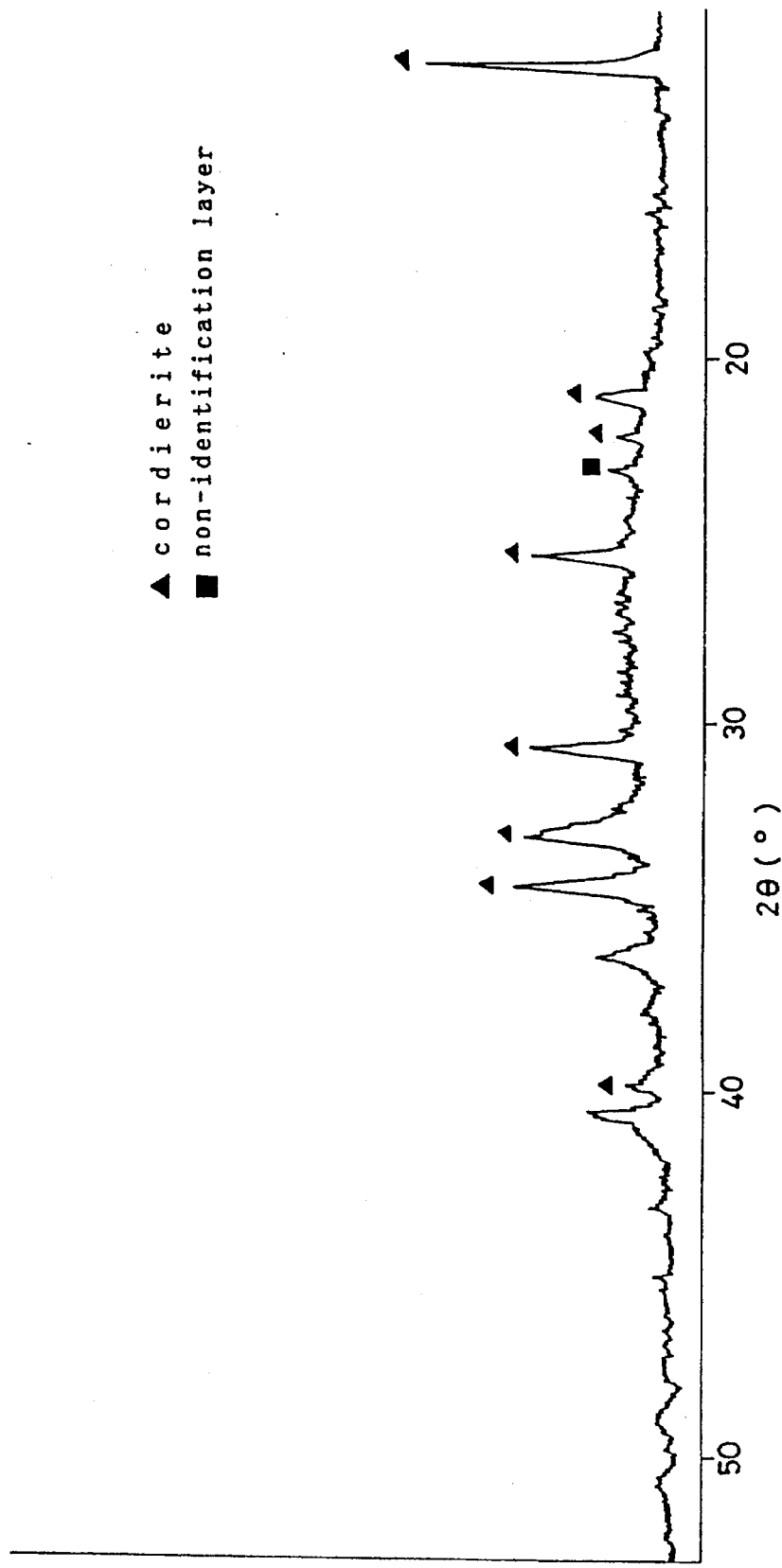
FIG. 18 is a graph indicating the data of X-ray diffraction strength in the X-ray diffraction of the sample obtained in Example 41.
Figure 19:
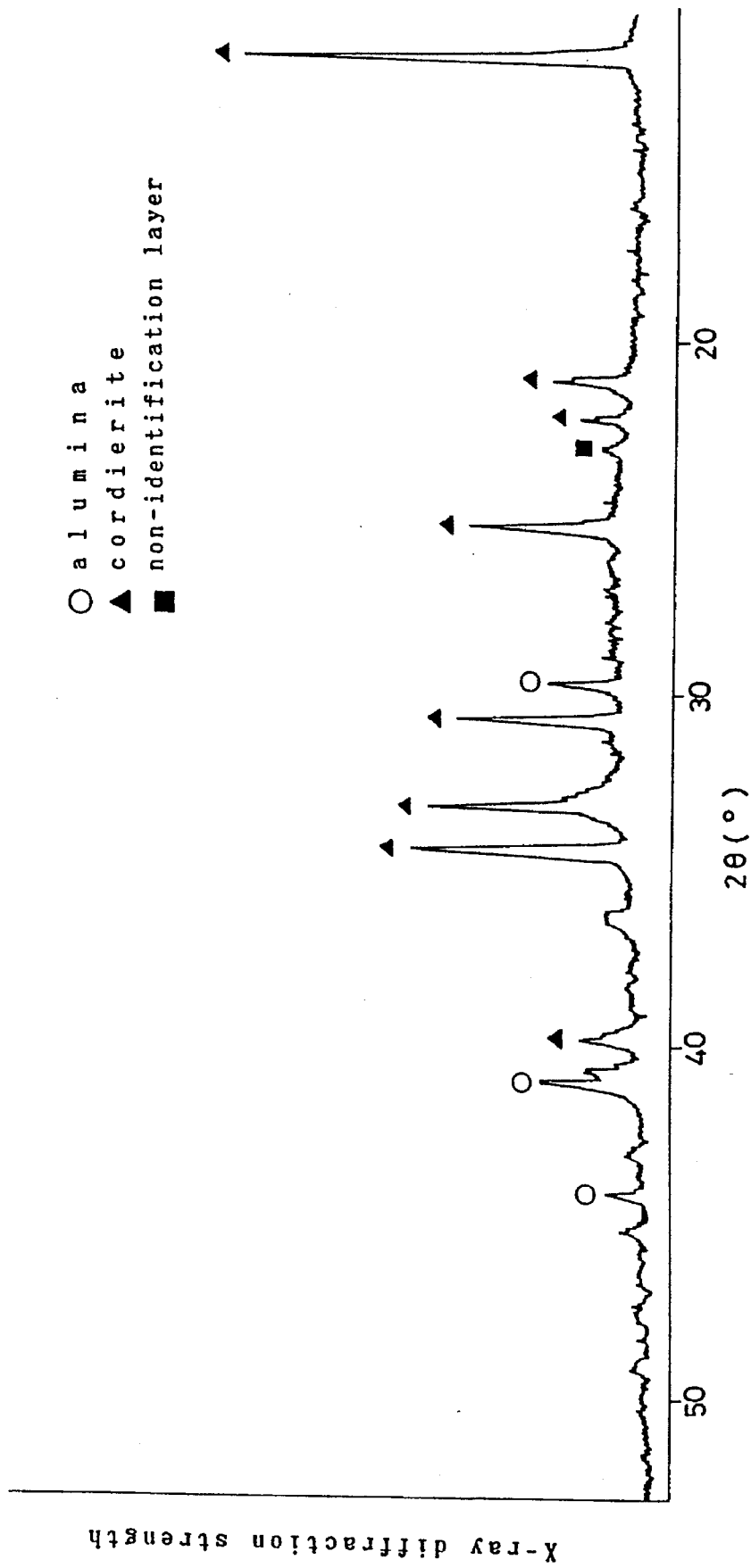
FIG. 19 is a graph indicating the data of X-ray diffraction strength in the X-ray diffraction of the sample obtained in Example 42.
Figure 20:
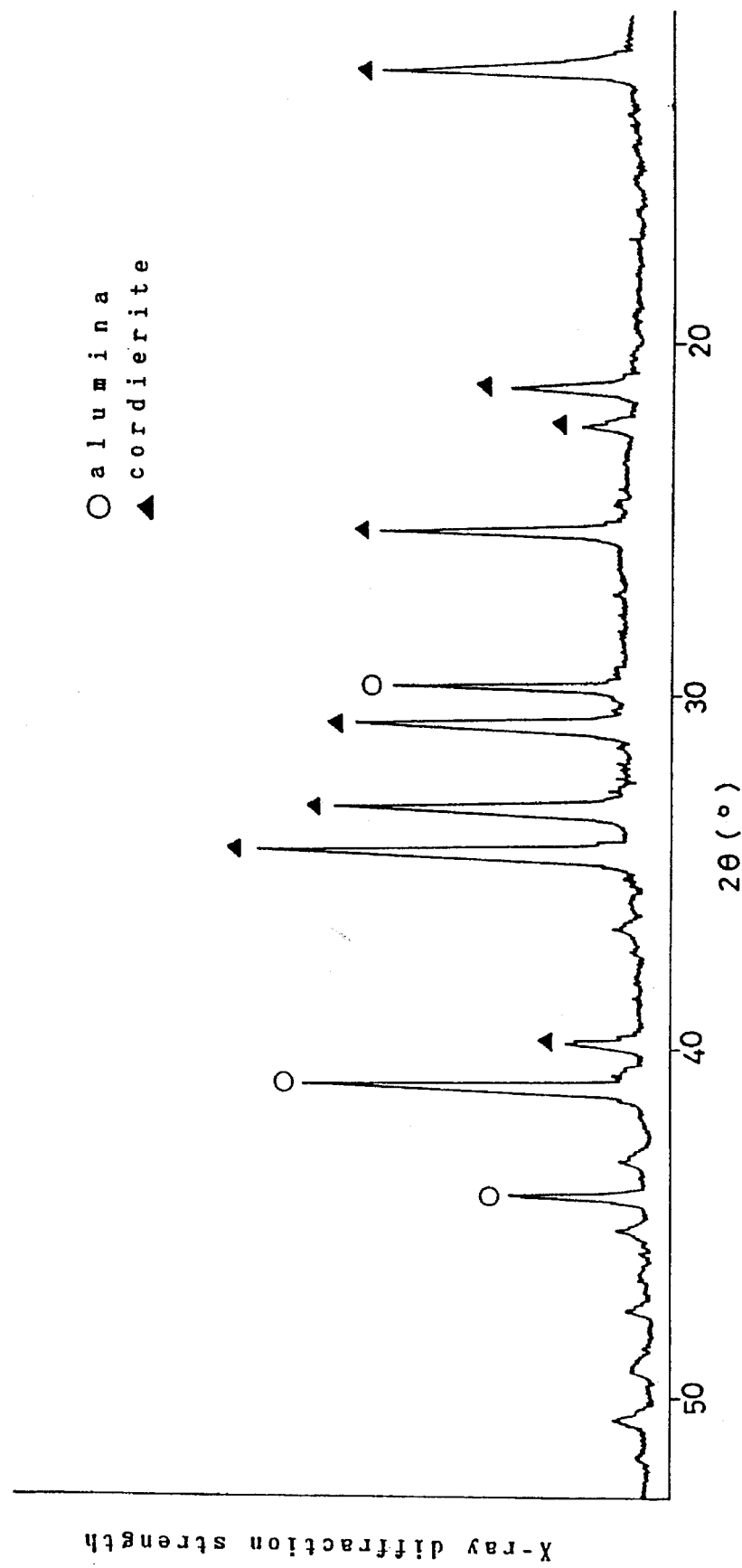
FIG. 20 is a graph indicating the data of X-ray diffraction strength in the X-ray diffraction of the sample obtained in Example 43.
Figure 21:
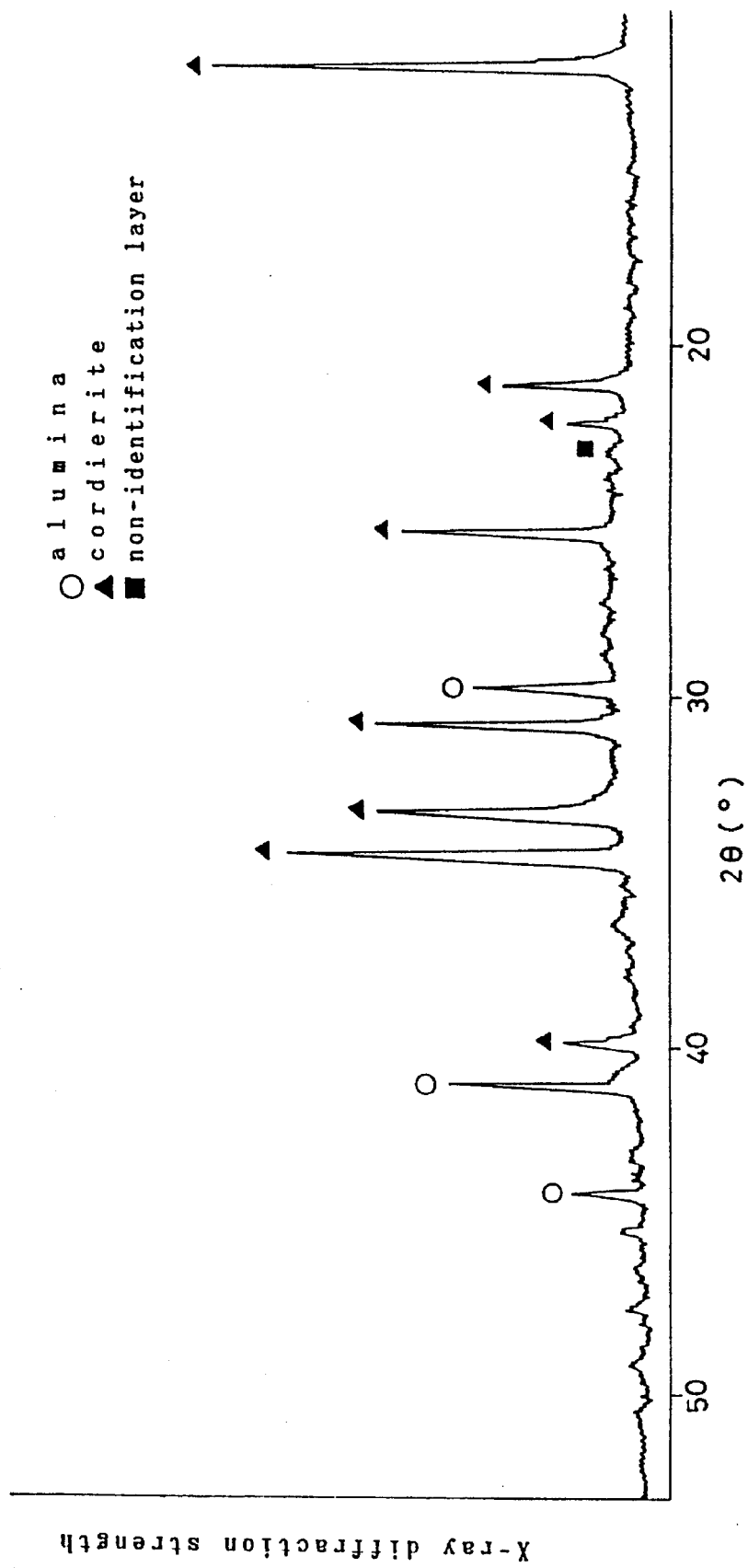
FIG. 21 is a graph indicating the data of X-ray diffraction strength in the X-ray diffraction of the sample obtained in Example 44.
Figure 22:
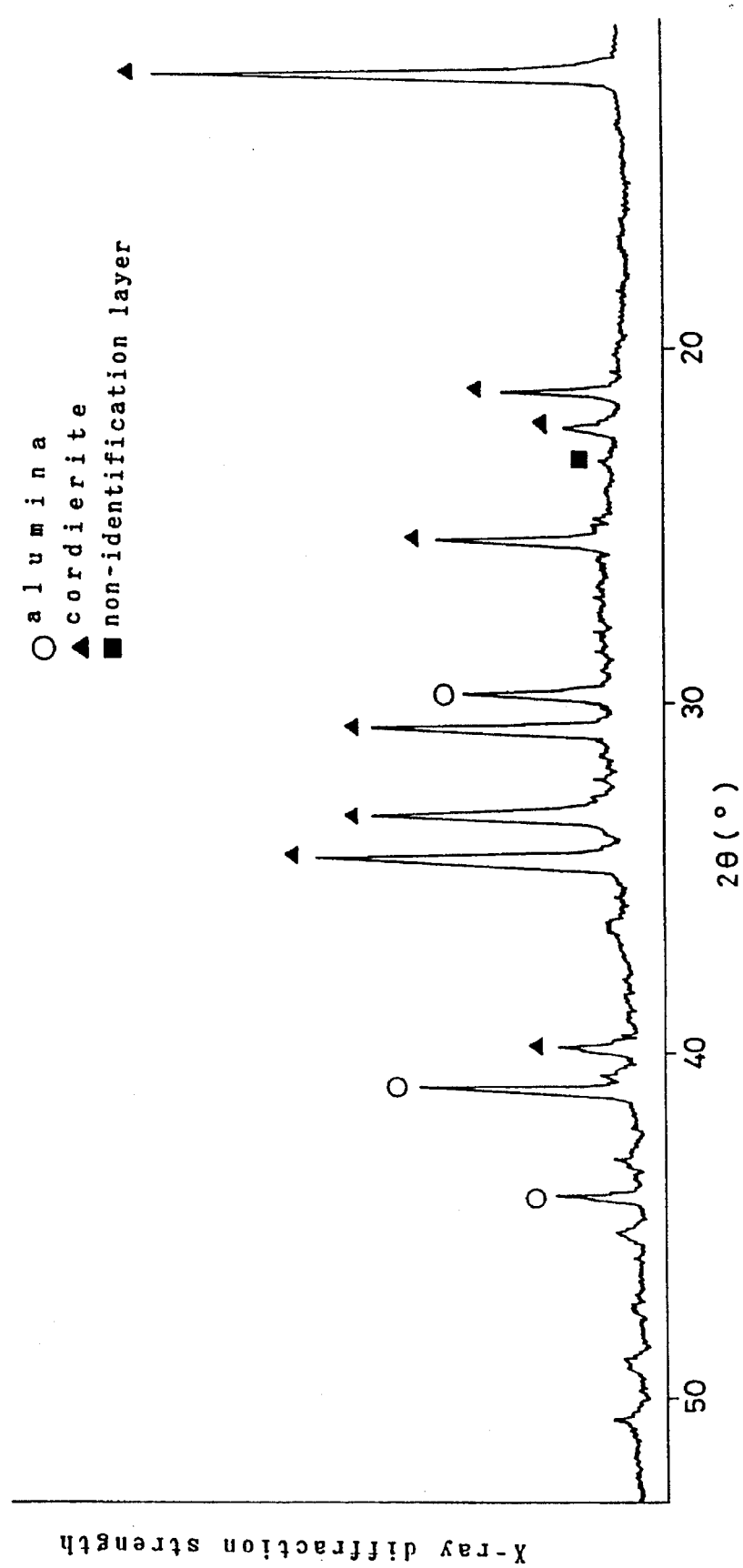
FIG. 22 is a graph indicating the data of X-ray diffraction strength in the X-ray diffraction of the sample obtained in Example 45.
Figure 23:
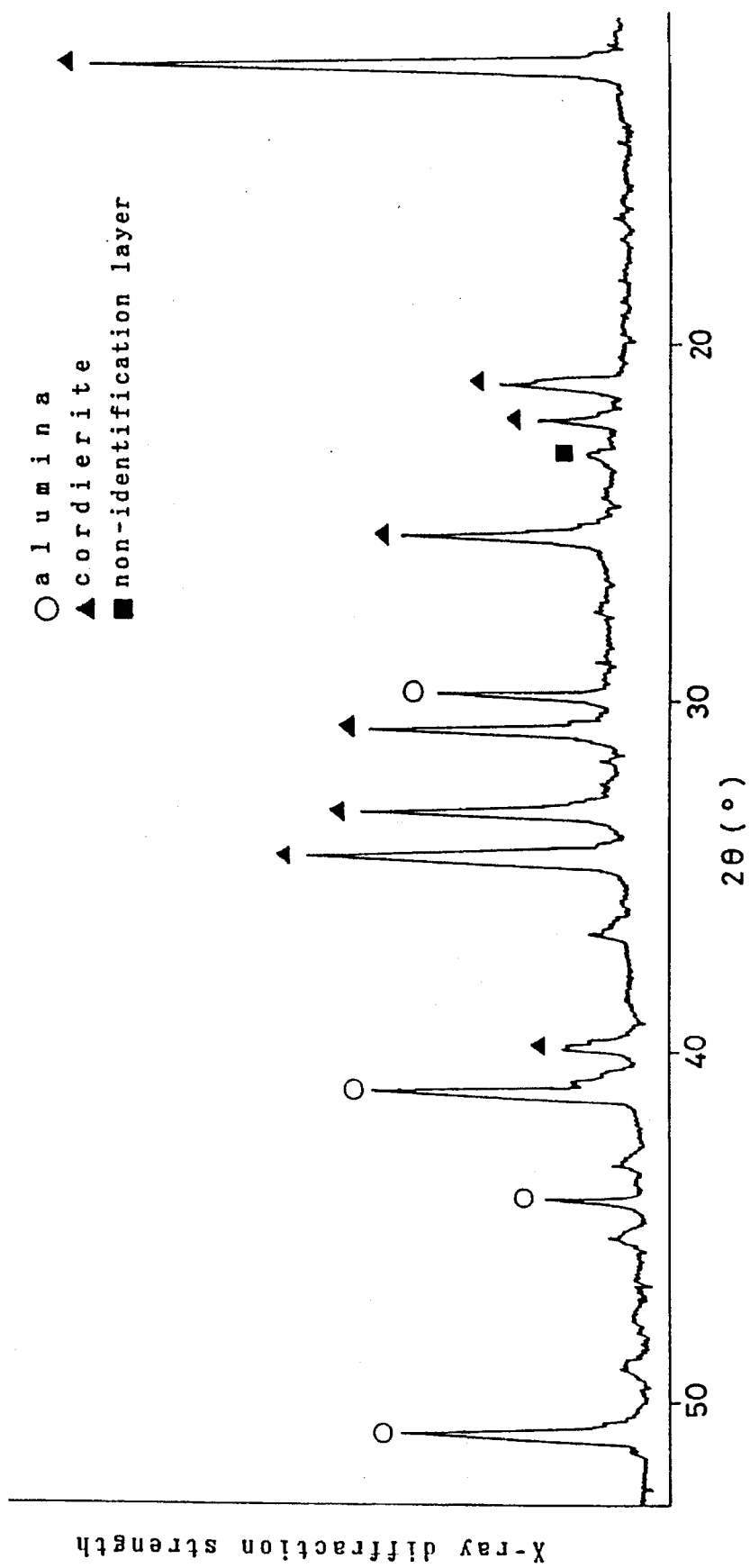
FIG. 23 is a graph indicating the data of X-ray diffraction strength in the X-ray diffraction of the sample obtained in Example 46.
Figure 24:
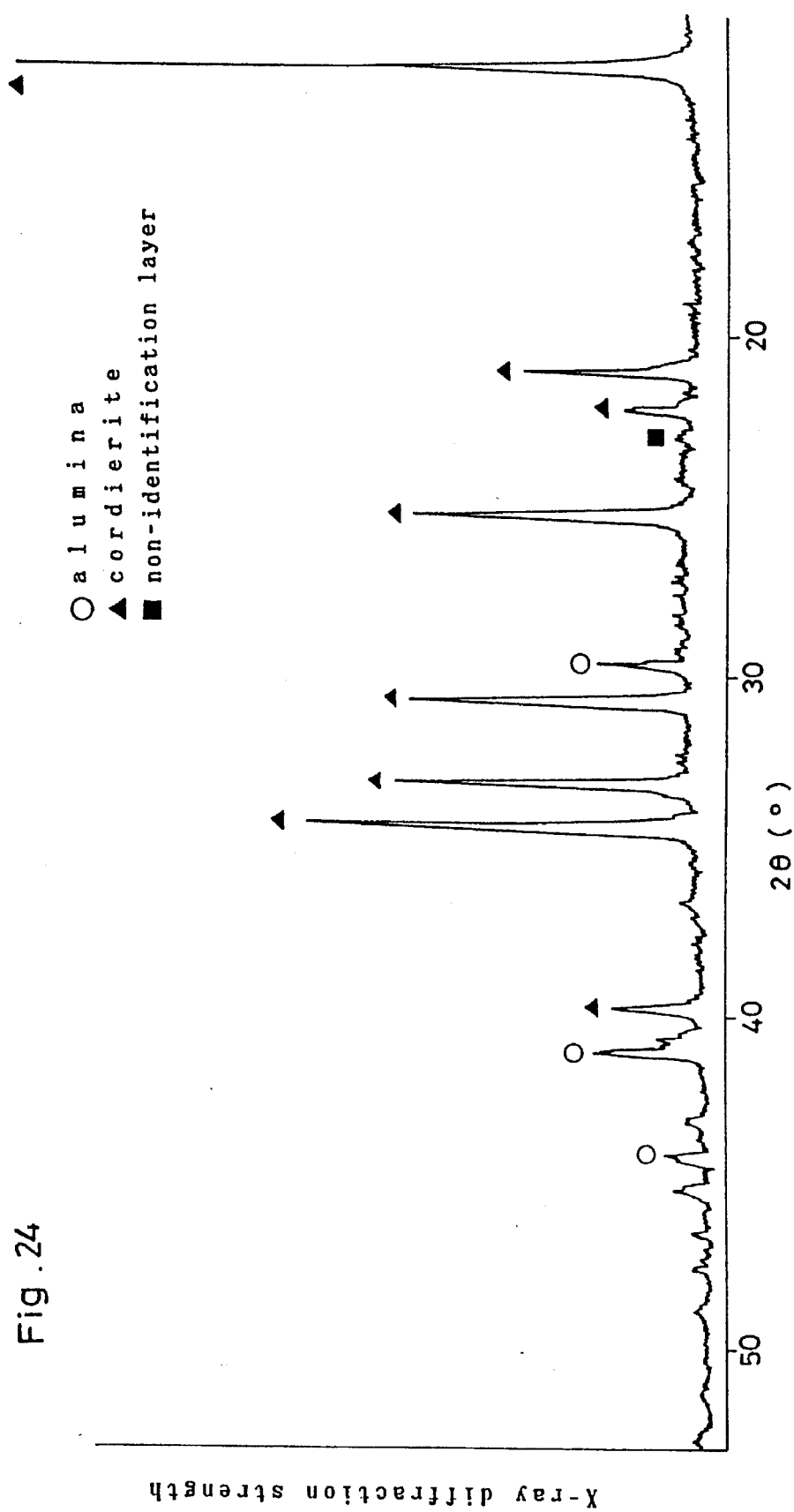
FIG. 24 is a graph indicating the data of X-ray diffraction strength in the X-ray diffraction of the sample obtained in Example 53.
Figure 25:
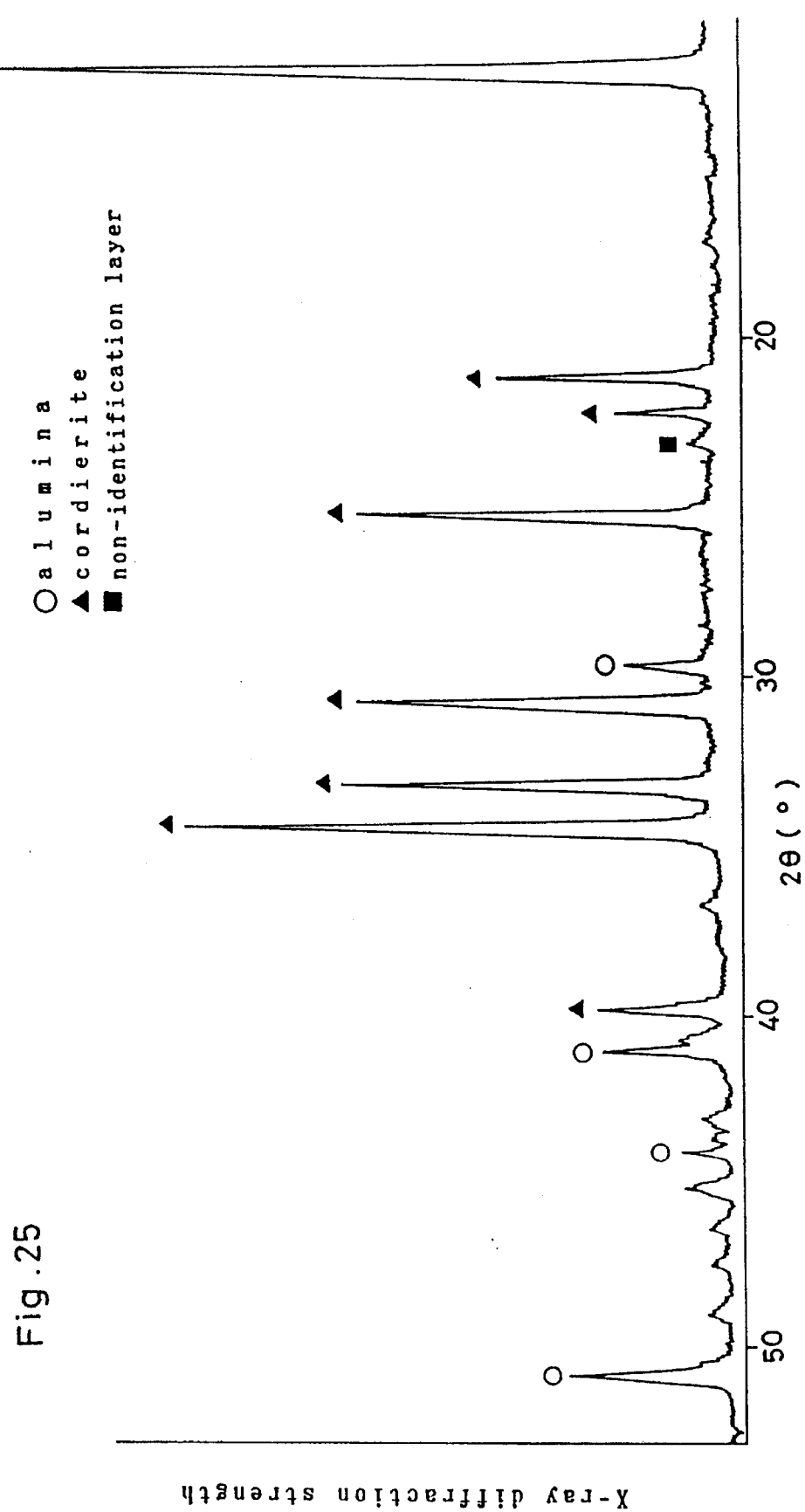
FIG. 25 is a graph indicating the data of X-ray diffraction strength in the X-ray diffraction of the sample obtained in Example 54.
Figure 26:
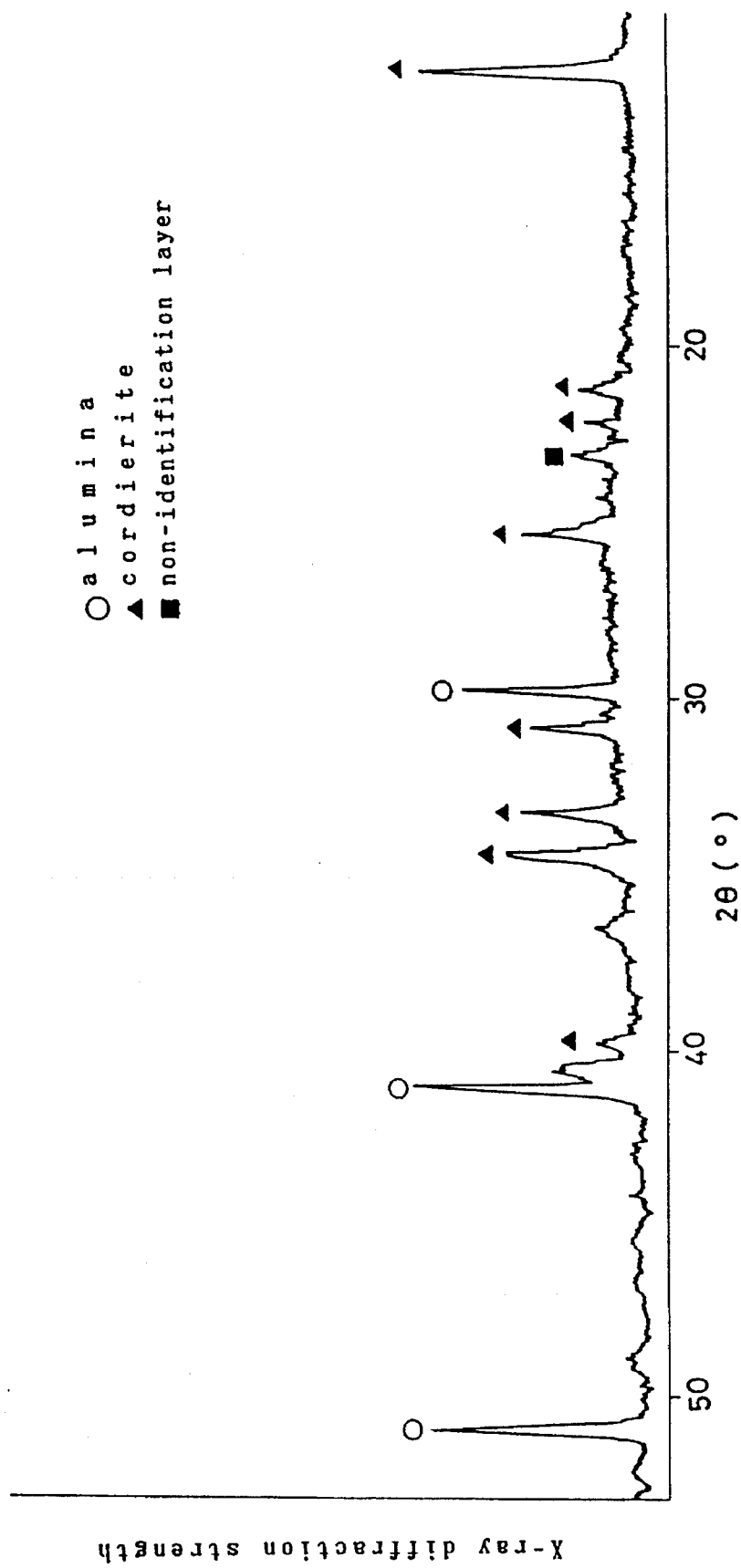
FIG. 26 is a graph indicating the data of X-ray diffraction strength in the X-ray diffraction of the sample obtained in Example 57.
Figure 27:
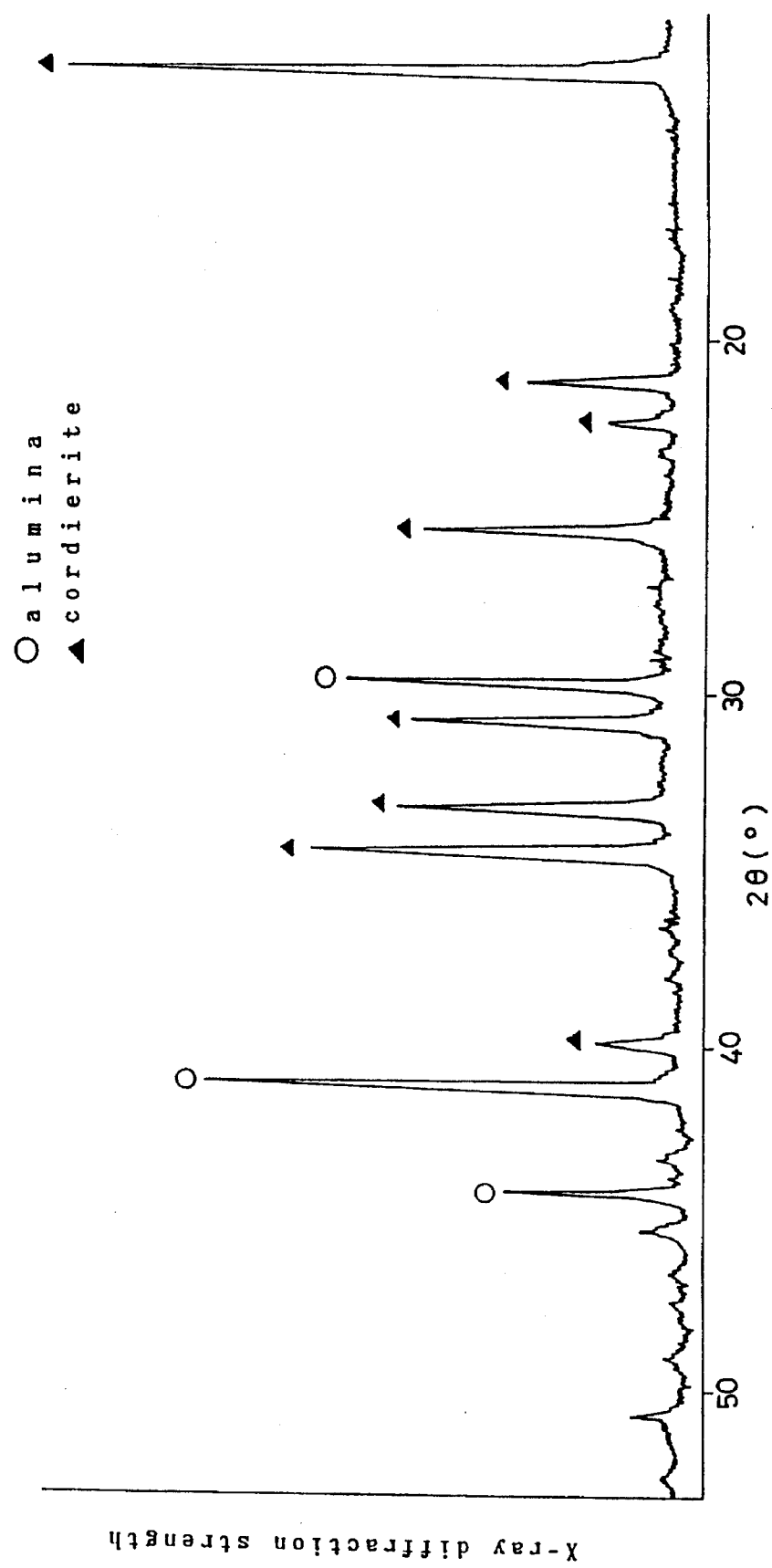
FIG. 27 is a graph indicating the data of X-ray diffraction strength in the X-ray diffraction of the sample obtained in Example 62.
Figure 28:
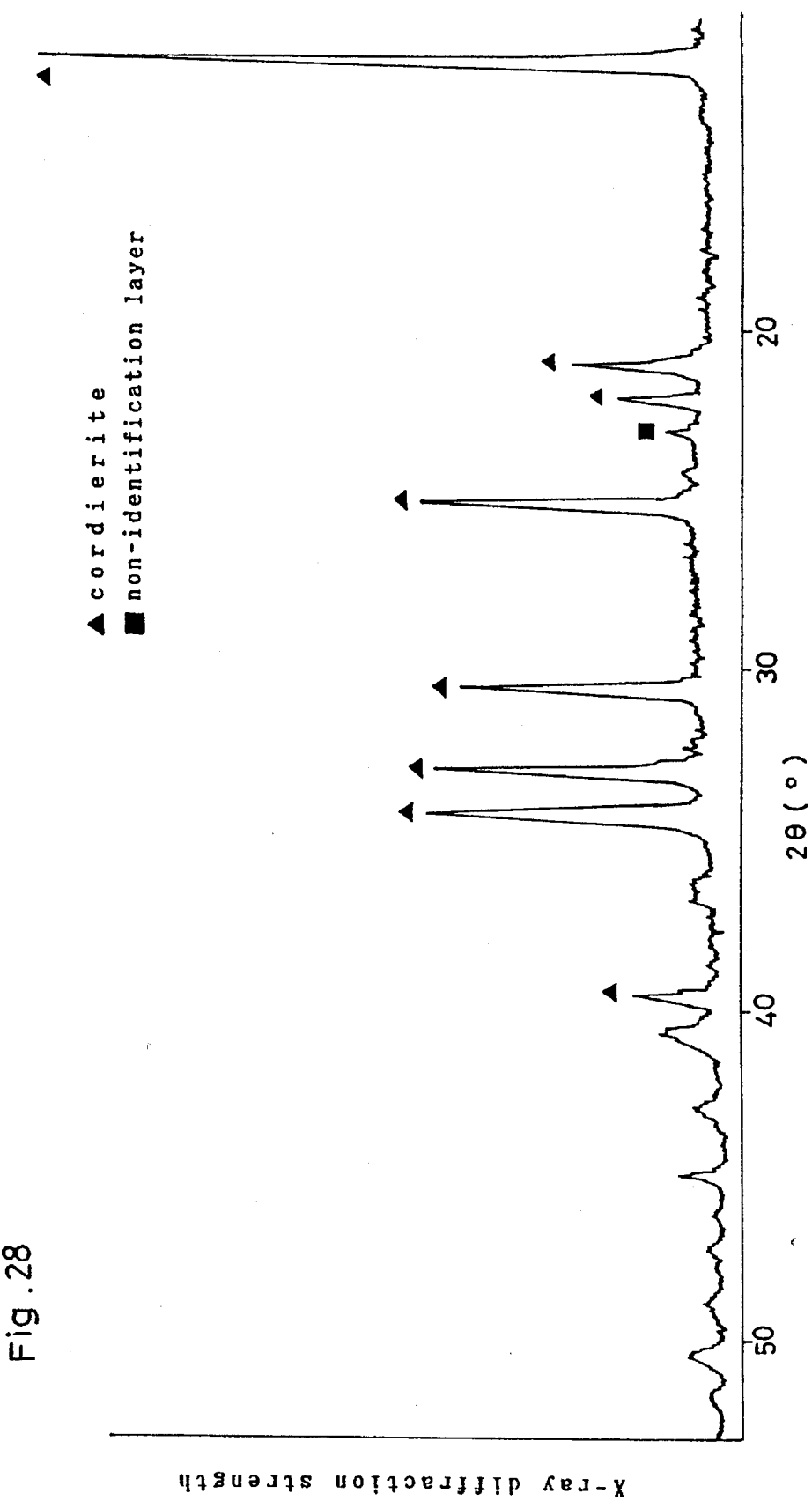
FIG. 28 is a graph indicating the data of X-ray diffraction strength in the X-ray diffraction of the sample obtained in Example 63.

Subsequently, the growth of a cordierire crystal on the produced ceramic substrate was confirmed by the X-ray diffraction of the material powder before being sintered and the sintered body. And the porosity, specific inductive capacity, coefficient of thermal expansion and transverse strength of the ceramic substrate were measured. The data of X-ray diffraction strength of the material powder before being sintered and the ceramic substrate obtained in Example 40 is shown in FIG. 16 and the conditions of producing the ceramic substrate and the characteristics of the obtained ceramic substrate are shown in Table 2.

The porosity was determined by an Archimedes' method. The specific inductive capacity was measured with an impedance analyzer. The average of the coefficients of thermal expansion at from the room temperature to 350° C. was measured with a linear expansion meter by contact. The transverse strength was measured by 3-point bending test. And the water resistance was evaluated with the decrease in weight after keeping a test specimen in the boiling water for a definite time, and the substrates having a decrease of more than 0.01% were rejected.

Figure 29:
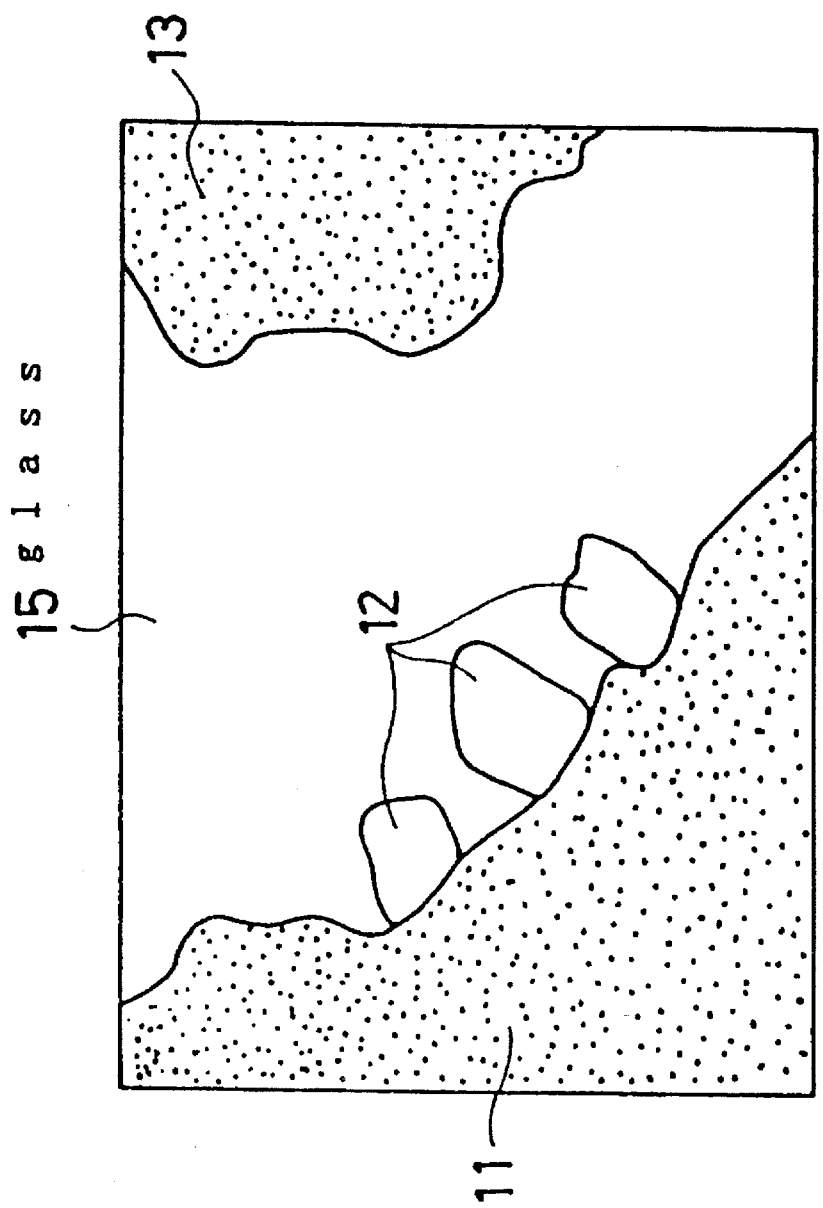
FIG. 29 is a sketch of the TEM photomicrograph obtained in the observation with a TEM of the structure of the ceramic substrate obtained in Example 40.
Figure 30:
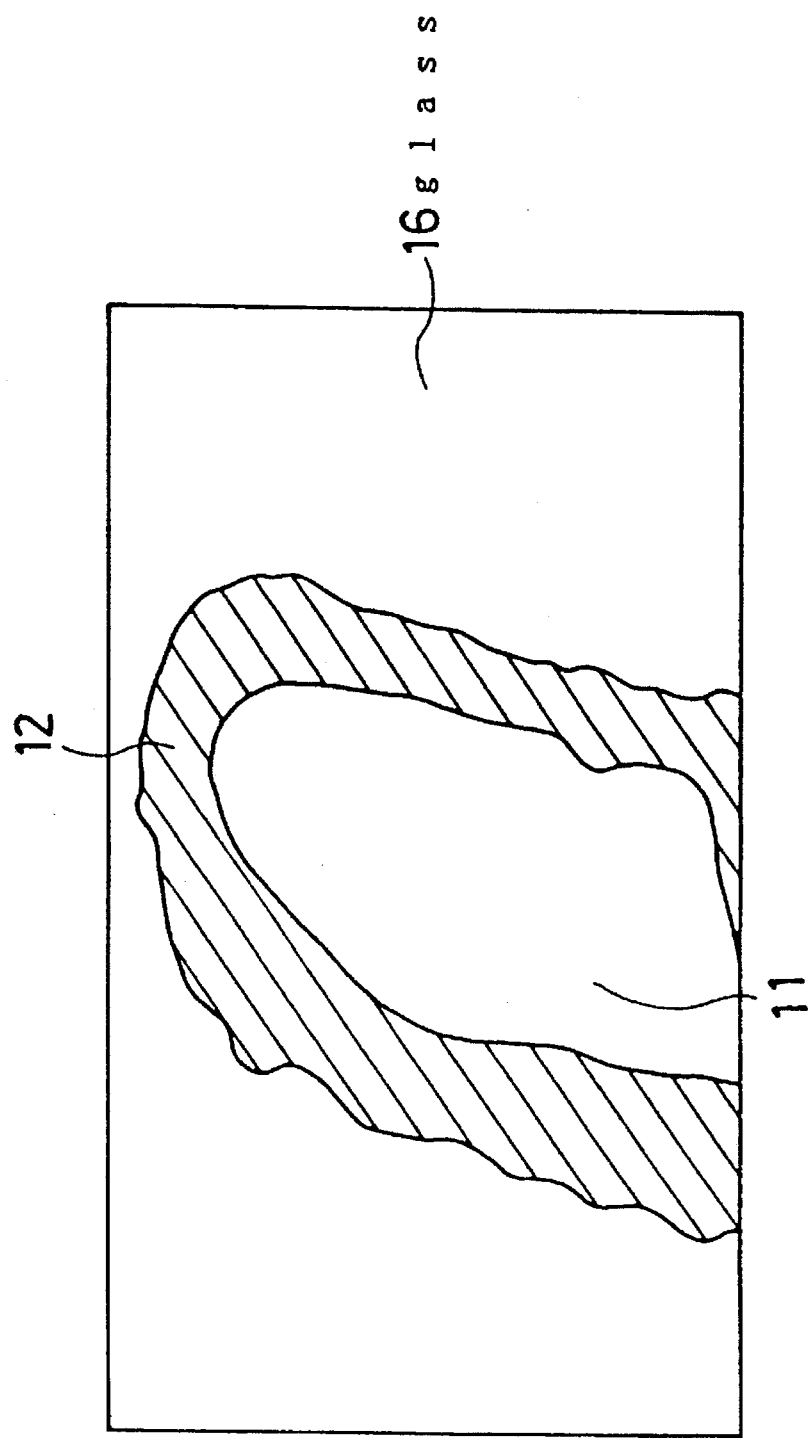
FIG. 30 is a sketch of the TEM photomicrograph obtained in the observation with a TEM of the structure of the ceramic substrate obtained in Example 41.
Figure 31:
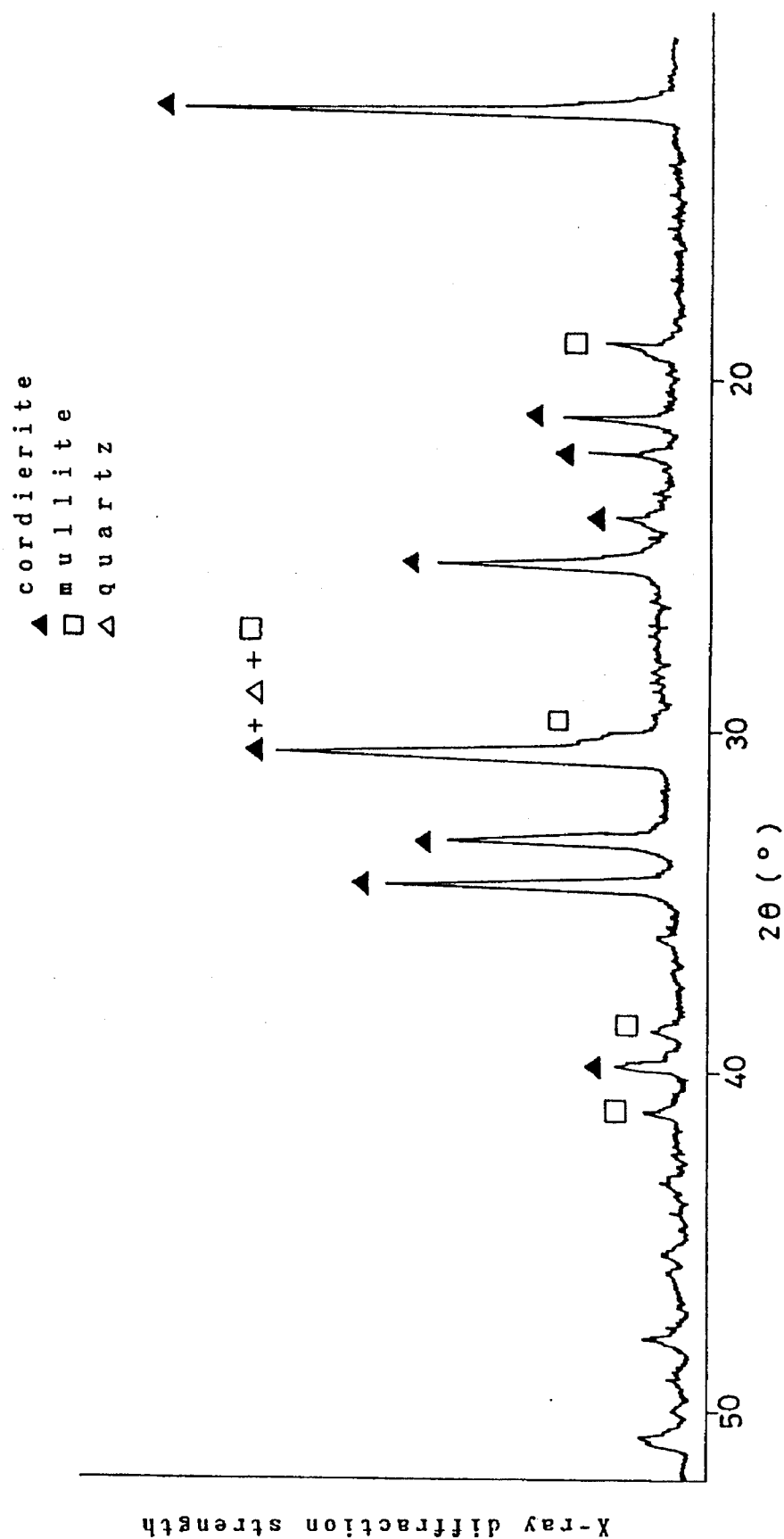
FIG. 31 is a graph indicating the data of X-ray diffraction strength in the X-ray diffraction of the sample obtained in Example 72.
Figure 32:
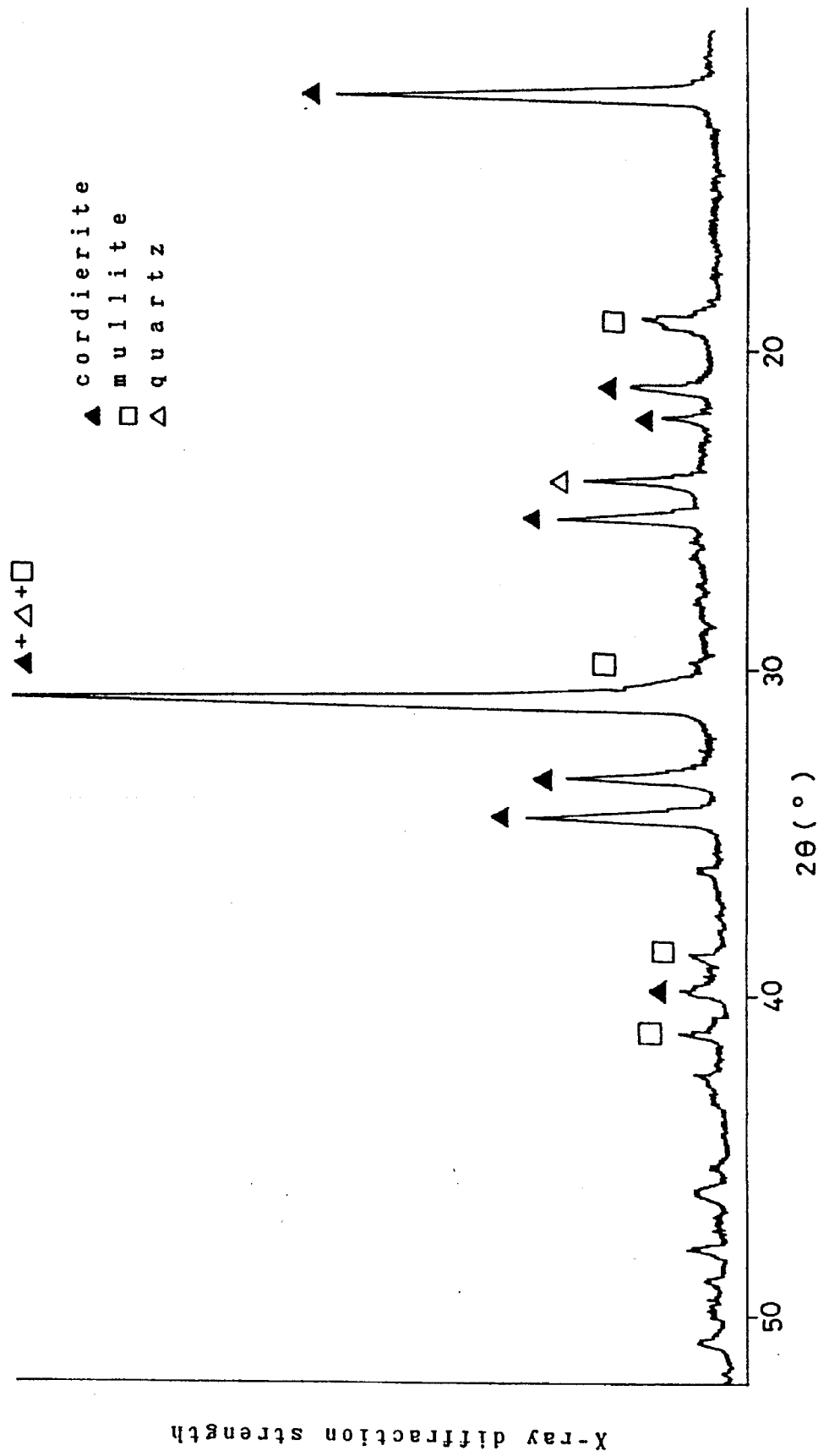
FIG. 32 is a graph indicating the data of X-ray diffraction strength in the X-ray diffraction of the sample obtained in Example 81.
Figure 33:
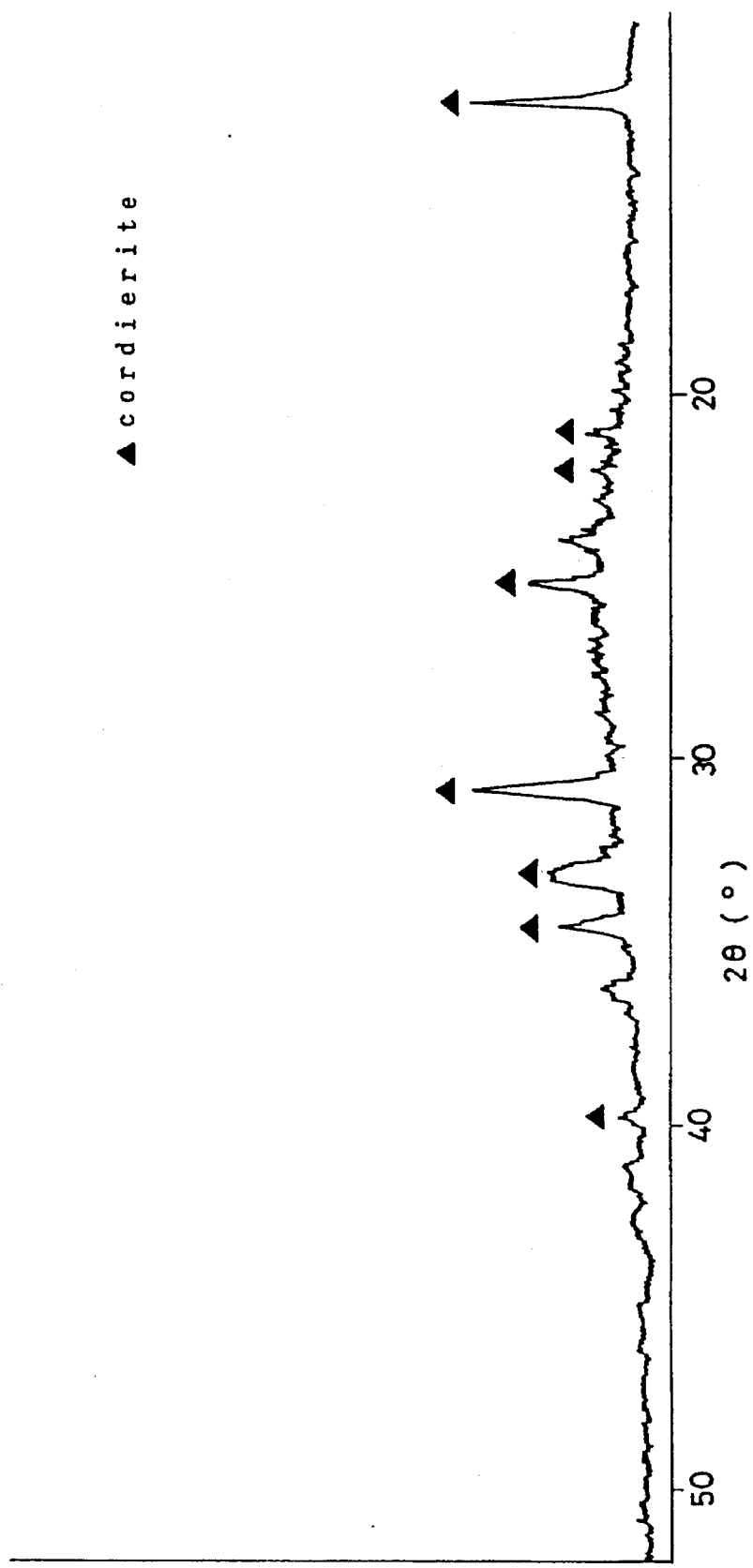
FIG. 33 is a graph indicating the data of X-ray diffraction strength in the X-ray diffraction of the sample obtained in Example 87.

In addition, the ceramics obtained in Examples 40 and 41 were broken and parts of them were observed with a TEM(transmission electron microscopy). Sketches of the obtained photomicrographs are shown in FIGS. 29 and 30.

TABLE 2-1

| Sample | mixing ratio of glass materials | | | | | addition quantity of alumina filler (wt %) | addition quantity of cordierite filler (wt %) |
|---|---|---|---|---|---|---|---|
| | MgO (wt %) | $Al_2O_3$ (wt %) | $SiO_2$ (wt %) | $B_2O_3$ (wt %) | $R_2O$ (wt %) | | |
| Example 35 | 11.4 | 19.0 | 45.6 | 20.0 | $K_2O$ 4.0 | 20 | 5 |
| 36 | 15.6 | 19.5 | 42.9 | 18.0 | $K_2O$ 4.0 | 20 | 5 |
| 37 | 11.7 | 15.6 | 50.7 | 18.0 | $K_2O$ 4.0 | 20 | 5 |
| 38 | 19.5 | 11.7 | 46.8 | 18.0 | $K_2O$ 4.0 | 20 | 5 |
| 39 | 16.0 | 16.0 | 48.0 | 16.0 | $K_2O$ 4.0 | 20 | 5 |
| 40 | 15.6 | 11.7 | 50.7 | 18.0 | $K_2O$ 4.0 | 20 | 5 |
| 41 | 15.6 | 11.7 | 50.7 | 18.0 | $K_2O$ 4.0 | 0 | 5 |
| 42 | 15.6 | 11.7 | 50.7 | 18.0 | $K_2O$ 4.0 | 10 | 5 |
| 43 | 15.6 | 11.7 | 50.7 | 18.0 | $K_2O$ 4.0 | 30 | 5 |
| 44 | 15.6 | 11.7 | 50.7 | 18.0 | $K_2O$ 4.0 | 20 | 1 |
| 45 | 15.6 | 11.7 | 50.7 | 18.0 | $K_2O$ 4.0 | 20 | 2.5 |
| 46 | 15.6 | 11.7 | 50.7 | 18.0 | $K_2O$ 4.0 | 20 | 10 |
| 47 | 15.8 | 11.8 | 51.4 | 16.0 | $K_2O$ 5.0 | 20 | 5 |
| 48 | 15.8 | 11.8 | 51.4 | 20.0 | $K_2O$ 1.0 | 20 | 5 |
| 49 | 16.5 | 12.4 | 53.1 | 13.0 | $Na_2O$ 5.0 | 20 | 5 |
| 50 | 15.9 | 11.9 | 51.7 | 20.0 | $Na_2O$ 0.5 | 20 | 5 |
| 51 | 17.0 | 12.7 | 55.3 | 10.0 | $Li_2O$ 5.0 | 20 | 5 |
| 52 | 16.4 | 12.3 | 52.8 | 18.0 | $Li_2O$ 0.5 | 20 | 5 |
| 53 | 16.0 | 12.0 | 52.0 | 17.0 | $K_2O$ 2.0 + $Na_2O$ 1.0 | 20 | 5 |
| 54 | 16.8 | 12.6 | 54.6 | 13.0 | $Na_2O$ 2.0 + $Li_2O$ 1.0 | 20 | 5 |
| 55 | 16.1 | 12.1 | 52.3 | 17.0 | $K_2O$ 2.0 + $Li_2O$ 0.5 | 20 | 5 |
| 56 | 8.3 | 24.8 | 49.5 | 15.4 | $K_2O$ 2.0 | 20 | 5 |
| 57 | 31.4 | 3.9 | 43.2 | 18.3 | $K_2O$ 3.2 | 20 | 5 |
| 58 | 14.8 | 11.1 | 48.1 | 18.0 | $K_2O$ 8.0 | 20 | 5 |
| 59 | 17.6 | 13.2 | 57.2 | 8.0 | $K_2O$ 4.0 | 20 | 5 |
| 60 | 14.8 | 11.1 | 48.1 | 22.0 | $K_2O$ 4.0 | 20 | 5 |
| 61 | 15.6 | 11.7 | 50.7 | 18.0 | $K_2O$ 4.0 | 5 | 5 |
| 62 | 15.6 | 11.7 | 50.7 | 18.0 | $K_2O$ 4.0 | 40 | 5 |
| 63 | 15.6 | 11.7 | 50.7 | 18.0 | $K_2O$ 4.0 | 0 | 30 |
| Comparative example 2 | 18.3 | 16.4 | 56.2 | 9.1 | 0 | 20 | 5 |

TABLE 2-2

| | sintering temperature (°C.) | existence of cordierite growth | characteristics | | | | |
|---|---|---|---|---|---|---|---|
| | | | porosity (%) | specific inductive capacity | coefficient of thermal expansion (x/10$^{6°}$ C.) | transverse strength (Kgf/mm$^2$) | water resistance |
| Example 35 | 900 | O | 0.6 | 6.4 | 4.3 | 21.5 | O |
| 36 | 900 | O | 0.5 | 6.6 | 4.4 | 20.4 | O |
| 37 | 900 | O | 0.6 | 6.4 | 4.3 | 19.8 | O |
| 38 | 900 | O | 0.3 | 6.5 | 4.6 | 19.5 | O |
| 39 | 900 | O | 0.3 | 6.3 | 3.6 | 23.0 | O |
| 40 | 900 | O | 0.2 | 6.2 | 4.0 | 20.2 | O |
| 41 | 900 | O | 0.1 | 5.8 | 4.8 | 19.3 | O |
| 42 | 900 | O | 0.1 | 5.9 | 4.0 | 19.8 | O |
| 43 | 900 | O | 0.4 | 6.5 | 4.3 | 20.8 | O |
| 44 | 900 | O | 0.1 | 6.2 | 4.2 | 19.7 | O |

TABLE 2-2-continued

| | sintering temperature (°C.) | exist- ence of cordi- erite growth | porosity (%) | specific induct- ive capacity | coeffi- cient of thermal expansion (x/10^6° C.) | transverse strength (Kgf/mm²) | water resist- ance |
|---|---|---|---|---|---|---|---|
| 45 | 900 | O | 0.5 | 6.1 | 4.1 | 20.3 | O |
| 46 | 900 | O | 0.9 | 5.9 | 3.8 | 19.4 | O |
| 47 | 900 | O | 0.1 | 6.3 | 4.1 | 20.6 | O |
| 48 | 900 | O | 0.5 | 6.0 | 4.0 | 19.2 | O |
| 49 | 900 | O | 0.1 | 6.5 | 4.1 | 20.1 | O |
| 50 | 900 | O | 0.5 | 6.0 | 4.0 | 19.0 | O |
| 51 | 900 | O | 0.1 | 6.6 | 4.2 | 21.2 | O |
| 52 | 900 | O | 0.4 | 6.1 | 4.1 | 19.5 | O |
| 53 | 900 | O | 0.1 | 6.2 | 4.1 | 19.8 | O |
| 54 | 900 | O | 0.2 | 6.3 | 4.3 | 20.1 | O |
| 55 | 900 | O | 0.1 | 6.1 | 4.0 | 20.6 | O |
| 56 | 900 | X | 17.3 | 5.8 | 6.0 | 8.4 | O |
| 57 | 900 | X | 18.3 | 5.4 | 6.2 | 6.9 | O |
| 58 | substrate deformation | O | 0.1 | 6.3 | 4.8 | 19.0 | O |
| 59 | 900 | O | 18.5 | 5.9 | 4.7 | 9.4 | O |
| 60 | substrate deformation | O | 0.1 | 6.0 | 4.1 | 19.7 | O |
| 61 | 900 | O | 0.1 | 5.8 | 3.8 | 15.5 | O |
| 62 | 900 | O | 10.7 | 6.4 | 4.8 | 22.4 | O |
| 63 | 900 | O | 24.6 | 5.1 | 3.4 | 14.2 | O |
| Compara- tive example 2 | 900 | O | 22.5 | 5.6 | 4.6 | 7.6 | O |

As obvious from Table 2, the substrates in Examples 35–55, were sufficiently densified (a porosity of 0.1–0.9%) even at a sintering temperature of less than 1000° C., so that the substrates had a small specific inductive capacity (less than 6.5) and a coefficient of thermal expansion close to silicon (less than 4.6), and were excellent in transverse strength (more than 19 kgf/mm²) and water resistance.

At that time, in the range of temperature where a conductor inside layer does not melt, the higher that the sintering temperature of the ceramic substrate is, the more densification proceeds, leading to a larger transverse strength.

FIG. 16 is data of the X-ray diffraction of the material and the obtained sample in Example 40. From FIG. 16, it was found that cordierite grew by sintering the material.

In addition, FIG. 29 is a sketch of the TEM photomicrograph showing the inner structure of the sample obtained in Example 40, which shows that the cordierire 12 grew from the surface of the cordierire filler 11. Here, 13 represents an alumina filler and 15 represents a glass layer. Producing a ceramic substrate having such inner structure enables the mechanical properties such as transverse strength to be further improved by compound of filler, formed crystal and glass as matrix.

In Comparative Example 2 in which the substrate was manufactured by way of experiment based on the content disclosed in Japanese Laid-Open Publication No.225338/90, in sintering at a temperature of less than 900° C. required to keep Ag or Cu, etc. inside layers, the substrate had an insufficiently small porosity (22.5%) and insufficient densification, leading to a small transverse strength (7.6 kgf/mm²).

In Example 63, only cordierire was added as a filler to the glass powder, wherein the substrate had a high porosity and a small transverse strength.

Here, another group of Examples 65–106 is described below.

A glass powder comprising MgO, $Al_2O_3$, $SiO_2$, $B_2O_3$ and $R_2O$(R:alkali metal) in the compositions shown in Table 3 and having a mean particle diameter of 0.1–10 μm, a crystal powder of $Al_2O_3$ having a mean particle diameter of 0.1–10 μm, mullite powder having a mean particle diameter of 0.1–10 μm, a cordierire powder having a mean particle diameter of 0.1–10 μm, a quartz glass powder having a mean particle diameter of 0.1–10 μm and a crystal powder of $SiO_2$ having a mean particle diameter of 0.1–10 μm were mixed. As for the mixing ratio of glass powder and crystal powder, the ratio of crystal powder was as shown in Tables 3–5 and the rest was the ratio of glass powder. For example, in Example 65, the $3Al_2O_3.2SiO_2$(mullite) powder was 20 wt %, the cordierire was 5 wt %, the quartz powder was 5 wt % and the glass material was the rest 70 wt %.

Next, an adequate amount of organic binder, plasticizer and solvent respectively were added to the mixture and then, the same was kneaded to be a slurry of about 10,000 cps. The slurry was molded into a sheet 0.2 mm thick by a doctor blade method and dried at 80° C./min for about 10 minutes. Thereafter, the sheet was sintered at a temperature raised at a speed of 10° C./min and at about 850°–980° C. for 5–10 minutes. Thus, the production of the sintered body of ceramic substrate was completed.

Figure 34:
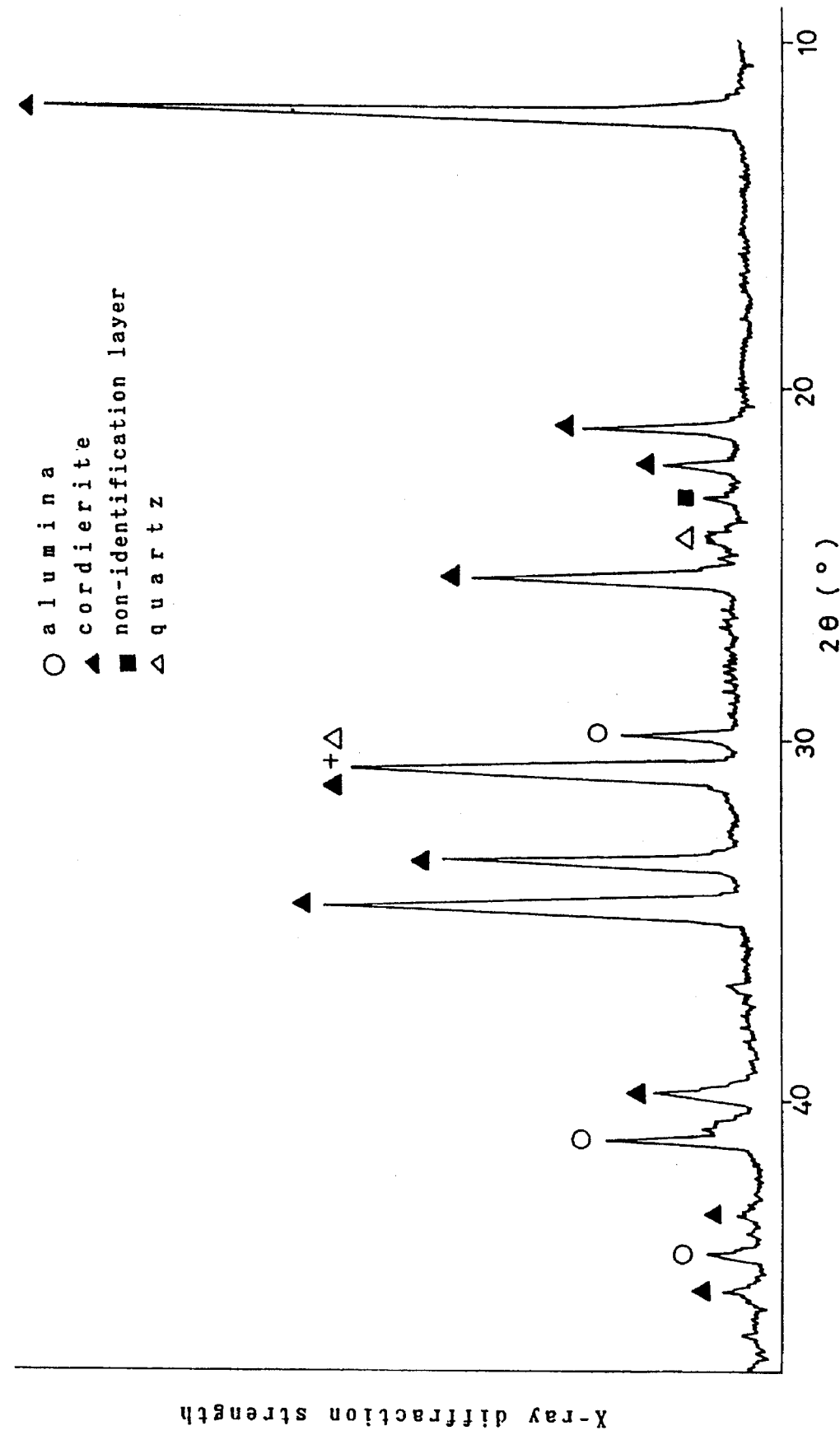
FIG. 34 is a graph indicating the data of X-ray diffraction strength in the X-ray diffraction of the sample obtained in Example 97.
Figure 35:
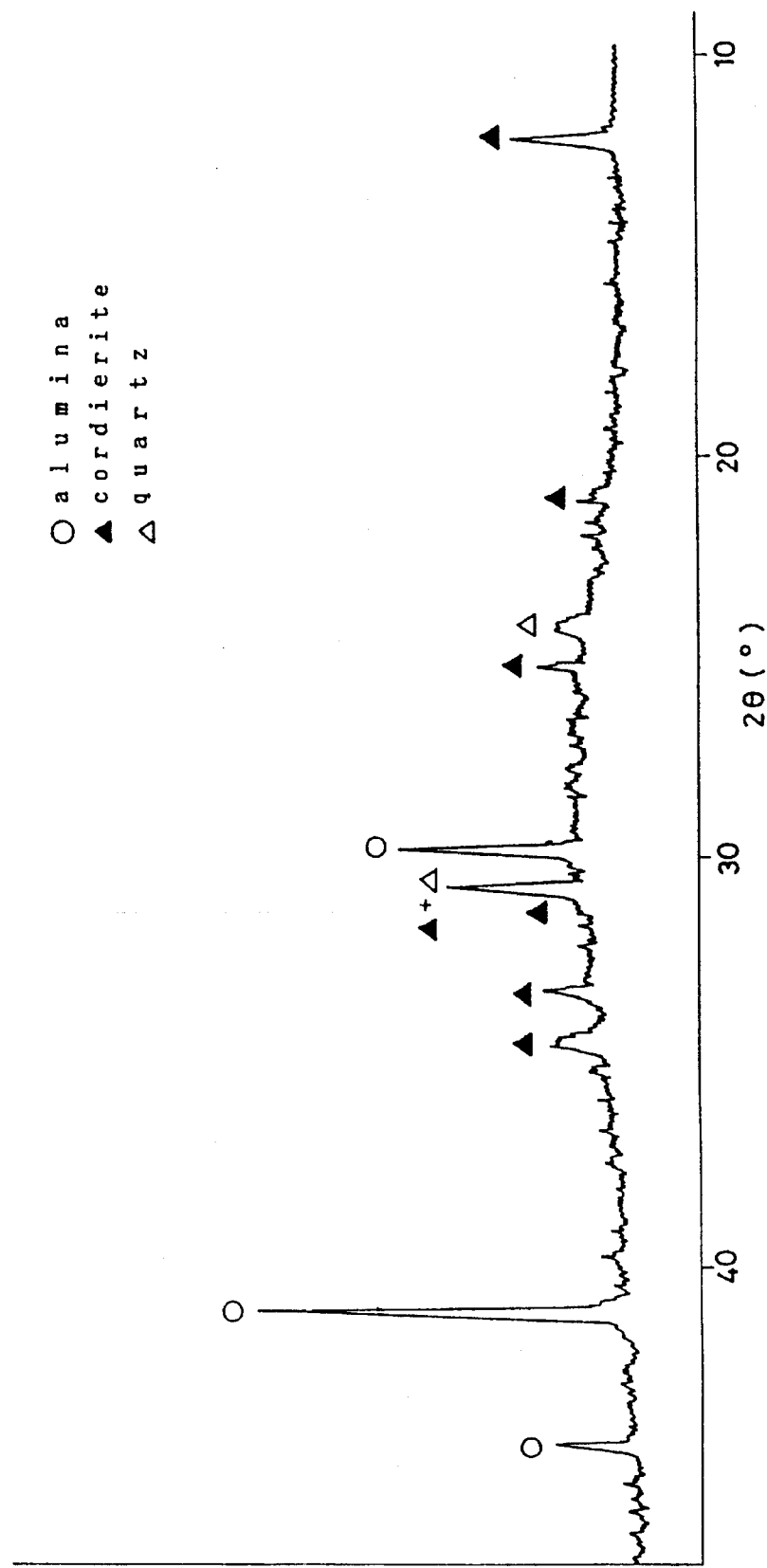
FIG. 35 is a graph indicating the data of X-ray diffraction strength of the material powder before being sintered in Example 97.
Figure 36:
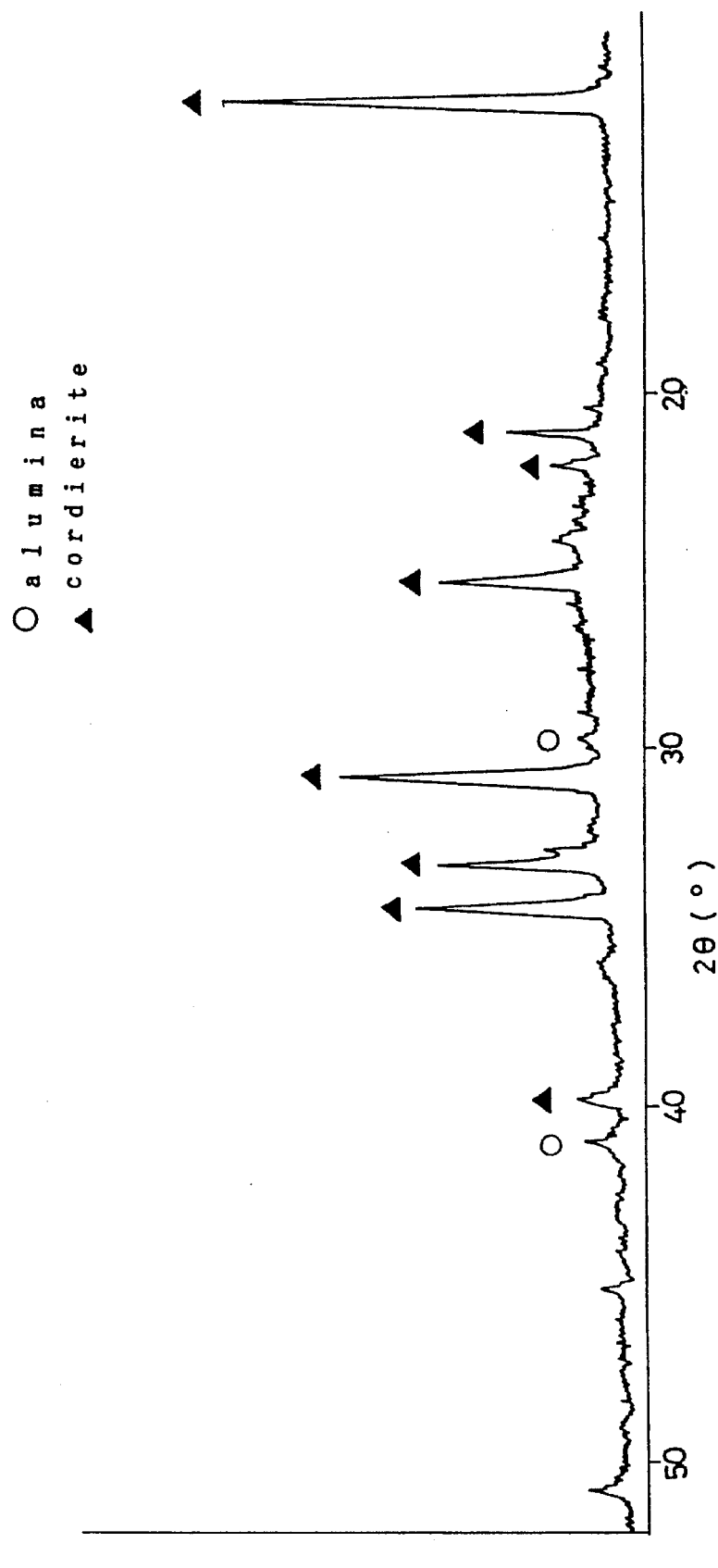
FIG. 36 is a graph indicating the data of X-ray diffraction strength in the X-ray diffraction of the sample obtained in Example 100.

Subsequently, the growth of a cordierite crystal on the produced ceramic substrate was confirmed by comparing the X-ray diffraction of the material powder being before sintered with that of the sintered body. And the porosity, specific inductive capacity, coefficient of thermal expansion and transverse strength of the ceramic substrate were measured and the water resistance of the ceramic substrate was evaluated. The charts of the data of X-ray diffraction strength of the ceramic substrate obtained and the material powder before being sintered in Example 97 are shown in FIGS. 34 and 35 respectively, and the conditions of producing the ceramic substrate and the characteristics of the obtained substrate are shown in Tables 3–5.

The porosity was determined by an Archimedes' method. The specific inductive capacity was measured with an impedance analyzer. The average of coefficients of thermal expansion at from the room temperature to 350° C. was measured with a linear expansion meter by contact. The transverse strength was measured by 3-point bending test. The water resistance was evaluated with the decrease in weight, after keeping a test specimen in the boiling water for a definite time.

Figure 37:
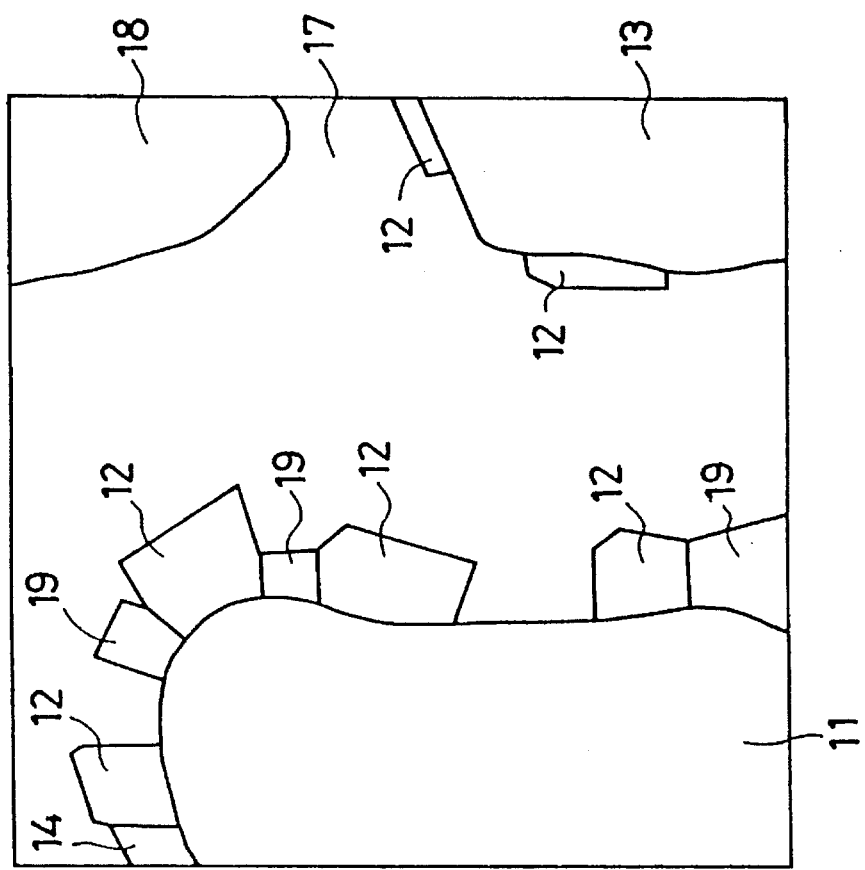
FIG. 37 is a sketch of the TEM photomicrograph obtained in the observation with a TEM of the structure of the ceramic substrate obtained in Example 97.
Figure 38:
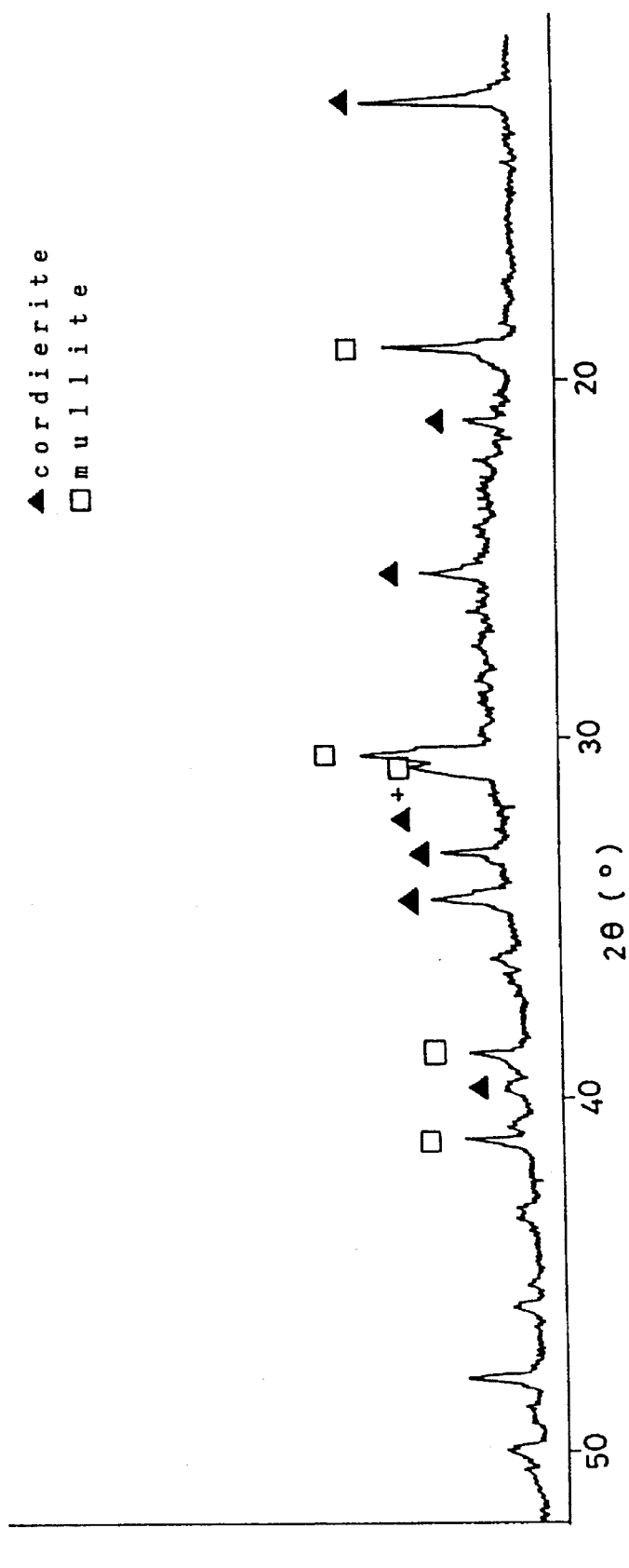
FIG. 38 is a graph indicating the data of X-ray diffraction strength in the X-ray diffraction of the sample obtained in Example 113.

Furthermore, the ceramic obtained in Example 97 was broken, and parts of them were observed with a TEM (transmission electron microscopy). A sketch of the obtained TEM photomicrograph is shown in FIG. 37.

TABLE 3-1

| | mixing ratio of glass materials | | | | | addition quantity of powder | | | |
| | | | | | | alumina | mullite | cordierite | quartz | quartz glass |
| Sample | MgO (wt %) | Al$_2$O$_3$ (wt %) | SiO$_2$ (wt %) | B$_2$O$_3$ (wt %) | R$_2$O (wt %) | (wt %) | (wt %) | (wt %) | (wt %) | (wt %) |
|---|---|---|---|---|---|---|---|---|---|---|
| Example | | | | | | | | | | |
| 65 | 11.4 | 19.0 | 45.6 | 20.0 | K$_2$O 4.0 | 0 | 20 | 5 | 5 | 0 |
| 66 | 15.6 | 19.5 | 42.9 | 18.0 | K$_2$O 4.0 | 0 | 20 | 5 | 5 | 0 |
| 67 | 11.7 | 15.6 | 50.7 | 18.0 | K$_2$O 4.0 | 0 | 20 | 5 | 5 | 0 |
| 68 | 19.5 | 11.7 | 46.8 | 18.0 | K$_2$O 4.0 | 0 | 20 | 5 | 5 | 0 |
| 69 | 16.0 | 16.0 | 48.0 | 16.0 | K$_2$O 4.0 | 0 | 20 | 5 | 5 | 0 |
| 70 | 15.6 | 11.7 | 50.7 | 18.0 | K$_2$O 4.0 | 0 | 20 | 5 | 5 | 0 |
| 71 | 15.6 | 11.7 | 50.7 | 18.0 | K$_2$O 4.0 | 0 | 20 | 5 | 5 | 0 |
| 72 | 15.6 | 11.7 | 50.7 | 18.0 | K$_2$O 4.0 | 0 | 20 | 5 | 5 | 0 |
| 73 | 15.6 | 11.7 | 50.7 | 18.0 | K$_2$O 4.0 | 0 | 0 | 5 | 5 | 0 |
| 74 | 15.6 | 11.7 | 50.7 | 18.0 | K$_2$O 4.0 | 0 | 10 | 5 | 5 | 0 |
| 75 | 15.6 | 11.7 | 50.7 | 18.0 | K$_2$O 4.0 | 0 | 30 | 5 | 5 | 0 |
| 76 | 15.6 | 11.7 | 50.7 | 18.0 | K$_2$O 4.0 | 0 | 20 | 1 | 5 | 0 |
| 77 | 15.6 | 11.7 | 50.7 | 18.0 | K$_2$O 4.0 | 0 | 20 | 2.5 | 5 | 0 |
| 78 | 15.6 | 11.7 | 50.7 | 18.0 | K$_2$O 4.0 | 0 | 20 | 10 | 5 | 0 |
| 79 | 15.6 | 11.7 | 50.7 | 18.0 | K$_2$O 4.0 | 0 | 20 | 5 | 1 | 0 |
| 80 | 15.6 | 11.7 | 50.7 | 18.0 | K$_2$O 4.0 | 0 | 20 | 5 | 10 | 0 |
| 81 | 15.6 | 11.7 | 50.7 | 18.0 | K$_2$O 4.0 | 0 | 10 | 5 | 20 | 0 |
| 82 | 15.6 | 11.7 | 50.7 | 18.0 | K$_2$O 4.0 | 0 | 0 | 5 | 30 | 0 |
| 83 | 15.6 | 11.7 | 50.7 | 18.0 | K$_2$O 4.0 | 0 | 20 | 5 | 0 | 1 |
| 84 | 15.6 | 11.7 | 50.7 | 18.0 | K$_2$O 4.0 | 0 | 20 | 5 | 0 | 5 |
| 85 | 15.6 | 11.7 | 50.7 | 18.0 | K$_2$O 4.0 | 0 | 20 | 5 | 0 | 10 |
| 86 | 15.6 | 11.7 | 50.7 | 18.0 | K$_2$O 4.0 | 0 | 10 | 5 | 0 | 20 |
| 87 | 15.6 | 11.7 | 50.7 | 18.0 | K$_2$O 4.0 | 0 | 0 | 5 | 0 | 30 |
| 88 | 15.8 | 11.8 | 51.4 | 16.0 | K$_2$O 5.0 | 0 | 20 | 5 | 5 | 0 |

TABLE 3-2

| | | | characteristics | | | | |
| | sintering temperature (°C.) | existence of cordierite growth | porosity (%) | specific inductive capacity | coefficient of thermal expansion (x/10$^{6\circ}$ C.) | transverse strength (Kgf/mm$^2$) | water resistance |
|---|---|---|---|---|---|---|---|
| Example | | | | | | | |
| 65 | 900 | ○ | 0.5 | 5.5 | 4.0 | 20.5 | ○ |
| 66 | 900 | ○ | 0.6 | 5.7 | 4.2 | 19.3 | ○ |
| 67 | 900 | ○ | 0.5 | 5.4 | 4.0 | 19.1 | ○ |
| 68 | 900 | ○ | 0.4 | 5.7 | 4.2 | 19.2 | ○ |
| 69 | 900 | ○ | 0.2 | 5.4 | 3.7 | 22.2 | ○ |
| 70 | 850 | ○ | 0.4 | 5.4 | 4.2 | 19.6 | ○ |
| 71 | 900 | ○ | 0.3 | 5.3 | 4.0 | 20.0 | ○ |
| 72 | 980 | ○ | 0.1 | 5.3 | 3.8 | 20.1 | ○ |
| 73 | 900 | ○ | 0.1 | 5.0 | 4.6 | 18.0 | ○ |
| 74 | 900 | ○ | 0.2 | 5.2 | 4.3 | 18.1 | ○ |
| 75 | 900 | ○ | 0.3 | 5.6 | 4.2 | 22.8 | ○ |
| 76 | 900 | ○ | 0.2 | 5.3 | 4.2 | 21.8 | ○ |
| 77 | 900 | ○ | 0.2 | 5.3 | 4.0 | 21.9 | ○ |
| 78 | 900 | ○ | 0.6 | 5.3 | 3.9 | 21.4 | ○ |
| 79 | 900 | ○ | 0.3 | 5.4 | 4.0 | 20.2 | ○ |
| 80 | 900 | ○ | 0.3 | 5.2 | 3.9 | 20.2 | ○ |
| 81 | 900 | ○ | 0.2 | 5.0 | 4.2 | 20.0 | ○ |
| 82 | 900 | ○ | 0.3 | 4.9 | 4.3 | 19.1 | ○ |
| 83 | 900 | ○ | 0.1 | 5.4 | 4.1 | 20.0 | ○ |

TABLE 3-2-continued

| | | exist- | characteristics | | | | |
|---|---|---|---|---|---|---|---|
| | sintering temperature (°C.) | ence of cordierite growth | porosity (%) | specific inductive capacity | coefficient of thermal expansion (x/10⁶° C.) | transverse strength (Kgf/mm²) | water resistance |
| 84 | 900 | O | 0.4 | 5.3 | 4.0 | 19.5 | O |
| 85 | 900 | O | 0.2 | 5.2 | 3.8 | 19.7 | O |
| 86 | 900 | O | 0.1 | 5.2 | 4.2 | 20.1 | O |
| 87 | 900 | O | 0.2 | 4.8 | 4.4 | 19.5 | O |
| 88 | 900 | O | 0.2 | 5.5 | 3.8 | 19.9 | O |

TABLE 4-1

| | mixing ratio of glass materials | | | | | | addition quantity of powder | | | | |
|---|---|---|---|---|---|---|---|---|---|---|---|
| Sample | MgO (wt %) | $Al_2O_3$ (wt %) | $SiO_2$ (wt %) | $B_2O_3$ (wt %) | $R_2O$ | (wt %) | alumina (wt %) | mullite (wt %) | cordierite (wt %) | quartz (wt %) | quartz glass (wt %) |
| Example 89 | 15.8 | 11.8 | 51.4 | 20.0 | $K_2O$ | 1.0 | 0 | 20 | 5 | 5 | 0 |
| Example 90 | 16.5 | 12.4 | 53.1 | 13.0 | $Na_2O$ | 5.0 | 0 | 20 | 5 | 5 | 0 |
| Example 91 | 15.9 | 11.9 | 51.7 | 20.0 | $Na_2O$ | 0.5 | 0 | 20 | 5 | 5 | 0 |
| Example 92 | 17.0 | 12.7 | 55.3 | 10.0 | $Li_2O$ | 5.0 | 0 | 20 | 5 | 5 | 0 |
| Example 93 | 16.4 | 12.3 | 52.8 | 18.0 | $Li_2O$ | 0.5 | 0 | 20 | 5 | 5 | 0 |
| Example 94 | 16.0 | 12.0 | 52.0 | 17.0 | $K_2O$ | 2.0+ | 0 | 20 | 5 | 5 | 0 |
| Example 95 | 16.8 | 12.6 | 54.6 | 13.0 | $Na_2O$ | 2.0+ | 0 | 20 | 5 | 5 | 0 |
| Example 96 | 16.1 | 12.1 | 52.3 | 17.0 | $K_2O$ | 2.0+ | 0 | 20 | 5 | 5 | 0 |
| Example 97 | 15.6 | 11.7 | 50.7 | 18.0 | $K_2O$ | 4.0 | 20 | 0 | 5 | 5 | 0 |
| Example 98 | 15.6 | 11.7 | 50.7 | 18.0 | $K_2O$ | 4.0 | 20 | 0 | 5 | 0 | 5 |
| Example 99 | 18.5 | 5.5 | 52.0 | 20.0 | $K_2O$ | 4.0 | 10 | 0 | 5 | 0 | 5 |
| Example 100 | 15.6 | 11.7 | 50.7 | 18.0 | $K_2O$ | 4.0 | 10 | 0 | 0.5 | 0 | 10 |
| Example 101 | 15.6 | 11.7 | 50.7 | 18.0 | $Na_2O$ | 4.0 | 0 | 0 | 5 | 35 | 0 |
| Example 102 | 15.6 | 11.7 | 50.7 | 18.0 | $Na_2O$ | 4.0 | 0 | 0 | 5 | 0 | 35 |
| Example 103 | 15.6 | 11.7 | 50.7 | 18.0 | $Na_2O$ | 4.0 | 0 | 0 | 5 | 20 | 15 |
| Example 104 | 15.6 | 11.7 | 50.7 | 18.0 | $K_2O$ | 4.0 | 35 | 0 | 1 | 0 | 4 |
| Example 105 | 15.6 | 11.7 | 50.7 | 18.0 | $K_2O$ | 4.0 | 0 | 35 | 1 | 0 | 4 |
| Example 106 | 15.6 | 11.7 | 50.7 | 18.0 | $K_2O$ | 4.0 | 20 | 15 | 1 | 0 | 4 |

TABLE 4-2

| | | | characteristics | | | | |
|---|---|---|---|---|---|---|---|
| | sintering temperature (°C.) | existence of cordierite growth | porosity (%) | specific inductive capacity | coefficient of thermal expansion (x/10⁶ °C.) | transverse strength (Kgf/mm²) | water resistance |
| Example 89 | 900 | O | 0.3 | 5.3 | 4.0 | 19.2 | O |
| Example 90 | 900 | O | 0.1 | 5.7 | 3.9 | 19.1 | O |
| Example 91 | 900 | O | 0.4 | 5.3 | 4.0 | 20.9 | O |
| Example 92 | 900 | O | 0.3 | 5.8 | 4.0 | 19.4 | O |
| Example 93 | 900 | O | 0.2 | 5.4 | 3.8 | 19.5 | O |
| Example 94 | 900 | O | 0.3 | 5.4 | 4.1 | 19.9 | O |
| Example 95 | 900 | O | 0.1 | 5.5 | 4.0 | 20.5 | O |
| Example 96 | 900 | O | 0.4 | 5.3 | 3.8 | 20.4 | O |
| Example 97 | 900 | O | 0.2 | 5.7 | 3.7 | 21.2 | O |
| Example 98 | 900 | O | 0.3 | 5.8 | 3.7 | 20.8 | O |
| Example 99 | 900 | O | 0.3 | 5.4 | 3.5 | 19.2 | O |
| Example 100 | 900 | O | 0.4 | 5.3 | 4.1 | 19.6 | O |
| Example 101 | 900 | O | 0.3 | 4.6 | 4.8 | 18.0 | O |
| Example 102 | 900 | O | 1.1 | 4.7 | 3.4 | 18.6 | O |
| Example 103 | 900 | O | 1.0 | 4.6 | 4.2 | 18.1 | O |
| Example 104 | 900 | O | 0.9 | 6.2 | 4.9 | 24.5 | O |
| Example 105 | 900 | O | 1.2 | 5.9 | 4.1 | 22.1 | O |
| Example 106 | 900 | O | 1.0 | 6.0 | 4.6 | 22.8 | O |

TABLE 5-1

| Sample | mixing ratio of glass materials | | | | | | addition quantity of powder | | | | |
|---|---|---|---|---|---|---|---|---|---|---|---|
| | MgO (wt %) | Al$_2$O$_3$ (wt %) | SiO$_2$ (wt %) | B$_2$O$_3$ (wt %) | R$_2$O | (wt %) | alumina (wt %) | mullite (wt %) | cordierite (wt %) | quartz (wt %) | quartz glass (wt %) |
| Comparative example 3 | 18.3 | 16.4 | 56.2 | 9.1 | | 0 | 0 | 20 | 5 | 5 | 0 |
| Comparative example 4 | 15.6 | 11.7 | 50.7 | 18.0 | K$_2$O | 4.0 | 20 | 0 | 0 | 5 | 0 |
| Comparative example 5 | 8.3 | 24.8 | 49.5 | 15.4 | K$_2$O | 2.0 | 0 | 20 | 5 | 5 | 0 |
| Comparative example 6 | 31.4 | 3.9 | 43.2 | 18.3 | K$_2$O | 3.2 | 0 | 20 | 5 | 5 | 0 |
| Comparative example 7 | 14.8 | 11.1 | 48.1 | 18.0 | K$_2$O | 8.0 | 0 | 20 | 5 | 5 | 0 |
| Comparative example 8 | 17.6 | 13.2 | 57.2 | 8.0 | K$_2$O | 4.0 | 0 | 20 | 5 | 5 | 0 |
| Comparative example 9 | 14.8 | 11.1 | 48.1 | 22.0 | K$_2$O | 4.0 | 0 | 20 | 5 | 5 | 0 |
| Comparative example 10 | 15.6 | 11.7 | 50.7 | 18.0 | K$_2$O | 4.0 | 0 | 5 | 5 | 5 | 0 |
| Comparative example 11 | 15.6 | 11.7 | 50.7 | 18.0 | K$_2$O | 4.0 | 0 | 40 | 5 | 5 | 0 |
| Comparative example 12 | 15.6 | 11.7 | 50.7 | 18.0 | K$_2$O | 4.0 | 40 | 0 | 5 | 5 | 0 |
| Comparative example 13 | 15.6 | 11.7 | 50.7 | 18.0 | K$_2$O | 4.0 | 0 | 0 | 30 | 5 | 0 |
| Comparative example 14 | 15.6 | 11.7 | 50.7 | 18.0 | K$_2$O | 4.0 | 0 | 0 | 5 | 40 | 0 |
| Comparative example 15 | 15.6 | 11.7 | 50.7 | 18.0 | K$_2$O | 4.0 | 0 | 0 | 5 | 0 | 40 |
| Comparative example 16 | 15.6 | 11.7 | 50.7 | 18.0 | K$_2$O | 4.0 | 0 | 20 | 0 | 5 | 0 |

TABLE 5-2

| | | | characteristics | | | | |
|---|---|---|---|---|---|---|---|
| | sintering temperature (°C.) | existence of cordierite growth | porosity (%) | specific inductive capacity | coefficient of thermal expansion (×/10$^6$ °C.) | transverse strength (Kgf/mm$^2$) | water resistance |
| Comparative example 3 | 900 | ○ | 23.9 | 4.4 | 4.4 | 5.6 | ○ |
| Comparative example 4 | 900 | ○ | 0.9 | 5.7 | 4.8 | 18.5 | ○ |
| Comparative example 5 | 900 | x | 18.1 | 4.7 | 5.8 | 5.3 | ○ |
| Comparative example 6 | 900 | x | 19.9 | 4.2 | 6.0 | 5.0 | ○ |
| Comparative example 7 | substrate deformaton | ○ | 0.1 | 5.6 | 4.8 | 19.2 | ○ |
| Comparative example 8 | 900 | ○ | 19.6 | 4.6 | 4.6 | 7.2 | ○ |
| Comparative ex- | substrate deformaton | ○ | 0.1 | 5.3 | 4.2 | 19.5 | ○ |

TABLE 5-2-continued

| | sintering temperature (°C.) | existence of cordierite growth | porosity (%) | specific inductive capacity | coefficient of thermal expansion (×/10⁶ °C.) | transverse strength (Kgf/mm²) | water resistance |
|---|---|---|---|---|---|---|---|
| ample 9 Comparative example 10 | 900 | O | 0.2 | 5.1 | 3.8 | 15.0 | O |
| Comparative example 11 | 900 | O | 11.0 | 5.5 | 4.9 | 19.4 | O |
| Comparative example 12 | 900 | O | 10.6 | 5.6 | 5.3 | 20.2 | O |
| Comparative example 13 | 900 | O | 27.9 | 4.2 | 3.5 | 12.3 | O |
| Comparative example 14 | 900 | O | 9.6 | 4.4 | 4.5 | 14.2 | O |
| Comparative example 15 | 900 | O | 9.2 | 4.6 | 4.4 | 13.8 | O |
| Comparative example 16 | 900 | x | 0.2 | 5.5 | 5.5 | 17.6 | O |

As obvious from Tables 3–5, the substrates according to the Examples were sufficiently densified even at a sintering temperature of less than 1000° C., so that the substrates had a small specific inductive capacity and a coefficient of thermal expansion close to silicon, and were excellent in transverse strength and water resistance.

At that time, as far as a conductor inside layer does not melt, the higher that the sintering temperature of the ceramic substrate is, the more densification proceeds, leading to a larger transverse strength. Therefore, sintering at a high temperature in the range of temperature where a conductor inside layer does not melt in preferable.

FIGS. 34 and 35 are data of X-ray diffraction of the obtained sample and the material is Example 97 respectively. From them, it was found that cordierire grew by sintering the material.

In addition, FIG. 37 is a sketch of the TEM photomicrograph showing the inner structure of the sample obtained in Example 97, which shows that the growing cordierire 12 grew from the cordierire filler 11 and the alumina filler 13. Here, 18 represents a quartz filler, 17 represents a glass layer and 19 represents an unidentified layer. Producing a ceramic substrate having such inner structure promotes compounding of filler added as material, formed crystal and glass as matrix, resulting in further improving the mechanical properties such as transverse strength.

In Comparative Example 3 in which the substrate was manufactured by way of experiment based on the content disclosed in Japanese Laid-Open Publication No.225338/90, in sintering at a temperature of less than 900° C. required to keep Ag or Cu, etc. inside layers, the substrate had an insufficiently small porosity and insufficient densification, leading to a small transverse strength.

In Comparative Example 4, only alumina and quartz were added as filler to the glass powder, wherein it took 600-minute sintering in order to produce the ceramic substrate having the characteristics shown in Table 3. On the other hand, in the Examples such as Example 65, it took 30-minute sintering, much shorter than in Comparative Example 4.

Here, the other group of Examples 111–135 is described below.

A glass powder comprising MgO, $Al_2O_3$, $SiO_2$, $B_2O_3$ and $R_2O$(R:alkali metal) in the compositions shown in Table 6 and having a mean particle diameter of 0.1–10 μm, a crystal grain of cordierite having a mean particle diameter of 0.1–10 μm and a crystal grain of $3Al_2O_3 \cdot 2SiO_2$ having a mean particle diameter of 0.1–10 μm were mixed. As for the mixing ratio of glass powder and crystal powder, the ratio of crystal powder was as shown in Table 6 and the rest was the ratio of glass powder. For example, in Example 111, the $3Al_2O_3 \cdot 2SiO_2$(mullite filler) was 20 wt %, the cordierire filler was 5 wt % and the glass material was the rest 75 wt %.

Next, an adequate amount of organic binder, plasticizer and solvent respectively were added to the mixture and then, the same was kneaded to be a slurry of about 10,000 cps. The slurry was molded into a sheet 0.2 mm thick by a doctor blade method and dried at 80° C. for about 10 minutes. Thereafter, the sheet was sintered at a temperature raised at a speed of 10° C./min and at about 850°–980° C. for 5–240 minutes. Thus, the production of the sintered body of ceramic substrate was completed.

Figure 39:
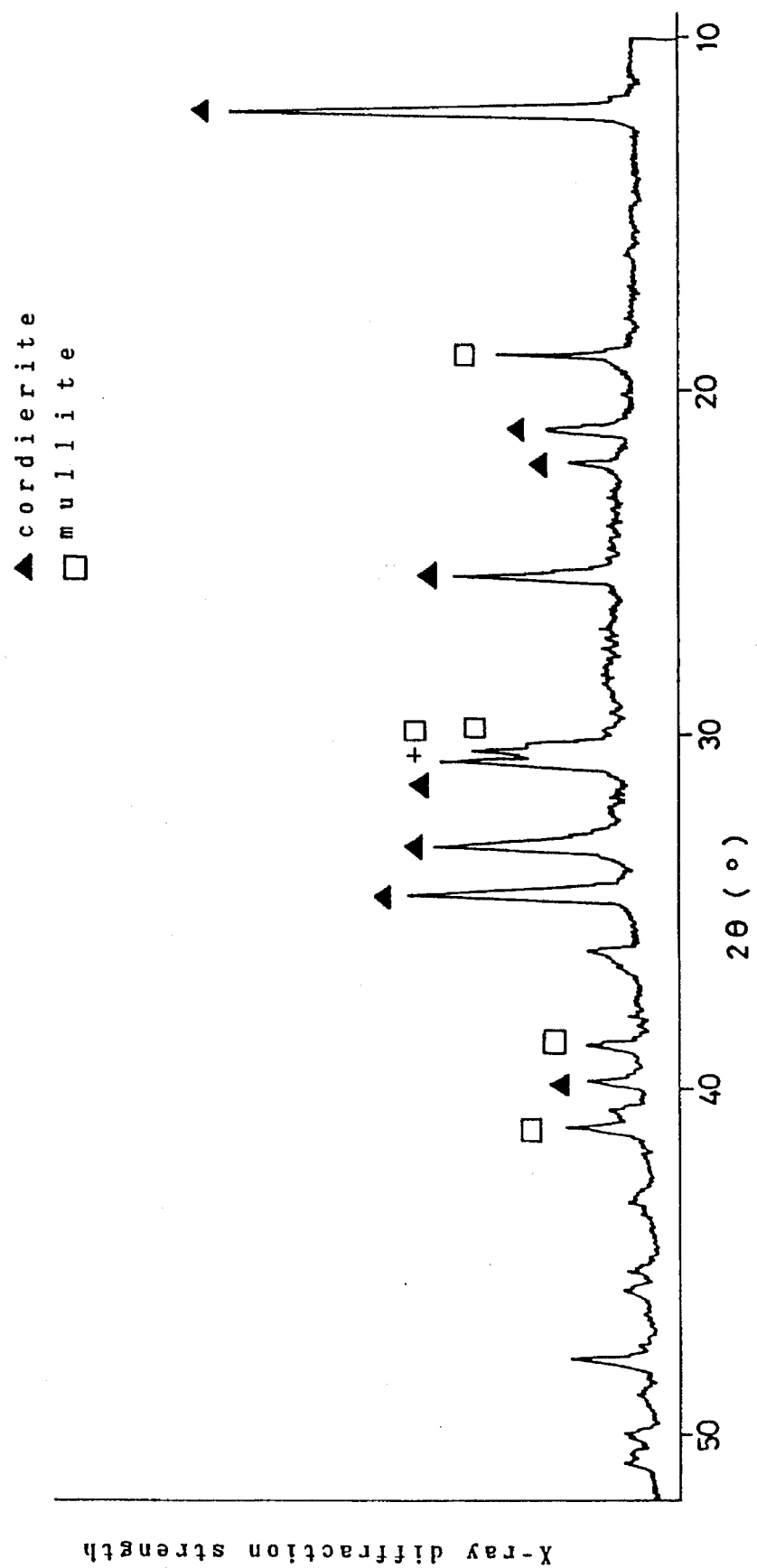
FIG. 39 is a graph indicating the data of X-ray diffraction strength in the X-ray diffraction of the sample obtained in Example 116.
Figure 40:
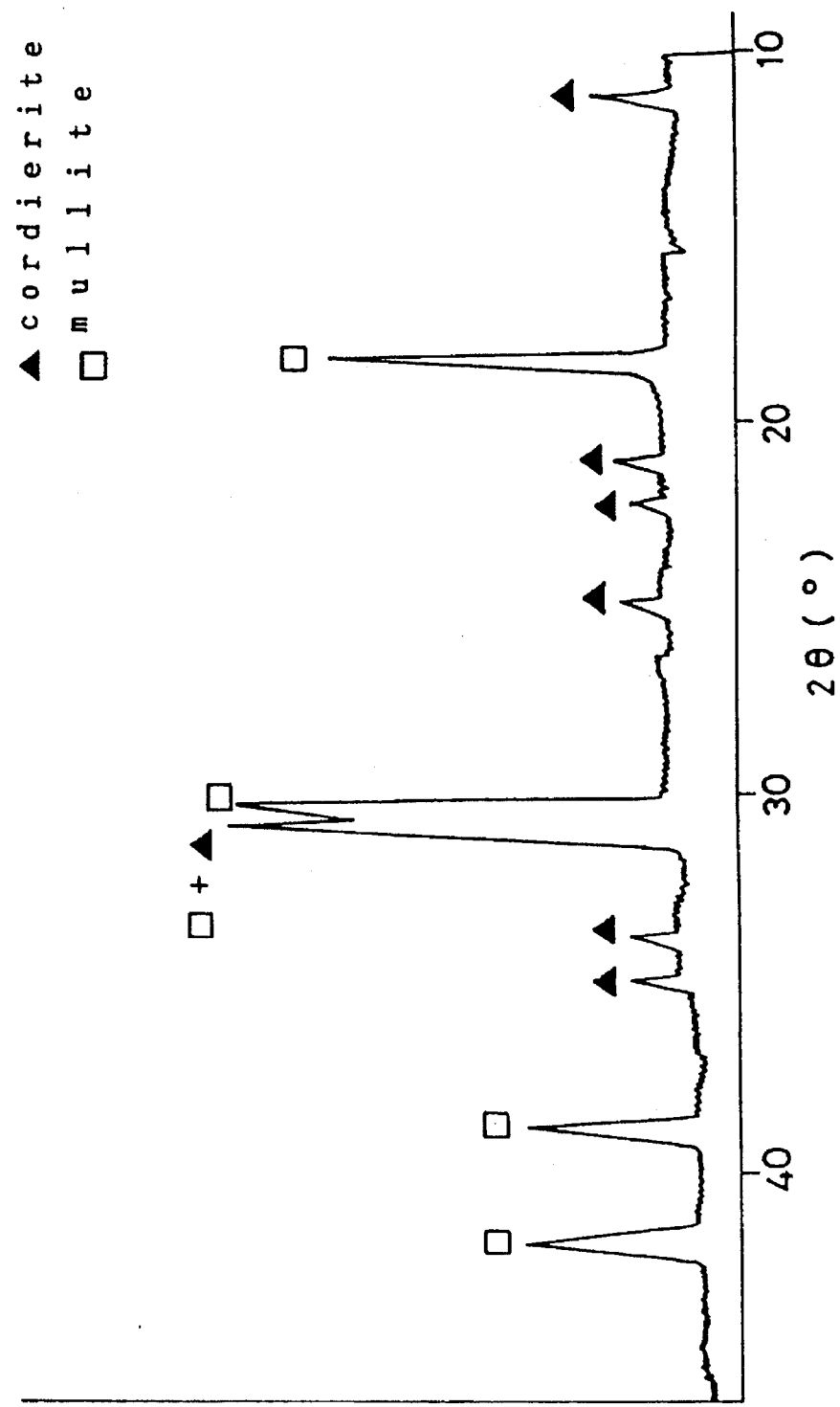
FIG. 40 is a graph indicating the data of X-ray diffraction strength of the material powder before sintered in Example 116.
Figure 41:
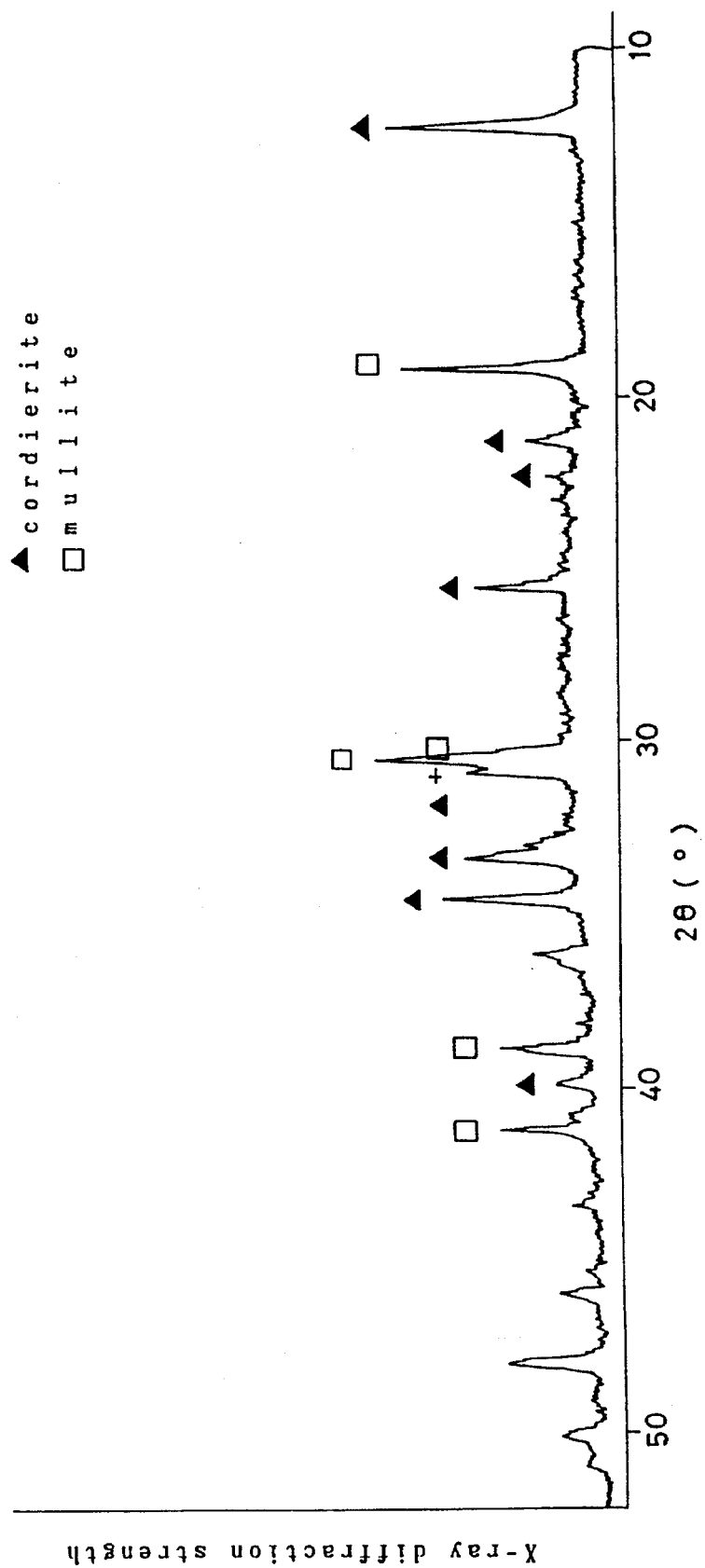
FIG. 41 is a graph indicating the data of X-ray diffraction strength in the X-ray diffraction of the sample obtained in Example 118.

Subsequently, the growth of a cordierire crystal on the produced ceramic substrate was confirmed by the X-ray diffraction of the material powder before being sintered and the sintered body. And the porosity, specific inductive capacity, coefficient of thermal expansion and transverse strength of the ceramic substrate were measured. The data of X-ray diffraction strength of the material powder before being sintered and the ceramic substrate obtained in Example 116 are shown in FIGS. 39 and 40 respectively, and the conditions of producing the ceramic substrate and the characteristics of the obtained substrate are shown in Table 6.

The porosity was determined by an Archimedes' method. The specific inductive capacity was measured with an impedance analyzer. The average of coefficients of thermal expansion at from the room temperature to 350° C. was measured with a linear expansion meter by contact. The transverse strength was measured by 3-point bending test. The water resistance was evaluated with the decrease in weight, after keeping a test specimen in the boiling water for a definite time.

And the data of X-diffraction strength of the ceramic substrate obtained in Comparative Example 18 is shown in FIG. 43.

Figure 42:
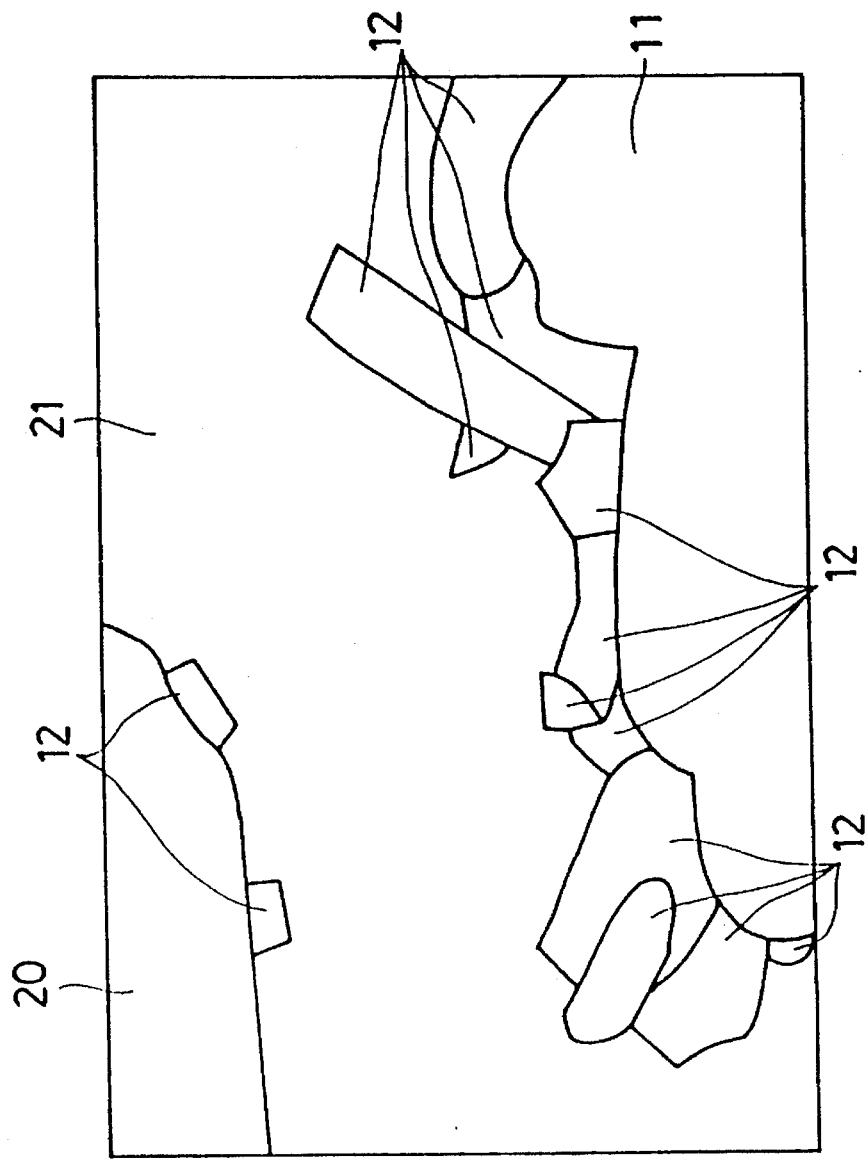
FIG. 42 is a sketch of the TEM photomicrograph obtained in the observation with a TEM of the structure of the ceramic substrate obtained in Example 116.

Furthermore, the ceramic obtained in Example 116 were broken, and parts of them was observed with a TEM (transmission electron microscopy). A sketch of the obtained TEM photomicrograph is shown in FIG. 42.

TABLE 6-1

| Sample | mixing ratio of glass materials | | | | | | addition quantity of alumina filler (wt %) | addition quantity of cordierite filler (wt %) |
|---|---|---|---|---|---|---|---|---|
| | MgO (wt %) | $Al_2O_3$ (wt %) | $SiO_2$ (wt %) | $B_2O_3$ (wt %) | $R_2O$ | (wt %) | | |
| Example 111 | 11.4 | 19.0 | 45.6 | 20.0 | $K_2O$ | 4.0 | 20 | 5 |
| Example 112 | 15.6 | 19.5 | 42.9 | 18.0 | $K_2O$ | 4.0 | 20 | 5 |
| Example 113 | 11.7 | 15.6 | 50.7 | 18.0 | $K_2O$ | 4.0 | 20 | 5 |
| Example 114 | 19.5 | 11.7 | 46.8 | 18.0 | $K_2O$ | 4.0 | 20 | 5 |
| Example 115 | 16.0 | 16.0 | 48.0 | 16.0 | $K_2O$ | 4.0 | 20 | 5 |
| Example 116 | 15.6 | 11.7 | 50.7 | 18.0 | $K_2O$ | 4.0 | 20 | 5 |
| Example 117 | 15.6 | 11.7 | 50.7 | 18.0 | $K_2O$ | 4.0 | 10 | 5 |
| Example 118 | 15.6 | 11.7 | 50.7 | 18.0 | $K_2O$ | 4.0 | 30 | 5 |
| Example 119 | 15.6 | 11.7 | 50.7 | 18.0 | $K_2O$ | 4.0 | 20 | 1 |
| Example 120 | 15.6 | 11.7 | 50.7 | 18.0 | $K_2O$ | 4.0 | 20 | 2.5 |
| Example 121 | 15.6 | 11.7 | 50.7 | 18.0 | $K_2O$ | 4.0 | 20 | 10 |
| Example 122 | 15.8 | 11.8 | 51.4 | 16.0 | $K_2O$ | 5.0 | 20 | 5 |
| Example 123 | 15.8 | 11.8 | 51.4 | 20.0 | $K_2O$ | 1.0 | 20 | 5 |
| Example 124 | 16.5 | 12.4 | 53.1 | 13.0 | $Na_2O$ | 5.0 | 20 | 5 |
| Example 125 | 15.9 | 11.9 | 51.7 | 20.0 | $Na_2O$ | 0.5 | 20 | 5 |
| Example 126 | 17.0 | 12.7 | 55.0 | 10.0 | $Li_2O$ | 5.0 | 20 | 5 |
| Example 127 | 16.4 | 12.3 | 52.8 | 18.0 | $Li_2O$ | 0.5 | 20 | 5 |
| Example 128 | 16.0 | 12.0 | 52.0 | 17.0 | $K_2O$ | $2.0 + Na_2O$ 1.0 | 20 | 5 |
| Example 129 | 16.8 | 12.6 | 54.6 | 13.0 | $Na_2O$ | $2.0 + Li_2O$ 1.0 | 20 | 5 |
| Example 130 | 16.1 | 12.1 | 52.3 | 17.0 | $K_2O$ | $2.0 + Li_2O$ 0.5 | 20 | 5 |
| Example 131 | 15.6 | 11.7 | 50.7 | 18.0 | $K_2O$ | 4.0 | 5 | 20 |
| Example 132 | 15.6 | 11.7 | 50.7 | 18.0 | $K_2O$ | 4.0 | 20 | 5 |
| Example 133 | 16.0 | 16.0 | 48.0 | 16.0 | $K_2O$ | 4.0 | 20 | 5 |
| Example 134 | 15.6 | 11.7 | 50.7 | 18.0 | $K_2O$ | 4.0 | 20 | 5 |
| Example 135 | 16.0 | 16.0 | 48.0 | 16.0 | $K_2O$ | 4.0 | 20 | 5 |
| Comparative example 17 | 18.3 | 16.4 | 56.2 | 9.1 | — | | 20 | 5 |
| Comparative example 18 | 15.6 | 11.7 | 50.7 | 18.0 | $K_2O$ | 4.0 | 20 | 0 |
| Comparative example 19 | 8.3 | 24.8 | 49.5 | 15.4 | $K_2O$ | 2.0 | 20 | 5 |
| Comparative example 20 | 31.4 | 3.9 | 43.2 | 18.3 | $K_2O$ | 3.2 | 20 | 5 |
| Comparative example 21 | 14.8 | 11.1 | 48.1 | 18.0 | $K_2O$ | 8.0 | 20 | 5 |
| Comparative example 22 | 17.6 | 13.2 | 57.2 | 8.0 | $K_2O$ | 4.0 | 20 | 5 |
| Comparative example 23 | 14.8 | 11.1 | 48.1 | 22.0 | $K_2O$ | 4.0 | 20 | 5 |
| Comparative example 24 | 15.6 | 11.7 | 50.7 | 18.0 | $K_2O$ | 4.0 | 40 | 5 |
| Comparative example 25 | 15.6 | 11.7 | 50.7 | 18.0 | $K_2O$ | 4.0 | 0 | 30 |

TABLE 6-2

| | | | characteristics | | | | |
|---|---|---|---|---|---|---|---|
| | sintering temperature (°C.) | existence of cordierite growth | porosity (%) | specific inductive capacity | coefficient of thermal expansion (×/10⁶ °C.) | transverse strength (Kgf/mm²) | water resistance |
| Example 111 | 900 | ○ | 0.7 | 5.9 | 4.0 | 19.6 | ○ |
| Example 112 | 900 | ○ | 0.5 | 6.0 | 4.1 | 19.0 | ○ |
| Example 113 | 900 | ○ | 0.5 | 5.9 | 4.1 | 18.4 | ○ |
| Example 114 | 900 | ○ | 0.4 | 5.9 | 4.2 | 18.4 | ○ |
| Example 115 | 900 | ○ | 0.3 | 5.8 | 3.4 | 21.2 | ○ |
| Example 116 | 900 | ○ | 0.1 | 5.6 | 3.7 | 18.9 | ○ |
| Example 117 | 900 | ○ | 0.3 | 5.3 | 3.6 | 18.2 | ○ |
| Example 118 | 900 | ○ | 0.5 | 6.0 | 4.0 | 19.4 | ○ |
| Example 119 | 900 | ○ | 0.4 | 5.6 | 4.2 | 17.8 | ○ |
| Example 120 | 900 | ○ | 0.7 | 5.6 | 3.7 | 18.3 | ○ |
| Example 121 | 900 | ○ | 0.9 | 5.3 | 3.4 | 17.9 | ○ |
| Example 122 | 900 | ○ | 0.2 | 5.8 | 3.7 | 18.9 | ○ |
| Example 123 | 900 | ○ | 0.5 | 5.4 | 3.7 | 18.5 | ○ |
| Example 124 | 900 | ○ | 0.2 | 6.0 | 3.8 | 18.8 | ○ |
| Example 125 | 900 | ○ | 0.4 | 5.4 | 3.6 | 17.3 | ○ |
| Example 126 | 900 | ○ | 0.1 | 6.1 | 3.8 | 20.0 | ○ |
| Example 127 | 900 | ○ | 0.3 | 5.5 | 3.7 | 18.1 | ○ |
| Example 128 | 900 | ○ | 0.2 | 5.7 | 3.7 | 18.1 | ○ |
| Example 129 | 900 | ○ | 0.2 | 5.7 | 3.9 | 18.7 | ○ |
| Example 130 | 900 | ○ | 0.2 | 5.6 | 3.6 | 19.4 | ○ |
| Example 131 | 900 | ○ | 0.3 | 5.8 | 4.0 | 17.1 | ○ |
| Example 132 | 850 | ○ | 0.2 | 5.8 | 4.1 | 18.5 | ○ |
| Example 133 | 850 | ○ | 0.3 | 6.0 | 3.9 | 20.2 | ○ |
| Example 134 | 980 | ○ | 0.1 | 5.5 | 3.5 | 18.9 | ○ |
| Example 135 | 980 | ○ | 0.3 | 5.7 | 3.3 | 20.4 | ○ |
| Comparative example 17 | 900 | ○ | 24.6 | 5.0 | 4.2 | 5.2 | ○ |
| Comparative example 18 | 900 | x | 0.1 | 5.8 | 5.7 | 17.2 | ○ |
| Comparative example 19 | 900 | x | 19.0 | 5.3 | 5.8 | 5.5 | ○ |
| Comparative example 20 | 900 | x | 19.8 | 5.6 | 6.0 | 5.0 | ○ |
| Comparative example 21 | substrate deformation | ○ | 0.2 | 5.8 | 4.5 | 17.1 | ○ |
| Comparative example 22 | 900 | ○ | 19.4 | 5.3 | 4.4 | 7.9 | ○ |
| Comparative example 23 | substrate deformation | ○ | 0.2 | 5.5 | 3.7 | 18.1 | ○ |
| Comparative example 24 | 900 | ○ | 12.4 | 5.9 | 4.5 | 20.2 | ○ |
| Comparative example 25 | 900 | ○ | 26.0 | 5.5 | 3.1 | 11.9 | ○ |

As obvious from Table 6, the substrates were sufficiently densified even at a sintering temperature of less than 1000° C., so that the substrates had a small specific inductive capacity and a coefficient of thermal expansion close to silicon, and were excellent in transverse strength and water resistance.

At that time, as far as a conductor inside layer does not melt, the higher that the sintering temperature of the ceramic substrate is, the more densification proceeds, leading to a larger transverse strength.

FIG. 40 is a graph indicating the data of X-ray diffraction of the material in Example 116, and FIG. 39 is a graph indicating the data of X-ray diffraction of the sample obtained in Example 116. From them, it was found that cordierire grew by sintering the material. On the other hand, in Comparative Example 18, the growth of cordierire was not found as shown in FIG. 43.

In addition, FIG. 42 is a sketch of the TEM photomicrograph showing the inner structure of the sample obtained in Example 116, which shows that the cordierire 12 grew from the cordierire filler 11 and the mullite filler 20. Here, 21 represents a glass. Producing a ceramic substrate having such inner structure promotes compounding of filler, formed crystal and glass as matrix, resulting in further improving the mechanical properties such as transverse strength.

In Comparative Example 17 in which the substrate was manufactured by way of experiment based on the content disclosed in Japanese Laid-Open Publication No.225338/90, in sintering at a temperature of less than 900° C. required to keep Ag or Cu, etc. inside layers, the substrate had an

What is claimed is:

1. A ceramic substrate, comprising a crystallized MgO—$Al_2O_3$—$SiO_2$—$B_2O_3$—$R_2O$-base glass (R:alkali metal) containing $2MgO.2Al_2O_3.5SiO_2$ crystal, the ceramic substrate being obtained by sintering a mixture of glass powder and a crystal grain filler of $Al_2O_3$ at a temperature of more than 800° C. to below 1000° C. wherein a proportion of the glass powder is 65–80 wt % and that of the crystal grain filler of $Al_2O_3$ is 35–20 wt %.

2. A method for producing a ceramic substrate comprising a crystallized MgO—$Al_2O_3$—$SiO_2$—$B_2O_3$—$R_2O$-base glass (R:alkali metal) containing $2MgO.2Al_2O_3.5SiO_2$ crystal, the method comprising the steps of:

mixing a glass powder comprising MgO, $Al_2O_3$, $SiO_2$, $B_2O_3$, and $R_2O$(R:alkali metal) with a crystal grain filler of $Al_2O_3$ wherein a proportion of glass powder is 65–80 wt % and that of crystal grain filler of $Al_2O_3$ is 35–20 wt %; and sintering at a temperature of more than 800° C. to below 1000° C.

3. A method according to claim 2, wherein the glass powder consists of MgO of 10–30 wt %, $Al_2O_3$ of 5–20 wt %, $SiO_2$ of 40–55 wt %, $B_2O_3$ of 10–20 wt % and $R_2O$ of less than 5 wt %.

4. A method according to claim 2, wherein the glass powder consists of MgO of 10–20 wt %, $Al_2O_3$ of 10–20 wt %, $SiO_2$ of 40–55 wt %, $B_2O_3$ of 10–20 wt % and $R_2O$ of 1–5 wt %.

5. A ceramic substrate, comprising a crystallized MgO—$Al_2O_3$—$SiO_2$—$B_2O_3$—$R_2O$-base glass(R:alkali metal) containing $2MgO.2Al_2O_3.5SiO_2$ crystal, the ceramic substrate being obtained by sintering a mixture of glass powder and a crystal grain filler containing $2MgO.2Al_2O_3.5SiO_2$ filler or $2MgO.2Al_2O_3.5SiO_2$ filler and $Al_2O_3$ filler at a temperature of more than 850° C. to below 1000° C., and wherein a $2MgO.2Al_2O_3.5SiO_2$ crystal grows from the surface of the $2MgO.2Al_2O_3.5SiO_2$ filler, or the surfaces of the $2MgO.2Al_2O_3.5SiO_2$ filler and the $Al_2O_3$ filler, wherein a proportion of alumina is 0–30 wt % and that of $2MgO.2Al_2O_3.5SiO_2$ filler is 1 to 20 wt %.

6. A method for producing a ceramic substrate comprising a crystallized MgO—$Al_2O_3$—$SiO_2$—$B_2O_3$—$R_2O$-base glass(R:alkali metal) containing $2MgO.2Al_2O_3.5SiO_2$ crystal, the method comprising the steps of mixing a glass powder comprising MgO, $Al_2O_3$, $SiO_2$, $B_2O_3$ and $R_2O$(R:alkali metal) with a crystal grain filler of $2MgO.2Al_2O_3.5SiO_2$, or a crystal grain filler of $2MgO.2Al_2O_3.5SiO_2$ and a crystal grain filler of $Al_2O_3$, and sintering at a temperature of more than 850° C. to below 1000° C., so as to grow a $2MgO.2Al_2O_3.5SiO_2$ crystal from the surface of $2MgO.2Al_2O_3.5SiO_2$ filler, or the surfaces of both $2MgO.2Al_2O_3.5SiO_2$ filler and $Al_2O_3$ filler, wherein a proportion of alumina is 0–30 wt % and that of crystal grain filler is 1–20 wt %.

7. A method according to claim 6, wherein the composition of glass powder consists of MgO of 10–30 wt %, $Al_2O_3$ of 5–20 wt %, $SiO_2$ of 40–55 wt %, $B_2O_3$ of 10–20 wt % and $R_2O$ of less than 5 wt %.

8. A ceramic substrate comprising a crystallized MgO—$Al_2O_3$—SiO—$B_2O_3$—$R_2O$-base glass(R:alkali metal) containing a $2MgO.2Al_2O_3.5SiO_2$ crystal and a $SiO_2$ glass and/or a $SiO_2$ crystal, the ceramic substrate being obtained by sintering a mixture of 60–98 wt % of glass powder and a crystal grain filler containing 1–20 wt % of $2MgO.2Al_2O_3.5SiO_2$ crystal powder and 1 wt % to below 40 wt % of a $SiO_2$ glass powder and/or a $SiO_2$ crystal powder at a temperature of more than 850° C. to below 1000° C.

9. A method for producing a ceramic substrate comprising a crystallized MgO—$Al_2O_3$—SiO—$B_2O_3$—$R_2O$-base glass(R:alkali metal) containing a $2MgO.2Al_2O_3.5SiO_2$ crystal and a $SiO_2$ glass and/or a $SiO_2$ crystal, the method comprising the steps of mixing a powder comprising 60–98wt % of MgO, $Al_2O_3$, $SiO_2$, $B_2O_3$ and $R_{20}$ glass(R:alkali metal), 1–20wt % of a $2MgO.2Al_2O_3.5SiO_2$ crystal powder and 1wt % to below 40 wt % of a $SiO_2$ glass powder and/or a $SiO_2$ crystal powder, and then, sintering at a temperature of more than 850° C. to below 1000° C.

10. A method according to claim 9, wherein the powder comprising MgO, $Al_2O_3$, $SiO_2$, $B_2O_3$ and $R_2O$ comprises MgO of 10–30 wt % $Al_2O_3$ of 5–20 wt % $SiO_2$ of 40–55 wt %, $B_2O_3$ of 10–20 wt % and $R_2O$ oxide ($R_2O$) of $0 < R_2O \leq 5$ wt %.

11. A ceramic substrate according to claim 8, wherein the mixture further comprises a filler containing $Al_2O_3$ and/or $3Al_2O_3.2SiO_2$.

12. A method for producing the ceramic substrate according to claim 9, further comprising the steps of adding a $Al_2O_3$ crystal powder and/or a $3Al_2O_3.2SiO_2$ crystal powder, mixing and sintering at a temperature of more than 850° C. to below 1000° C.

13. A method according to claim 12, wherein the mixing ratio of glass powder is 60–98 wt %, that of $2MgO.2Al_2O_3.5SiO_2$ crystal powder is 0.1–20 wt %, that of $SiO_2$ glass powder and/or $SiO_2$ crystal powder is more than 1 wt % to below 40 wt % and that of $Al_2O_3$ crystal powder and/or $3Al_2O_3.2SiO_2$ crystal powder is up to $\leq 40$ wt %.

14. A ceramic substrate comprising a glass and a crystal, which contains a MgO—$Al_2O_3$—$SiO_2$—$B_2O_3$—$R_2O$-base glass(R:alkali metal) as the glass and a $2MgO.2Al_2O_3.5SiO_2$ crystal as the crystal, and wherein a $2MgO.2Al_2O_3.5SiO_2$ crystal grows from the surfaces of $2MgO.2Al_2O_3.5SiO_2$ filler and $3Al_2O_3.2SiO_2$ filler.

15. A method for producing a ceramic substrate comprising a crystallized MgO—$Al_2O_3$—$SiO_2$—$B_2O_3$—$R_2O$-base glass(R:alkali metal) containing $2MgO.2Al_2O_3.5SiO_2$ crystal, wherein a glass powder of 94.9–50.0 wt % comprising MgO of 10–20 wt %, $Al_2O_3$ of 10–20 wt %, $SiO_2$ of 40–55 wt %, $B_2O_3$ of 10–20 wt % and $R_2O$(R:alkali metal) of 0.5–5 wt %, $2MgO.2Al_2O_3.5SiO_2$ crystal grain filler of 0.1–20 wt % and $3Al_2O_3.2SiO_2$ crystal grain filler of 5–30 wt % are mixed and sintered at a temperature of more than 850° C. to 1000° C., so as to grow a $2MgO.2Al_2O_3.5SiO_2$ crystal from the surfaces of the $2MgO.2Al_2O_3.5SiO_2$ filler and the $3Al_2O_3.2SiO_2$ filler.

* * * * *